(12) United States Patent
Pottathil

(10) Patent No.: US 8,497,389 B2
(45) Date of Patent: Jul. 30, 2013

(54) SINGLE STEP TRANSESTERIFICATION OF BIODIESEL FEEDSTOCK USING A GASEOUS CATALYST

(75) Inventor: Raveendran Pottathil, La Jolla, CA (US)

(73) Assignee: Initio Fuels LLC, Melbourne, FL (US)

( * ) Notice: Subject to any disclaimer, the term of this patent is extended or adjusted under 35 U.S.C. 154(b) by 0 days.

(21) Appl. No.: 13/133,651

(22) PCT Filed: Dec. 8, 2009

(86) PCT No.: PCT/US2009/067205
§ 371 (c)(1),
(2), (4) Date: Jun. 8, 2011

(87) PCT Pub. No.: WO2010/077685
PCT Pub. Date: Jul. 8, 2010

(65) Prior Publication Data
US 2011/0245523 A1    Oct. 6, 2011

Related U.S. Application Data

(60) Provisional application No. 61/120,742, filed on Dec. 8, 2008.

(51) Int. Cl.
*C07C 51/00* (2006.01)
(52) U.S. Cl.
USPC ........................................................ 554/162
(58) Field of Classification Search
USPC ........................................................ 554/162
See application file for complete search history.

(56) References Cited

U.S. PATENT DOCUMENTS

| | | | |
|---|---|---|---|
| 2,290,609 | A | 7/1942 | Goss et al. |
| 2,383,601 | A | 8/1945 | Inman |
| 4,164,506 | A | 8/1979 | Kawahara et al. |
| 4,608,202 | A | 8/1986 | Lepper et al. |
| 4,652,406 | A | 3/1987 | Lepper et al. |
| 4,695,411 | A | 9/1987 | Stern et al. |
| 4,698,186 | A | 10/1987 | Jeromin et al. |
| 5,424,467 | A | 6/1995 | Bam et al. |
| 5,849,939 | A | 12/1998 | Mittelbach et al. |
| 5,885,946 | A | 3/1999 | Lamsa |

(Continued)

FOREIGN PATENT DOCUMENTS

| | | |
|---|---|---|
| EP | 2071015 | 6/2009 |
| JP | 2008260819 | 10/2008 |

(Continued)

OTHER PUBLICATIONS

Oluwaniyi et al. 'Efficacy of Catalysts in the Batch Estedfication of the Fatty Acids of Thevetia 1-67 Peruviana Seed Oil' J. Appl. Sci. Environ. Mgt. 2003. JASEM ISSN 1119-8362, vol. 7(1) 15-17 p. 15, col. 1, 2.*

(Continued)

*Primary Examiner* — Deborah D Carr
(74) *Attorney, Agent, or Firm* — Knobbe Martens Olson & Bear LLP

(57) ABSTRACT

Embodiments of the present application provide methods for processing biodiesel from feedstock using a single-step process. The methods can include, for example, use of a gaseous catalyst as part of the esterification/transesterification process. Embodiments of the present application also provide systems for the methods thereof.

17 Claims, 22 Drawing Sheets

U.S. PATENT DOCUMENTS

| | | |
|---|---|---|
| 6,465,642 B1 | 10/2002 | Kenneally et al. |
| 6,768,015 B1 | 7/2004 | Luxem et al. |
| 6,887,283 B1 | 5/2005 | Ginosar et al. |
| 6,965,044 B1 | 11/2005 | Hammond et al. |
| 7,019,363 B1 | 3/2006 | Yu |
| 7,420,072 B2 | 9/2008 | Fleisher |
| 7,531,688 B2 | 5/2009 | Fleisher |
| 7,540,889 B2 | 6/2009 | Logan et al. |
| 7,544,830 B2 | 6/2009 | Parnas et al. |
| 7,645,807 B1 | 1/2010 | Goetsch et al. |
| 7,871,448 B2 | 1/2011 | Jackam et al. |
| 7,935,157 B2 | 5/2011 | Kozyuk et al. |
| 8,088,183 B2 | 1/2012 | Jackam et al. |
| 8,097,049 B2 | 1/2012 | Munson et al. |
| 8,123,822 B2 | 2/2012 | Morgan |
| 2003/0032826 A1 | 2/2003 | Hanna et al. |
| 2003/0158074 A1 | 8/2003 | Haas et al. |
| 2003/0167681 A1 | 9/2003 | Delgado Puche |
| 2004/0074760 A1 | 4/2004 | Portnoff et al. |
| 2005/0204612 A1 | 9/2005 | Connemann et al. |
| 2006/0252950 A1 | 11/2006 | Ginosar et al. |
| 2007/0039239 A1 | 2/2007 | Forester et al. |
| 2007/0130820 A1 | 6/2007 | Chatterjee et al. |
| 2007/0144060 A1* | 6/2007 | Ikura ................................ 44/308 |
| 2007/0151146 A1 | 7/2007 | Lee et al. |
| 2008/0167486 A1 | 7/2008 | Parnas et al. |
| 2008/0175975 A1 | 7/2008 | Fabritius |
| 2008/0184616 A1 | 8/2008 | Misra et al. |
| 2008/0312468 A1 | 12/2008 | Fleisher |
| 2009/0038209 A1 | 2/2009 | Farid et al. |
| 2009/0088351 A1 | 4/2009 | Miller |
| 2009/0234146 A1 | 9/2009 | Cooney et al. |
| 2009/0247785 A1 | 10/2009 | Parnas et al. |
| 2010/0199548 A1 | 8/2010 | Del Cardayre et al. |
| 2010/0212220 A1 | 8/2010 | Tirmizi |
| 2010/0307051 A1 | 12/2010 | Tremblay et al. |
| 2011/0004031 A1 | 1/2011 | Cruz et al. |
| 2012/0016145 A1 | 1/2012 | D'addario et al. |

FOREIGN PATENT DOCUMENTS

| | | |
|---|---|---|
| WO | WO2007147237 | 12/2007 |
| WO | WO2009021248 | 2/2009 |
| WO | WO2009039144 | 3/2009 |
| WO | WO2010005391 | 1/2010 |
| WO | WO2010043013 | 4/2010 |
| WO | WO2010096549 | 8/2010 |
| WO | WO2011100563 | 8/2011 |

OTHER PUBLICATIONS

Oluwaniyi et al., Efficacy of Catalysts in the Batch Esterification of the Fatty Acids of Thevetia Peruvian Seed Oil. J. Appl. Sci. Environ. Mgt. (Jun. 2003), pp. 15-17, vol. 7, No. 1.

International Preliminary Report on Patentability mailed in related PCT/US2009/067205 on Jun. 23, 2011, 8 pages.

Erowid. Aug. 2004. "Best method for hydrochloric acid gas." Erowid.org. Retrieved Jul. 21, 2011 from <http://www.erowid.org/archive/rhodium/chemistry/index.html>.

Elsdon et al., (1913) "Alcoholysis and the composition of cocoanut oil", The Analyst XXXVIII:8-11.

* cited by examiner

SINGLE STEP TRANSESTERIFICATION OF BIODIESEL FEEDSTOCK USING A GASEOUS CATALYST

CROSS-REFERENCE TO RELATED APPLICATIONS

The present application is a U.S. National Stage entry under 35 U.S.C. §371 of International Application No. PCT/US2009/067205, filed Dec. 8, 2009, designating the United States of America and published in English on Jul. 8, 2010, which in turn claims priority to U.S. Patent Application No. 61/120,742 filed Dec. 8, 2008, each of which is hereby incorporated by reference in its entirety.

BACKGROUND

Biodiesel is a non-petroleum-based fuel made from renewable resources, for example, plants, microorganisms, or the like. It can be used as a diesel fuel substitute or as a component of fuel blends. Biodiesel is biodegradable and non-toxic, so fuel spills pose far less risk to the environment. Further, because the production of biodiesel "recycles" $CO_2$, biodiesel production and use does not significantly contribute to global warming.

Chemically, biodiesel feedstock can be composed primarily of triglycerides (TGs), which can be formed from a single molecule of glycerol with three long chain fatty acids attached.

The figure below shows the transesterification process whereby TGs can be converted into methyl ester biodiesel. To the feedstock can be added an alcohol, for example, methanol as exemplified here, in the presence of a catalyst. The reaction between the TGs and the alcohol is reversible, so the alcohol can be added in excess to drive the reaction and ensure complete conversion.

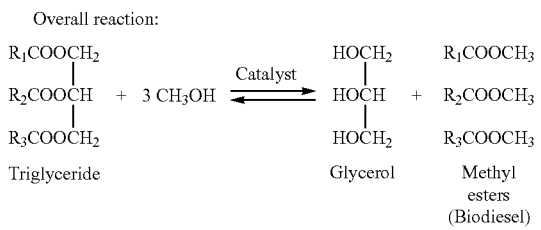

Overall reaction:

$$R_1COOCH_2 \\ | \\ R_2COOCH \ + \ 3\,CH_3OH \ \overset{Catalyst}{\rightleftharpoons} \ HOCH_2 \\ | \\ HOCH \ + \ R_2COOCH_3 \\ | \\ R_3COOCH_2 \qquad\qquad HOCH_2 \quad R_3COOCH_3$$

Triglyceride    Glycerol    Methyl esters (Biodiesel)

This transesterification reaction can be catalyzed using an acidic or basic catalyst in order to maintain adequate conversion rates. Though widely used, base catalysis can suffer from limitations that can increase production costs for biodiesel. Acid catalysts can be used, but the use of strong acid catalysts can create a need for corrosion-resistant processing equipment. Additionally, the liquid acid needs to be removed after the reaction is catalyzed.

As an additional constraint, liquid acid and base catalysts can call for the use of relatively "clean" feedstocks. As a result, prior to the transesterification reaction, many biodiesel feedstocks need processing, for example, lysis of microorganisms, crushing of plant matter, removal of water and free fatty acids (FFAs), or the like, or a combination thereof. These pre-transesterification steps can add cost and complexity to the biodiesel production process, and/or shift the net energy balance of production in a negative direction, which can lessen the attractiveness of biodiesel as a fuel.

SUMMARY

Some embodiments include a process for producing biodiesel grade, fatty acid alkyl esters comprising: providing reaction agents comprising a feedstock, an alcohol and a gaseous catalyst; and contacting the reaction agents, wherein the contacting results in formation of a reaction product comprising a first component comprising a transesterified fatty acid alkyl ester. The process can further comprise mixing the reaction agents. The gaseous catalyst can be acidic. The gaseous catalyst can comprise at least one catalyst selected from HBr, HCl, HCN, HF, and $H_2S$. The gaseous catalyst can comprise HCl. The alcohol can comprise at least one alcohol selected from methanol, ethanol, propanol, butanol, hexanol, heptanol, octanol, nonanol, or decanol. The alcohol can comprise methanol. The feedstock can comprise algal bodies. The feedstock can comprise un-lysed algal bodies. The feedstock can comprise a plant gum. The plant gum can comprise a plant oil gum. The plant oil gum can include, for example, artichoke oil gum, canola oil gum, castor oil gum, Chinese tallow tree oil gum, coconut oil gum, corn, cottonseed oil gum, flaxseed oil gum, hemp oil gum, jatropha oil gum, jojoba oil gum, karanj oil gum, kukui nut oil gum, milk bush, pencil bush oil gum, mustard oil gum, neem oil gum, olive oil gum, palm oil gum, peanut oil gum, radish oil gum, rapeseed oil gum, rice bran oil gum, safflower oil gum, sesame oil gum, soybean oil gum, sunflower oil gum, and tung oil gum. The feedstock can comprise an oil derived from a plant. The oil can comprise at least one oil selected from artichoke oil, canola oil, castor oil, Chinese tallow tree oil, coconut oil, corn, cottonseed oil, flaxseed oil, hemp oil, jatropha oil, jojoba oil, karanj oil, kukui nut oil, milk bush, pencil bush oil, mustard oil, neem oil, olive oil, palm oil, peanut oil, radish oil, rapeseed oil, rice bran oil, safflower oil, sesame oil, soybean oil, sunflower oil, tung oil. The feedstock can comprise at least an animal fat selected from tallow, choice white grease (lard), and poultry fat. The feedstock comprises a lipid. The lipid can comprise at least one lipid selected from triglyceride, a free fatty acid, a phospholipid, and a glycolipid. The reaction product can comprise at least a second component comprising a material selected from a glycerol, a protein, a pigment, a biopolymer, a carbohydrate, and a fatty acid. The material can comprise an omega-3 fatty acid. The reaction product can comprise unreacted alcohol. The process can further comprise separating the unreacted alcohol from the reaction product. The reaction product can comprise the gaseous catalyst. The process can further comprise separating the gaseous catalyst from the reaction product. The process can comprise recovering the first component from the reaction product. The recovering can comprise phase separation, fractional distillation, or the like, or a combination thereof. The process can further comprise purifying the recovered first component. The purifying can comprise distillation. The process can further comprise separating the second component from the reaction product. The separating can comprise separating protein from the reaction product. The separating can comprise separating glycerol from the reaction product.

Some embodiments include a system for producing biodiesel grade, fatty acid alkyl esters comprising: a feedstock; an alcohol; a gaseous catalyst; a reaction chamber adapted to facilitate a reaction among the feedstock, the alcohol, and the gaseous catalyst producing a reaction product comprising a first component comprising a transesterified fatty acid alkyl ester; and a vessel connected to the reaction chamber via a closable fluid connection. The reaction product can comprise a first component comprising a transesterified fatty acid alkyl ester. The vessel can be adapted to facilitate production of the gaseous catalyst. The gaseous catalyst can be acidic. The gaseous catalyst can comprise at least one catalyst selected from HBr, HCl, HCN, HF, and $H_2S$. The gaseous catalyst can comprise HCl. The alcohol can comprise at least one alcohol selected from methanol, ethanol, propanol, butanol, hexanol, heptanol, octanol, nonanol, or decanol. The alcohol can comprise methanol. The feedstock can comprise algal bodies. The feedstock can comprise un-lysed algal bodies. The feedstock can comprise a plant gum. The plant gum can comprise a plant oil gum. The plant oil gum can include, for example, artichoke oil gum, canola oil gum, castor oil gum, Chinese tallow tree oil gum, coconut oil gum, corn, cottonseed oil gum, flaxseed oil gum, hemp oil gum, jatropha oil gum, jojoba oil gum, karanj oil gum, kukui nut oil gum, milk bush, pencil bush oil gum, mustard oil gum, neem oil gum, olive oil gum, palm oil gum, peanut oil gum, radish oil gum, rapeseed oil gum, rice bran oil gum, safflower oil gum, sesame oil gum, soybean oil gum, sunflower oil gum, and tung oil gum. The feedstock can comprise an oil derived from a plant. The oil can comprise at least one oil selected from artichoke oil, canola oil, castor oil, Chinese tallow tree oil, coconut oil, corn, cottonseed oil, flaxseed oil, hemp oil, jatropha oil, jojoba oil, karanj oil, kukui nut oil, milk bush, pencil bush oil, mustard oil, neem oil, olive oil, palm oil, peanut oil, radish oil, rapeseed oil, rice bran oil, safflower oil, sesame oil, soybean oil, sunflower oil, tung oil. The feedstock can comprise at least an animal fat selected from tallow, choice white grease (lard), and poultry fat. The feedstock comprises a lipid. The lipid can comprise at least one lipid selected from triglyceride, a free fatty acid, a phospholipid, and a glycolipid. The reaction product can further comprise at least a second component comprising a material selected from a glycerol, a protein, a pigment, a biopolymer, a carbohydrate, and a fatty acid. The material can comprise an omega-3 fatty acid. The reaction product can comprise unreacted alcohol. The vessel can comprise a separator adapted to separate the unreacted alcohol from the reaction product. The reaction chamber is adapted to facilitate a reaction producing the gaseous catalyst. The reaction product can comprise the gaseous catalyst. The vessel can comprise a separator adapted to separate the gaseous catalyst from the reaction product. The vessel can comprise a vessel adapted to facilitate the recovery of the first component from the reaction product. The recovery can comprise one selected from phase separation and fractional distillation. The system can further comprise a purifying apparatus adapted to facilitate the purification of the recovered the first component. The purifying apparatus can comprise a distillation apparatus. The distillation apparatus can comprise a vaporizer. The system can further comprise an apparatus adapted to separate protein from the reaction product. The system can comprise an apparatus adapted to separate glycerol from the reaction product.

A system for producing biodiesel grade, fatty acid alkyl esters can comprise: a reaction chamber adapted to facilitate a reaction among a lipid-containing feedstock, an alcohol, and a gaseous catalyst to produce a reaction product comprising unreacted alcohol, the catalyst, and a first component comprising a transesterified fatty acid alkyl ester, wherein the reaction product can exit the reaction chamber through a port; and a separator connected to the reaction chamber via a closable fluid connection, wherein the closable fluid connection can be adapted to permit the reaction product exiting the reaction chamber to enter the separator, wherein the separator can be adapted to separate the unreacted alcohol and the catalyst from the reaction product to form a mixture, wherein the mixture can be reused in the reaction chamber. The port can be located at the bottom portion of the reaction chamber. The system can comprise a filter, wherein the filter can be adapted to filter the reaction product exiting the reaction chamber. The system can further comprise a vaporizer connected to the separator via a closable fluid connection, wherein the fluid connection can be adapted to facilitate entry of the first component to the vaporizer, wherein the vaporizer can be adapted to distill the first component. At least one of the reaction chamber, the separator, the vaporizer, or the closable fluid connection can comprise a coating in the interior surface. The coating can comprise at least one material selected from glass, plastic, ceramic, fiber glass, and Teflon.

DETAILED DESCRIPTION

Figure 1:
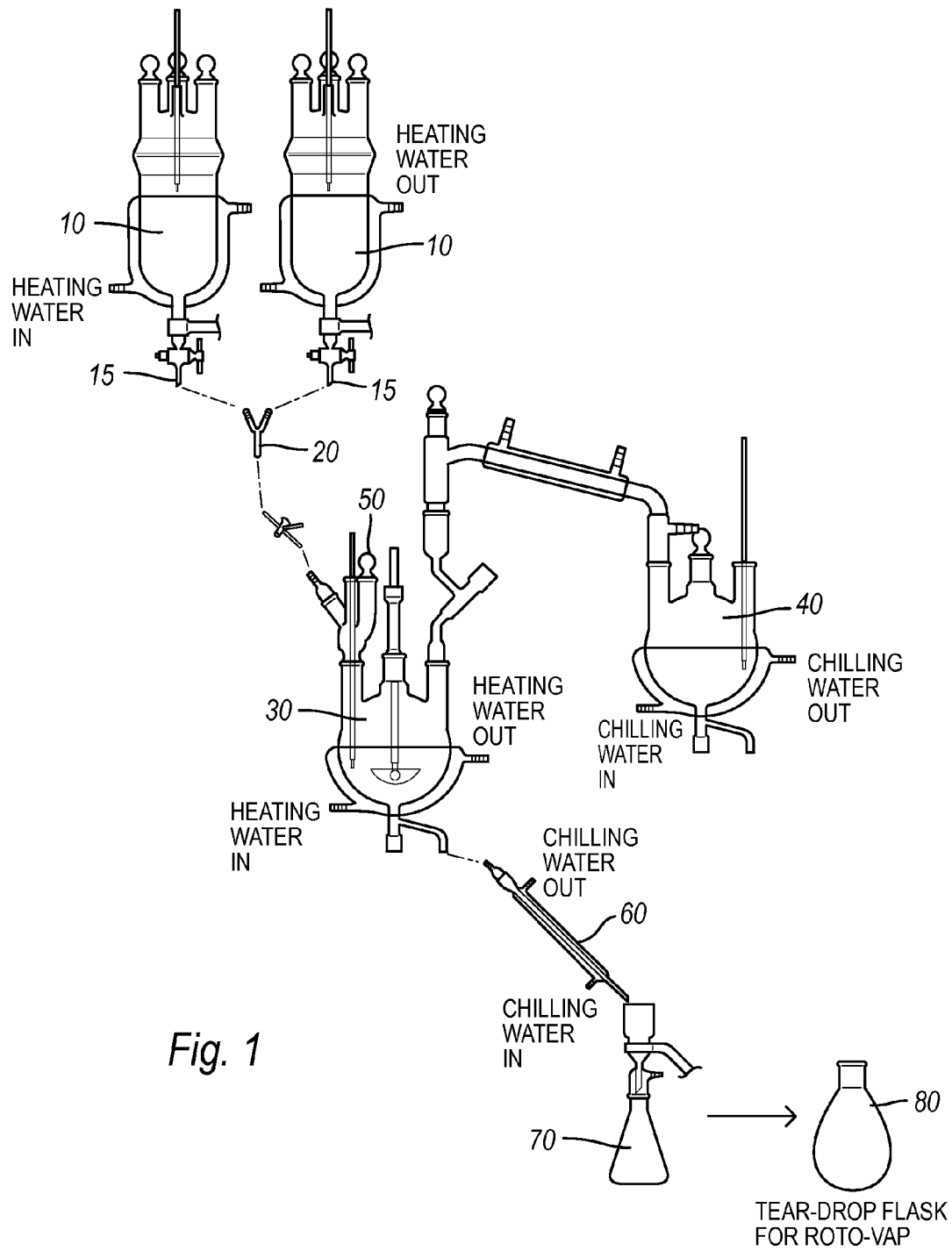
FIG. 1 shows a representative processing system suitable for use in an embodiment of the application.

Embodiments of the application can include a single step process for transesterification of feedstocks. The process can produce biodiesel grade, fatty acid alkyl esters. The process can include: providing reaction agents comprising a feedstock, an alcohol and a gaseous catalyst; and contacting the reaction agents, wherein the contacting results in formation of a reaction product comprising a first component comprising a transesterified fatty acid alkyl ester. The process can include the use of less-expensive feedstocks. The feedstock can comprise at least one transesterifiable lipid. The process can include the use of a feedstock with high water content. The process can include the use of a crude feedstock without complicated pre-treatment of, for example, extensive drying, degumming, or the like, or a combination thereof. As used herein, "crude" can indicate that the feedstock has not been subjected to complicated pre-treatment and/or it contains several classes of lipids (e.g. neutral lipids, phospholipids, etc.), free fatty acids, sterols, etc. The process can include the use of a gaseous catalyst. The process can include recycling of catalysts and/or unreacted alcohol. The process can be suitable for large-scale production, or small-scale product.

The reaction agents can include at least one catalyst. The catalyst can increase the rate of feedstock esterification and transesterification, and/or allow for more liberal feedstock standards, and/or limit the number of reaction steps, and/or enhance the yield of the reaction process, and/or increase the safety of production workers while reducing the environmental footprint of the biodiesel production process.

The catalyst can be a basic catalyst. A basic catalyst can catalyze the transesterification reaction by removing a proton from the alcohol, and can make the alcohol more reactive. The catalyst can include, for example, NaOH, KOH, MeONa, NaOCH$_3$, Na$_2$CH$_2$CH$_3$, guanidines (e.g. TBD), metal complexes of the type M(3-hydroxy-2-methyl-4-pyrone)2(H2))2 where M=Sn, Zn, Pb, or Hg; liquid amine-based catalysts such as DEA, DMAE, TEMED, or TMAH, or the like, or a combination thereof. Transesterification of the lipid of the feedstock can be catalyzed by the basic catalyst. If the feedstock comprises heterogeneous transesterifiable lipids, transesterification of the heterogeneous transesterifiable lipids can be simultaneously catalyzed by the basic catalyst.

The catalyst can be an acidic catalyst. An acid catalyst can catalyze the transesterification reaction by donating a proton to the alcohol, and can make the alcohol more reactive. The catalyst can include, for example, a Bronsted acid that can include a sulfonic or sulfuric type acid, H$_2$SO$_4$, HCl, acetyl chloride, BF$_3$, HBr, HCN, HF, H$_2$S, or the like, or a combination thereof. Transesterification of the lipid of the feedstock can be catalyzed by the acidic catalyst. If the feedstock comprises heterogeneous transesterifiable lipids, transesterification of the heterogeneous transesterifiable lipids can be simultaneously catalyzed by the acidic catalyst.

The catalyst can include heterogeneous acidic and basic catalysts, for example, solid basic materials including MgO, Al—Mg, hydrotalcites, Cs-exchanged sepiolite, mesoporous MCM-41, heterogenized guanidines on organic polymers, sulfonic ion-exchange resin, WZA, STO, SZA, and Amberlyst-15 with sulfuric acid as catalyst. Transesterification of the lipid of the feedstock can be catalyzed by the catalyst. If the feedstock comprises heterogeneous transesterifiable lipids, transesterification of the heterogeneous transesterifiable lipids can be simultaneously catalyzed by the catalyst.

The at least one catalyst can include a liquid catalyst, a solid catalyst, or a gaseous catalyst, or a combination thereof. Transesterification of the lipid of the feedstock can be catalyzed by the catalyst. If the feedstock comprises heterogeneous transesterifiable lipids, transesterification of the heterogeneous transesterifiable lipids can be simultaneously catalyzed by the catalyst.

The catalyst can include a gaseous catalyst. The gaseous catalyst can be acidic, for example, Bronsted acid that can include a sulfonic or sulfuric type acid, H$_2$SO$_4$, HCl, acetyl chloride, BF$_3$, HBr, HCN, HF, H$_2$S, or the like, or a combination thereof.

The concentration of the catalyst can be from about 0.01 M to about 100 M, or from about 0.1 M to about 50 M, or from about 0.5 M to about 20 M, or from about 0.8 M to about 10 M, or from about 1 M to about 5 M, or from about 1 M to about 3 M. The concentration of the catalyst can be lower than about 100 M, or lower than about 50 M, or lower than about 30 M, or lower than about 20 M, or lower than about 10 M, or lower than about 8 M, or lower than about 6 M, or lower than about 5 M, or lower than about 4 M, or lower than about 3 M, or lower than about 2 M, or lower than about 1 M. As used herein, "about" can indicate ±20% variation of the value it describes. The concentration of the catalyst can refer to the concentration of the effective catalyst composition(s). Merely by way of example, if a catalyst is generated in situ, the concentration of the catalyst can refer to that of the generated catalyst.

Merely by way of example, the catalyst can include gaseous HCl. HCl gas can be provided in the form of anhydrous methanolic HCl. HCl gas can be generated in situ by mixing other reaction agents, for example, the feedstock, with H$_2$SO$_4$ and NaCl. The concentration of HCl gas can be from about 0.01 M to about 100 M, or from about 0.1 M to about 50 M, or from about 0.5 M to about 20 M, or from about 0.8 M to about 10 M, or from about 1 M to about 5 M, or from about 1 M to about 3 M. The concentration of the catalyst can be lower than about 100 M, or lower than about 50 M, or lower than about 30 M, or lower than about 20 M, or lower than about 10 M, or lower than about 8 M, or lower than about 5 M. If HCl is generated in situ by, for example, H$_2$SO$_4$ and NaCl, H$_2$SO$_4$ and NaCl can be provided at a ratio of from about 100:1 to about 1:100, or from about 50:1 to about 1:50, or from about 20:1 to about 1:20, or from about 10:1 to about 1:10, or from about 5:1 to about 1:5. Merely by way of example, H$_2$SO$_4$ can be provided at about 3 M, and NaCl at about 1 M, and HCl gas can be generated in situ by mixing the feedstock with such provided H$_2$SO$_4$ and NaCl. As used herein, "in situ" means that a catalyst is generated in the reaction chamber, and not added exogenously. Merely by way of example, HCl gas can be generated in situ by combining H$_2$SO$_4$ and NaCl in the reaction chamber. Transesterification of the lipid of the feedstock can be catalyzed by HCl gas. If the feedstock comprises heterogeneous transesterifiable lipids, transesterification of the heterogeneous transesterifiable lipids can be simultaneously catalyzed by HCl gas. A method of generating gaseous HCl can be found, for example, in the article entitled "Best method for hydrochloric acid gas" available at http://www.erowid.org/archive/rhodium/chemistry/index.html, which is incorporated herein by reference. It is understood that the example regarding HCl gas as the catalyst is provided for illustration purposes only, and is not intended to limit the scope of the application. Other catalysts, such as, basic catalysts, other acid catalysts, in form of a gas, liquid or solid, can be used in the process and/or the system described herein to catalyze the transesterification of a feedstock to generate a product comprising a transesterified fatty acid alkyl ester.

The reaction agents can include an alcohol. The alcohol can include, for example, methanol, ethanol, propanol, butanol, hexanol, heptanol, octanol, nonanol, decanol, or the like, or a combination thereof. The alcohol can include, for example, benzyl alcohol, iso-butyl alcohol, n-butyl alcohol, 2-ethyl hexanol, furfuryl alcohol, iso-propyl alcohol, n-propyl alcohol, or the like, or a combination thereof.

A transesterification reaction involving a feedstock and an alcohol to generate a product comprising a transesterified fatty acid alkyl ester can be reversible. The alcohol can be provided in stoichiometric excess relative to the lipid content of the feedstock that can be transesterified. This can shift the reaction equilibrium toward the desired direction, e.g. the right direction in the exemplary overall reaction shown above, and/or speed up the reaction, and/or improve the final yield.

The concentration of the alcohol can be in stoichiometric excess relative to the lipid content of the feedstock that can be transesterified. The molar ratio of alcohol to transesterifiable lipid can be at least about 3:1, or at least about 5:1, or at least about 10:1, or at least about 20:1, or at least about 25:1, or at least about 50:1, or at least about 100:1, or at least about 200:1, or at least about 500:1, or at least about 1000:1, or at least about 2000:1, or at least about 5000:1, or at least about 10,000:1, or at least about 25,000:1, or at least about 50,000:1.

The reaction agents can include a feedstock. As used herein, the feedstock can refer to a mass source comprising a transesterifiable lipid source. The mass source can include at least one biomass. Merely by way of example, the mass source can include microalgae, yeast, bacteria, oil-seeds, plant matter, animal fats, or the like, or a combination thereof. The mass source may or may not be pre-treated before being used as the feedstock. The pre-treatment can include, for example, separation of the biomass from growth media, additional drying of the feedstock, physical or mechanical pulverization to increase the surface area of the feedstock, pre-heat, or the like, or a combination thereof.

The feedstock can comprise lower than about 90% (% w/w), or lower than about 80% (% w/w), or lower than about 70% (% w/w), or lower than about 60% (% w/w), or lower than about 50% (% w/w), or lower than about 40% (% w/w), or lower than about 30% (% w/w), or lower than about 20% (% w/w), or lower than about 10% (% w/w), or lower than about 8% (% w/w), or lower than about 5% (% w/w), or lower than about 2% (% w/w), or lower than about 1% (% w/w), or lower than about 0.5% (% w/w) of water.

The feedstock can include a lipid. The lipid can be transesterified. The feedstock can comprise at least about 1% (% w/w), or at least about 5% (% w/w), or at least about 10% (% w/w), or at least about 15% (% w/w), or at least about 20% (% w/w), or at least about 30% (% w/w), or at least about 40% (% w/w), or at least about 50% (% w/w) of transesterifiable lipid.

The lipid can include, for example, triglycerides, free fatty acids (FFAs), glycolipids, and phospholipids, or the like, or a combination thereof. Transesterification of the lipid of the feedstock can be catalyzed by the catalyst. If the feedstock comprises heterogeneous transesterifiable lipids, transesterification of the heterogeneous transesterifiable lipids can be simultaneously catalyzed by the catalyst.

The lipid can include an FFA. The FFA can be as high as, for example, about 2% (% w/w), or about 5% (% w/w), or about 10% (% w/w), or about 15% (% w/w), or about 20% (% w/w), or about 25% (% w/w), or about 30% (% w/w), or about 35% (% w/w), or about 40% (% w/w), or about 45% (% w/w), or about 50% (% w/w), or about 55% (% w/w), or about 60% (% w/w), or higher than about 60% of the total lipid weight, without compromising the effectiveness of the process and/or calling for pre-treatment.

The lipid can include a phospholipid. The phospholipid can be as high as, for example, about 2% (% w/w), or about 5% (% w/w), or about 10% (% w/w), or about 15% (% w/w), or about 20% (% w/w), or about 25% (% w/w), or about 30% (% w/w), or about 35% (% w/w), or about 40% (% w/w), or about 45% (% w/w), or about 50% (% w/w), or about 55% (% w/w), or about 60% (% w/w), or higher than about 60% of the total lipid weight, without compromising the effectiveness of the process and/or calling for pre-treatment.

Merely by way of example, the feedstock can include heterogeneous transesterifiable lipids comprising triglyceride, FFA and phospholipids, wherein triglyceride can be about 2% (% w/w), or about 5% (% w/w), or about 10% (% w/w), or about 15% (% w/w), or about 20% (% w/w), or about 25% (% w/w), or about 30% (% w/w), or about 35% (% w/w), or about 40% (% w/w), or about 45% (% w/w), or about 50% (% w/w), or about 55% (% w/w), or about 60% (% w/w), or higher than about 60% of the total lipid weight, wherein FFA can be about 2% (% w/w), or about 5% (% w/w), or about 10% (% w/w), or about 15% (% w/w), or about 20% (% w/w), or about 25% (% w/w), or about 30% (% w/w), or about 35% (% w/w), or about 40% (% w/w), or about 45% (% w/w), or about 50% (% w/w), or about 55% (% w/w), or about 60% (% w/w), or higher than about 60% of the total lipid weight, wherein phospholipid can be about 2% (% w/w), or about 5% (% w/w), or about 10% (% w/w), or about 15% (% w/w), or about 20% (% w/w), or about 25% (% w/w), or about 30% (% w/w), or about 35% (% w/w), or about 40% (% w/w), or about 45% (% w/w), or about 50% (% w/w), or about 55% (% w/w), or about 60% (% w/w), or higher than about 60% of the total lipid weight. It is understood that the exemplary feedstock comprising triglyceride, FFA and phospholipids is for illustration purposes only, and is not intended to limit the scope of the application. A feedstock including other transesterifiable lipids or other combination thereof can be used in the process and/or the system described herein to generate a product comprising a transesterified fatty acid alkyl ester.

The feedstock can be obtained from a biomass lipid source, for example, microalgae, yeast, bacteria, oil-seeds, plant matter, animal fats, or the like, or a combination thereof. The feedstock can include a combination of lipids from various sources described herein. As one example, the feedstock can include a combination of lipids from microalgae, oil-seeds, plant matter and animal fats. the feedstock can include a combination of lipids from microalgae, oil-seeds, plant matter and animal fats. As another example, the feedstock can include a combination of lipids from different animal fats including swine fat, ground meat and waste from a slaughter house. The feedstock can include an unused feedstock comprising a transesterifiable lipid recovered after a reaction, e.g. a previous cycle of transesterification reaction.

The feedstock can be obtained from a biomass lipid source, such as microorganisms, for example, algae, bacteria, fungi, and the like. In embodiments wherein the feedstock is derived from algae, the feedstock-producing organism can be, for example, any of the following, or the like:

| KINGDOM | DIVISION | CLASSES WITHIN | COMMON NAMES OR TYPES |
|---|---|---|---|
| Protoctista | Bacillariophyta | Bacillariophyceae | Diatom |
| Protoctista | Chrysophyta | Chrysophyceae | Golden algae |
| Protoctista | Cryptophyta | Cryptophyceae | Cryptomonads |
| Protoctista | Dinophyta | Dinophyceae | Dinoflagellates |
| Protoctista | Euglenophyta | Euglenophyceae | Euglenoids |
| Protoctista | Eustigmatophyta | Eustigmatophycea | No common names |
| Protoctista | Glaucophyta | Glaucophyceae | No common names |
| Protoctista | Phaeophyta | Phaeophyceae | Brown algae |
| Protoctista | Prasinophyta | Prasinophyceae | Microflagellates |
| Protoctista | Prymnesiophyta (Haptophyta) | Prymnesiophyceae (Haptophyceae) | Coccolithophorids |
| Protoctista | Rhodophyta | Rhodophyceae | Red algae |
| Protoctista | Tribophyta | Xanthophyceae | Yellow-green algae |
| Prokaryota | Cyanophyta | Chroococcales; Pleurocapsales; Stigonematales; Nostocales | Sometimes referred to as blue-green algae |
| Prokaryota | Raphidophyta | Raphidophyceae | No common names |

The feedstock can include algae. The algae can include microalgae. The feedstock can include algal bodies. The algal bodies can comprise un-lysed algal bodies. The algal bodies can be lysed as part of the pre-treatment. The feedstock can include a combination of un-lysed algal bodies and lysed algal bodies. Merely by way of example, the feedstock can include at least about 10%, or at least about 20%, or at least about 30%, or at least about 40%, or at least about 50%, or at least about 60%, or at least about 70%, or at least about 80%, or at least about 90%, or at least about 95% un-lysed algal bodies; the feedstock can include at least about 10%, or at least about 20%, or at least about 30%, or at least about 40%, or at least about 50%, or at least about 60%, or at least about 70%, or at least about 80%, or at least about 90%, or at least about 95% lysed algal bodies. The feedstock can include algae total lipids.

The feedstock can include a yeast. The yeast can include, for example, *Rhodosporidium toruloides, Rhodotorula glutinis, Rhodotorula gracilis, Rhodotorula graminis, Trichosporon cutaneum, Candida curvata, Hasenula saturnus, Lipomyces lipofer, Lipomyces starkeyi, Yarrowia lipolytica*, or the like, or a combination thereof.

The feedstock can include a plant gum. The plant gum can include at least one plant oil gum. The plant oil gum can include, for example, artichoke oil gum, canola oil gum, castor oil gum, Chinese tallow tree oil gum, coconut oil gum, corn, cottonseed oil gum, flaxseed oil gum, hemp oil gum, jatropha oil gum, jojoba oil gum, karanj oil gum, kukui nut oil gum, milk bush, pencil bush oil gum, mustard oil gum, neem oil gum, olive oil gum, palm oil gum, peanut oil gum, radish oil gum, rapeseed oil gum, rice bran oil gum, safflower oil gum, sesame oil gum, soybean oil gum, sunflower oil gum, and tung oil gum, or the like, or a combination thereof. The feedstock can include a crude plant gum.

The feedstock can include at least an oil derived from a plant or a part of the plant (e.g. seeds, beans, fruits, or the like, or a combination thereof). The plant can include, for example, a tree, a vegetable, or the like. The plant can include, for example, an artichoke, canola, a castor, a Chinese tallow tree, a coconut, a corn, cotton, a flax, a hemp, a Jatropha curcas, a jojoba, a karanj, a kukui nut, milk bush, pencil bush, a mustard, a Neem, an olive, a palm, peanut, a radish, a rapeseed, rice, safflower, sesame, soybean, sunflower, a tung tree, or the like. The oil can comprise at least one oil selected from artichoke oil, canola oil, castor oil, Chinese tallow tree oil, coconut oil, corn oil, cottonseed oil, flaxseed oil, hemp oil, jatropha oil, jojoba oil, karanj oil, kukui nut oil, milk bush oil, pencil bush oil, mustard oil, neem oil, olive oil, palm oil, peanut oil, radish oil, rapeseed oil, rice bran oil, safflower oil, sesame oil, soybean oil, sunflower oil, tung oil, or the like, or a combination thereof. The feedstock can include a crude oil derived from a plant.

The feedstock can comprise at least an animal fat. The animal fat can comprise at least one animal fat selected from tallow, choice white grease (lard), poultry fat, ground meat, or the like, or a combination thereof. The feedstock can include a crude animal fat.

The feedstock can include a crude yellow grease, a crude brown grease, or a combination thereof. As used herein, a yellow grease can refer to an unused oil, and/or an unused fat. The crude yellow grease can include, for example, a rendered fat, an oil purification, a direct process waste from, e.g., a slaughter house, or a cooker, or the like, or a combination thereof. The crude brown grease can refer to a used oil, and/or a used fat. The crude brown grease can include, for example, fry pit waste, a grease trap, or the like, or a combination thereof.

The process for transesterification of feedstocks to produce biodiesel grade, fatty acid alkyl esters can include contacting the reaction agents comprising the feedstock, the alcohol and the catalyst.

The reaction agents comprising the feedstock, the alcohol and the catalyst can be brought into contact in various manners. The reaction agents comprising the feedstock, the alcohol and the catalyst can be brought into contact simultaneously. Some of the reaction agents comprising the feedstock, the alcohol and the catalyst can be combined together before brought into contact with the rest of the reaction agents. As an example, the feedstock and the alcohol can be combined before brought into contact with the catalyst. As another example, the feedstock and the alcohol can be combined before brought into contact with the alcohol. As a further example, the alcohol and the catalyst can be combined before brought into contact with the feedstock. If the feedstock includes multiple mass sources, the mass sources can be combined before or when the feedstock is brought into contact with other reaction agents including the alcohol the catalyst. Merely by way of example, the feedstock can include a combination of different biomasses including a plant matter and an animal fat, the plant matter and the animal fat can be combined before the feedstock is brought into contact with the alcohol and/or the catalyst; or the plant matter, the animal fat, and the alcohol and/or the catalyst can be brought into contact simultaneously. Any of the contact described above can include mixing. The mixing can be performed by a mixing apparatus including, for example, a mechanical mixer (e.g. a pedal), a vibrator, a circulating pump, a sonicator, or the like, or a combination thereof.

The contacting can be performed at room temperature. The contacting can be performed at a temperature other than the room temperature. The contacting can be performed at about 0° C., or at about 10° C., or at about 20° C., or at about 30° C., or at about 40° C., or at about 45° C., or at about 50° C., or at about 55° C., or at about 60° C., or at about 65° C., or at about 70° C., or at about 75° C., or at about 80° C., or at about 85° C., or at about 90° C., or at about 95° C., or at about 100° C., or at about 110° C., or at about 120° C., or at a temperature higher than about 120° C. The contacting can be performed within a temperature range of about ±0° C., or at about ±2° C., or at about ±5° C., or at about ±10° C., or at about ±15° C., or at about ±20° C., or at about ±25° C., or at about ±30° C., or at about ±35° C., or at about ±40° C., or at about ±45° C., or at about ±50° C., or higher. Ranges of temperatures having as endpoints any of the above temperatures are specifically contemplated. Merely by way of example, the contacting can be performed at temperatures from about 30° C. to about 90° C., or from about 40° C. to about 80° C., or from about 45° C. to about 75° C. The contacting can be performed about a temperature about 5%, or about 10%, or about 15%, or about 20%, or about 25%, or about 30%, or about 35%, or about 40%, or about 45%, or about 50%, or about 55%, or about 60%, or about 65%, or about 70%, or about 75%, or about 80%, or about 85%, or about 90%, or about 95%, or about 100%, or about 110%, or about 120%, or higher than about 120% of the boiling point of the alcohol at a pressure. Ranges of temperatures having as endpoints any of the above temperatures are specifically contemplated. If the alcohol includes multiple alcohol compositions with different boiling points at the pressure, the boiling point of the alcohol can refer to the lowest one. The contacting can be performed at a fixed temperature. The contacting can be performed at a temperature varying during the contacting. The contacting can be performed at a pre-selected (e.g. fixed or variable) temperature. The contacting can be performed at a temperature which can be adjusted in real time. Merely by way of example, the contacting can be performed at a temperature which can be adjusted in real time based on the real-time operation parameters, real-time measurements regarding, for example, quality and/or quantity of the reaction product, a user's instruction, an instruction from a centralized and/or remote control center, or the like, or a combination thereof. As used herein, the operation parameters can include, for example, temperature, and/or pressure, and/or duration of the contacting and any other features involved with the process (e.g. mixing, separating, distilling), or the like, or a combination thereof.

The contacting can be performed at about atmospheric pressure. The contacting can be performed at a pressure higher than atmospheric pressure. The contacting can be performed at a pressure about 100%, or about 110%, or about 120%, or about 150%, or about 200%, or about 250%, or about 300%, or about 400%, or about 500%, or higher than 500% of atmospheric pressure. The contacting can be performed at a pressure lower than atmospheric pressure. The contacting can be performed at a pressure about 5%, or about 10%, or about 15%, or about 20%, or about 25%, or about 30%, or about 35%, or about 40%, or about 45%, or about 50%, or about 55%, or about 60%, or about 65%, or about 70%, or about 75%, or about 80%, or about 85%, or about 90%, or about 95%, or about 100% of atmospheric pressure. Pressure ranges of temperatures having as endpoints any of the above pressures are specifically contemplated. The contacting can be performed at a fixed pressure. The contacting can be performed at a pressure varying during the contacting. The contacting can be performed at a pre-selected (e.g. fixed or variable) pressure. The contacting can be performed at a pressure which can be adjusted in real time. Merely by way of example, the contacting can be performed at a pressure which can be adjusted in real time based on the real-time operation parameters, real-time measurements regarding, for example, quality and/or quantity of the reaction product, a user's instruction, an instruction from a centralized and/or remote control center, or the like, or a combination thereof.

The contacting can last at least about 1 minute, or at least about 5 minutes, or at least about 10 minutes, or at least about 15 minutes, or at least about 20 minutes, or at least about 25 minutes, or at least about 30 minutes, or at least about 45 minutes, or at least about 60 minutes, or at least about 1.5 hours, or at least about 2 hours, or at least about 2.5 hours, or at least about 3 hours, at least about 3.5 hours, or at least about 4 hours, or at least about 5 hours, or at least about 6 hours, at least about 7 hours, or at least about 8 hours, or at least about 9 hours, or at least about 10 hours. The contacting can last no more than about 10 hours, or no more than about 9 hours, or no more than about 8 hours, or no more than about 7 hours, or no more than about 6 hours, or no more than about 5 hours, or no more than about 4 hours, or no more than about 3.5 hours, or no more than about 3 hours, or no more than about 2.5 hours, or no more than about 2 hours, or no more than about 1.5 hours, or no more than about 60 minutes, or no more than about 45 minutes, or no more than about 30 minutes, or no more than about 25 minutes, or no more than about 20 minutes, or no more than about 15 minutes. Time ranges having as endpoints any of the times set forth above are specifically contemplated. The contacting can last a pre-selected period of time. The contacting can last a period of time which can be adjusted in real time. Merely by way of example, the contacting can last a period of time which can be adjusted in real time based on the real-time operation parameters, real-time measurements regarding, for example, quality and/or quantity of the reaction product, a user's instruction, an instruction from a centralized and/or remote control center, or the like, or a combination thereof.

The process for transesterification of feedstocks to produce biodiesel grade, fatty acid alkyl esters can further include mixing the reaction agents comprising the feedstock, the alcohol and the catalyst. The mixing can essentially coincide with the contacting. The mixing can occur during a partial period of contacting. The mixing can be performed at a strength depending on the power of the mixing apparatus.

The mixing can be performed by a mixing apparatus. The mixing apparatus can include, for example, a mechanical mixer (e.g. a pedal, a vibrator), a circulating pump, a sonicator, or the like, or a combination thereof. The mixing can be performed by a combination of multiple number and/or types of mixing apparatuses.

The mixing can be performed continuously (at frequency of infinity). Merely by way of example, if the mixing is performed by a pedal, the pedal can be rotating continuously; if the mixing is performed by a vibrator, the vibrator can be vibrating continuously; if the mixing is performed by a circulating pump, the circulating pump can be pumping continuously; if the mixing is performed by a sonicator, the sonicator can be running and generating sonication continuously. The mixing can be performed concomitantly. The mixing can be performed at a frequency from about 0.01 Hz to about 100 Hz, or from about 0.1 Hz to about 50 Hz, or from about 0.5 Hz to about 25 Hz, or from about 1 Hz to about 20 Hz. The mixing can be performed at a constant frequency. The mixing can be performed at variable frequencies. Merely by way of example, the mixing can be performed at frequencies varying accordingly to a sine function. The mixing can be performed by a combination of a multiple number and/or types of apparatuses, wherein each apparatus can run at the same frequency. The mixing can be performed by a combination of a multiple number and/or types of apparatuses, wherein at least one of the apparatuses can run at a different frequency than the other apparatus(s).

The mixing can be performed at a strength. The strength can depend on and/or be controlled by the power of the mixing apparatus.

The mixing can be perform a pre-selected mixing parameters including duration, strength, frequency, or the like, or a combination thereof. The pre-selected mixing parameters can be fixed, or variable, or a combination thereof. Merely by way of example, the duration and frequency of the mixing can include pre-selected fixed values, and the strength can vary as a pre-selected sine function. The mixing parameters can be adjusted in real time. Merely by way of example, the duration of the mixing can be adjusted in real time based on other real-time operation parameters, real-time measurements regarding, for example, quality and/or quantity of the reaction product, a user's instruction, an instruction from a centralized and/or remote control center, or the like, or a combination thereof.

The contacting can result in formation of a reaction product comprising a first component comprising a transesterified fatty acid alkyl ester. The first component comprising the transesterified fatty acid alkyl ester can be used as a biodiesel. The first component comprising the transesterified fatty acid alkyl ester can be further processed to form more complex fuel, e.g. jet fuel. The reaction product can include at least a second component comprising a material selected from a glycerol, a protein, a pigment, a biopolymer, a carbohydrate, and a fatty acid. The second component can include an omega-three fatty acid. The reaction product can be used for non fuel applications, for example, wood finish, bases for cosmetic and burn creams, essential oils, lamp oil, and nutraceuticals. Depending upon the structural composition of the fatty acids (for example, carbon chain length, degree of saturation, number and place of double bonds) as well as whether the fatty acids are available in free form or in the form of a triglyceride, some components of the reaction product can have additional uses in, for example, facial or burn creams, cosmetic creams, wound creams, food supplements, waxes, or as a fuel. Some component of the reaction product, for example, the first component comprising the fatty acid alkyl esters, can be used as biodiesel, or can be further processed to higher value fuels (for example, jet fuel) through a variety of catalytic processes, or converted to methyl or ethyl fatty acid esters via acid or base catalyzed transesterification reactions. The reaction product can include the unreacted alcohol. The reaction product can include the catalyst.

The reaction product can include components in form of a gas, liquid, or solid, or a combination thereof. Merely by way of example, the reaction product can include the catalyst in gaseous form, the unreacted alcohol in the form of a gas and/or liquid, the first component comprising the transesterified fatty acid alkyl ester in liquid form, the second component comprising a glycerol in liquid form, and carbohydrate and protein in solid form.

The process for producing biodiesel grade, fatty acid alkyl esters can include separating multiple components from the reaction product. The process can include separating the unreacted alcohol from the reaction product. The process can include separating the catalyst from the reaction product. The process can include separating the first component comprising the transesterified fatty acid alkyl ester from the reaction product. The process can include separating the second component from the reaction product.

The process can include separating the unreacted alcohol from the reaction product. The separation of the unreacted alcohol from the reaction product can be performed by, for example, fraction distillation. Merely by way of example, the reaction product comprising unreacted alcohol can be distilled to recover unreacted alcohol. The distillation can be performed at a temperature from about 20° C. to about 200° C., or from about 30° C. to about 150° C., or from about 40° C. to about 120° C., or from about 50° C. to about 100° C., or from about 60° C. to about 90° C., or from about 70° C. to about 80° C. The distillation can be performed at a pressure from about 0.1 atmospheric pressure to about 10 atmospheric pressure, or from about 0.2 atmospheric pressure to about 8 atmospheric pressure, or from about 0.5 atmospheric pressure to about 5 atmospheric pressure, or from about 0.8 atmospheric pressure to about 3 atmospheric pressure, or from about 0.6 atmospheric pressure to about 2 atmospheric pressure, or from about 0.7 atmospheric pressure to about 1.5 atmospheric pressure, or from about 0.8 atmospheric pressure to about 1.2 atmospheric pressure, or about 1 atmospheric pressure. The unreacted alcohol separated from the reaction product can be collected. The unreacted alcohol separated from the reaction product can be condensed to liquid form. The unreacted alcohol separated from the reaction product can be stored and/or reused. The unreacted alcohol separated from the reaction product can be reused in the transesterification reaction in the process, or in some other processes.

The process can include separating the catalyst from the reaction product. The separation of the catalyst from the reaction product can be performed by, for example, fraction distillation. Merely by way of example, the reaction product comprising catalyst can be distilled to recover catalyst. The distillation can be performed at a temperature from about 20° C. to about 200° C., or from about 30° C. to about 150° C., or from about 40° C. to about 120° C., or from about 50° C. to about 100° C., or from about 60° C. to about 90° C., or from about 70° C. to about 80° C. The distillation can be performed at a pressure from about 0.1 atmospheric pressure to about 10 atmospheric pressure, or from about 0.2 atmospheric pressure to about 8 atmospheric pressure, or from about 0.5 atmospheric pressure to about 5 atmospheric pressure, or from about 0.8 atmospheric pressure to about 3 atmospheric pressure, or from about 0.6 atmospheric pressure to about 2 atmospheric pressure, or from about 0.7 atmospheric pressure to about 1.5 atmospheric pressure, or from about 0.8 atmospheric pressure to about 1.2 atmospheric pressure, or about 1 atmospheric pressure. The catalyst separated from the reaction product can be collected. The catalyst separated from the reaction product can be stored and/or reused. The catalyst separated from the reaction product can be reused in the transesterification reaction in the process, or in some other processes.

The separation of the catalyst from the reaction product can be performed at the same time as the separation of the unreacted alcohol from the reaction product. The catalyst and the unreacted alcohol separated from the reaction product can be collected separately, e.g. by storing in different containers. The catalyst and the unreacted alcohol separated from the reaction product can be collected together, e.g. by storing as a mixture in a container. The mixture of the alcohol and the catalyst can be reused. The mixture of the alcohol and the catalyst can be reused in the transesterification reaction in the process.

The process can include separating the first component comprising the transesterified fatty acid alkyl ester from the reaction product. The separation of the first component comprising the transesterified fatty acid alkyl ester from the reaction product can be performed by, for example, fraction distillation, phase separation, or the like, or a combination thereof. The separation can be performed while or after the unreacted alcohol and/or catalyst is separated from the reaction product.

Merely by way of example, the separation of the first component comprising the transesterified fatty acid alkyl ester from the reaction product can be performed by fraction distillation. The reaction product comprising the first component can be distilled in, e.g. a vaporizer, or the like. The distillation can be performed at a temperature from about 20° C. to about 200° C., or from about 50° C. to about 180° C., or from about 60° C. to about 150° C., or from about 70° C. to about 130° C., or from about 80° C. to about 120° C., or from about 90° C. to about 110° C. The distillation can be performed at a pressure below or above atmospheric pressure. The distillation can be performed at a pressure from about 0.01 bar to about 10 bar, or from about 0.1 bar to about 8 bar, or from about 0.3 bar to about 5 bar, or from about 0.5 bar to about 3 bar. The separated first component comprising the transesterified fatty acid alkyl ester can be condensed and/or stored. The residue of the distillation can include, for example, glycerol, protein, or other unconvertible matter, or a combination thereof. The residue can be drained to a storage tank, and can be further processed.

Merely by way of example, the separation of the first component comprising the transesterified fatty acid alkyl ester from the reaction product can be performed by phase separation. Merely by way of example, the reaction product can include a first phase including the first component comprising the transesterified fatty acid alkyl ester, and a second phase including the second component comprising a glycerol, a protein, or other non-convertible matter, or a combination thereof. The first phase can be immiscible with the second phase. The first component of the reaction product can be separated from the second component by separating the two immiscible phases. The second component in the second phase can include, for example, glycerol, and can be separated, and/or stored in, for example, a storage tank. The separated first component comprising the transesterified fatty acid alkyl ester can be stored and/or further purified, e.g. by distillation. The distillation can be performed at a temperature from about 20° C. to about 200° C., or from about 50° C. to about 180° C., or from about 60° C. to about 150° C., or from about 70° C. to about 130° C., or from about 80° C. to about 120° C., or from about 90° C. to about 110° C. The distillation can be performed at a pressure below or above atmospheric pressure. The distillation can be performed at a pressure from about 0.01 bar to about 10 bar, or from about 0.1 bar to about 8 bar, or from about 0.3 bar to about 5 bar, or from about 0.5 bar to about 3 bar. The separated first component, with or without further purification, comprising the transesterified fatty acid alkyl ester can be condensed and/or stored. The separated second component can be drained to a storage tank, and can be further processed.

The separated first component comprising the transesterified fatty acid alkyl ester can be further processed by, e.g. distillation, or other reaction, or the like, or a combination thereof, to improve, e.g., its quality, purity and/or fuel grade, or a combination thereof. Merely by way of example, the separated first component comprising the transesterified fatty acid alkyl ester can be converted to higher value fuels (for example, jet fuel) through a variety of catalytic processes.

The separated second component can be drained to a storage tank, and can be further processed. Merely by way of example, glycerol can be separated from the rest of the second component comprising protein, and/or other non-convertible matter. Glycerol can be further processed. Merely by way of example, glycerol can be reacted in the presence of an alkene (for example, isobutylene) to form alkyl ethers of glycerol. Alkyl ethers for example, di-tert-butylglycerols (DTBG) and tri-tert-butylglycerol (TTBG) are valuable as fuel additives.

The reaction product can include a second component comprising a protein, a carbohydrate, or the like, or a combination thereof. The process can include separating the second component including the protein and/or the carbohydrate from the reaction product. The protein and/or the carbohydrate can separated from the reaction product by, for example, filtration, centrifugation, salt precipitation, phase separation, or the like, or a combination thereof, before, during or after any of the separation procedures described above. Merely by way of example, the reaction product can be filtered to separate the composition(s) in solid form from that/those in gas and/or liquid form before the further procedure(s) to separate the compositions in gas and/or liquid form. The filtration can be performed by mechanical filtration in which one or a series of mesh filters can be used.

The reaction product can include bio-polymer, for example, a polyhydroxybutyrate (PHB) polymer, a fat-soluble pigment, a fatty acid (e.g. omega-three fatty acid), or the like, or a combination thereof. The process can including separating any one of these or other compositions of the reaction produce from the reaction product by, for example, centrifugation, extraction by an organic solvent (e.g. hexane), or the like, or a combination thereof. Merely by way of example, in the event that organic solvent extraction is employed, the extracted compositions of the reaction produce can be separated from the organic solvent by evaporating the solvent from the composition under vacuum.

The reaction product can be used as feedstock for a repeated transesterification reaction to improve the efficiency of transesterifiable lipid in the feedstock. Merely by way of example, the reaction product before or after any of the separation procedures described above can be used as the feedstock for a repeated transesterification reaction such that more transesterifiable lipid in the feedstock can be transesterified than that transesterified in a single transesterification reaction.

The process can be performed in batch mode. Merely by way of example, a batch of feedstock can be transesterified, the reaction product can be collected, and different components of the reaction product can be separated, at least some of the apparatuses involved in the process can be emptied and/or cleaned; then the cycle repeated for another batch of feedstock.

The process can be performed essentially continuously. The feedstock can be fed to the process to be transesterified, the reaction product can be collected, and different components of the reaction product can be separated, essentially continuously. The process can be stopped periodically, e.g. once a day, or once a week, or once every two weeks, or once a month, or once every two months, or once three months, or once every four months, or once six months, or once a year or longer. The process can resume after at least some of the apparatuses involved in the process are maintained, e.g. emptied and/or cleaned. The process can involve multiple apparatuses of the same function, e.g. two vaporizers for distillation, such that the process can continue by using the alternate one while the other one is being maintained. Some part of the process can be performed essentially continuously, while the other part can be performed in batch mode. Merely by way of example, the transesterification reaction can be performed essentially continuously, while the separation and purification of the reaction product can be performed in batch mode.

The operation mode including the batch mode, or a continuous mode, or a combination thereof, can be pre-selected. The operation mode can be adjusted in real time. Merely by way of example, the operation mode can be adjusted in real time based on the real-time operation parameters, real-time measurements regarding, for example, quality and/or quantity of the reaction product, a user's instruction, an instruction from a centralized and/or remote control center, or the like, or a combination thereof. As one example, the process can involve one reactor for the transesterification and two vaporizers for biodiesel purification, wherein the pre-selected operation mode can include that the process can run essentially continuously, at any single time point only one of the two vaporizers is used, and that the process can switch to use the other vaporizer while the first one is emptied and maintained every month. As another example, the process can involve one reactor for the transesterification and two vaporizers for biodiesel purification, wherein the operation mode can include that the process can run essentially continuously, at any single time point only one of the two vaporizers is used; however, the process can switch to use the other vaporizer based on a user's instruction, or when the quality of the purified biodiesel is measured to be substandard, or when the performance of the vaporizer is substandard, or the like, or a combination thereof.

Embodiments of the application can include a system for producing biodiesel grade, fatty acid alkyl esters comprising: a feedstock; an alcohol; a gaseous catalyst; a reaction chamber adapted to facilitate a reaction among the feedstock, the alcohol, and the gaseous catalyst producing a reaction product comprising a first component comprising a transesterified fatty acid alkyl ester; and a vessel connected to the reaction chamber via a closable fluid connection.

The system can include a reaction chamber. In the reaction chamber, a transesterification can be carried out among the reaction agents including a feedstock, an alcohol, and a gaseous catalyst. The transesterification reaction in the reaction chamber can produce a reaction product that can include a first component comprising a transesterified fatty acid alkyl ester. The reaction product can also include a second component comprising at least one material selected from a glycerol, a protein, a pigment, a biopolymer, a carbohydrate, and a fatty acid.

The reaction chamber can include a reactor or a container, for example, a tube, cartridge, pipe, chamber, vat, tank, bag, bladder, balloon, liner, or the like. The reaction chamber can be in the shape essentially of a cylinder, a cube, a rectangular solid, a pyramid, a cone, a sphere, or the like, or a portion thereof, or a combination thereof. Merely by way of example, the reaction chamber can be in the shape essentially of a cylinder in the middle part and a half sphere at the top. As used herein, the shape does not indicate the orientation of the reaction chamber. Merely by way of example, if the reaction chamber is in the shape essentially of a cone whose cross-sectional area is tapering along its longitudinal axis, the portion with smaller cross-sectional area can be the top portion of the reaction chamber, or it can be the bottom portion of the reaction chamber. As used herein, the top portion of the reaction chamber or a vessel can refer to the portion above the gas/liquid interface within the reaction chamber or the vessel. As used herein, the bottom portion of the reaction chamber a vessel can refer to the portion below the gas/liquid interface within the reaction chamber or the vessel.

The reaction chamber can be of any suitable volume, for example, smaller than about 1 mL, from about 1 mL to about 100 mL, or from about 100 mL to about 250 mL, or from about 250 mL to about 500 mL, or from about 500 mL to about 1 L, or from about 1 L to about 10 L, or from about 10 L to about 100 L, or from about 100 L to about 250 L, or from about 250 L to about 500 L, or from about 500 L to about 1000 L, or from about 1000 L to about 5000 L, or from about 5000 L to about 10,000 L, or from about 10,000 L to about 50,000 L, or from about 50,000 L to about 100,000 L, or from about 100,000 L to about 250,000 L, or larger than about 250,000 L.

The reaction chamber can be made of a metal, glass, plastic, an alloy, or the like, or a combination thereof. The metal can include at least one material selected from stainless steel, aluminum, or the like, or a combination thereof. Merely by way of example, the reaction chamber can include a metal such as SS316 internally lined with glass, plastic, ceramic, fiber glass, Teflon, or other composites that are acid resistant. The reaction chamber can include a coating on at least part of its interior surface. As used herein, the interior surface of the reaction chamber can refer to its surface facing inside of the reaction chamber. The interior surface can be in direct contact with the reaction agents, or can be separated from the reaction agents by its coating. The coating can include a material selected from glass, plastic, ceramic, fiber glass, Teflon, or the like, or a combination thereof. The interior surface of the reaction chamber or its coating can have the properties of, for example, essentially non-reactivity with the reaction agents, corrosion resistance, heat insulation, or the like, or a combination thereof. The reaction chamber can include a coating on at least part of its exterior surface. As used herein, the exterior surface of the reaction chamber can refer to its surface facing outside of the reaction chamber. The exterior surface can be in direct contact with the ambient surrounding the reaction chamber, or can be separated from the ambient by its coating. The coating can include a material selected from glass, plastic, ceramic, fiber glass, Teflon, or the like, or a combination thereof. The exterior surface of the reaction chamber or its coating can have the properties of, for example, essentially non-reactivity with the ambient, corrosion resistance, heat insulation, or the like, or a combination thereof.

The reaction chamber can comprise an apparatus to achieve the desired temperature for the transesterification reaction to occur within the reaction chamber. The apparatus can include, for example, a jacket, a cavitation (or vacuum), a heater, or the like, or a combination thereof.

As one example, the reaction chamber can include a heater (e.g. a radiator) within the chamber. The reaction chamber can include a coating on the interior surface, a coating on the exterior surface, an insulation layer outside the exterior surface of the reaction chamber, or the like, or a combination thereof, to reduce heat dissipation from the reaction chamber to the ambient. The insulation layer can be formed by, for example, a vacuum. The reaction chamber can include a double wall between its interior surface and its exterior surface, and/or outside its exterior surface, wherein the space between the double wall can be vacuumed to form the insulation layer. The vacuum can be about 0.01%, or about 0.1%, or about 1%, or about 10%, or about 20%, or about 30%, or about 40%, or about 50%, or about 60%, or about 70%, or about 80%, or about 90% of atmospheric pressure.

As another example, the reaction chamber can include a jacket. The jacket can include a medium with a temperature and/or heat capacity and/or flowrate so as to maintain the desired temperature within the reaction chamber. The medium can include at least one material selected from water, gas, oil, or the like, or a combination thereof. Merely by way of example, the reaction chamber can include a water jacket. The temperature difference between the medium within the jacket and the desired temperature within the reaction chamber can be at least about 0.1° C., or about 1° C., or about 5° C., or about 10° C., or about 15° C., or about 20° C., or about 25° C., or larger than about 25° C. The temperature of the medium within the jacket can be higher or lower than the desired temperature within the reaction chamber, depending on whether heat needs to be added to or removed from the reaction chamber. The contacting surfaces where the jacket and the reaction chamber contact can be configured such that heat transfer is facilitated and/or enhanced. The reaction chamber can further comprise a coating or vacuum as described above to reduce undesired energy exchange (e.g. heat dissipation if the desired temperature within the reaction chamber is higher than the ambient temperature, or heat absorption if the desired temperature within the reaction chamber is lower than the ambient temperature) between the reaction chamber and the ambient.

The pressure within the reaction chamber can be controlled by, for example, temperature within the reaction chamber, a pressure pump, pressure and/or flowrate of the reaction agents and/or reaction product, or the like, or a combination thereof.

The reaction chamber can include sealable ports through which can pass, for example, tubing, wiring, fiber optic cable, sampling devices, liquid, solids, gases, or the like. The ports can be gated with, for example, a valve, or the like. The flow through the ports can be controlled. The control of the ports can be synchronized. At least some of the ports can be controlled independently from the other ports.

The reaction agents can enter the reaction chamber from one or separate ports. The reaction agents can be brought into contact outside the reaction chamber and enter the reaction chamber as mixture through one or more ports. The reaction agents can enter the reaction chamber from separate ports and can be brought into contact within the reaction chamber. The reaction agents can be gravity-fed into the reaction chamber, or delivered on a conveyor, or delivered by a pump, or shoveled into the reaction chamber, or poured into the reaction chamber, or allowed to multiply or generate inside the reaction chamber, or the like, or a combination thereof.

The reaction product can exit the reaction chamber through one or more ports. The reaction product can exit the reaction chamber through one or more ports and be separated outside the reaction chamber. Different phases of the reaction product can exit through separate ports from the reaction chamber. Merely by way of example, the reaction product can include a first phase including the first component comprising the transesterified fatty acid alkyl ester, and a second phase including the second component comprising a glycerol, a protein, or other non-convertible matter, or a combination thereof, wherein the first phase can be immiscible with the second phase. The first phase including the first component and the second phase including the second component can exit the reaction chamber from separate ports. The port(s) through which the reaction product can exit the reaction chamber can locate below the gas/liquid interface of the reaction agents and/or reaction product. This can reduce the amount of catalyst removed from the reaction chamber. The reaction product can exit the reaction chamber driven by, for example, gravity, a pump, or the like, or a combination thereof. The reaction product can be filtered upon or after exiting the reaction chamber. The filtration can be performed using, e.g. one or a series of filters. The component recovered by the filtration can be discarded, or can be used with or without further processing if a valuable composition, e.g. a protein, and/or carbohydrate, is present.

The system can include more than one reaction chamber. Merely by way of example, the system can include 2, 4, 8, 16, 32, 64, or more reaction chambers. In certain embodiments the arrayed reaction chambers can be interconnected via, for example, hollow tubing, electrical wiring, fiber optic cable, and the like. The reaction chambers can also include one or more ports for removing the reaction product. The one or more ports can be gated with, for example, a valve, or the like.

The reaction chamber can be configured such that at least part of the reaction product can be circulated back into the reaction chamber for a repeated transesterification reaction to improve the efficiency of transesterifiable lipid in the feedstock.

The gaseous catalyst can be generated or produced in situ. The reaction chamber can be adapted to facilitate a reaction producing the gaseous catalyst. The gaseous catalyst can be generated or produced in a separate vessel and delivered to the reaction chamber. Merely by way of example, gaseous HCl can be produced by brought into contact $H_2SO_4$ and NaCl in the reaction chamber or in a separate vessel.

The system can include a vessel connected to the reaction chamber via a closable fluid connection. The vessel can include at least one separator, one vaporizer, or the like. Different components of the reaction product can be separated in the vessel. The separation can be performed by, for example, fractional distillation, phase separation, or the like, or a combination thereof. Merely by way of example, the unreacted alcohol and/or catalyst can be distilled and/or otherwise separated. The separated unreacted alcohol and/or catalyst may or may not be condensed. The separated unreacted alcohol and/or catalyst may or may not be stored, e.g. in a storage tank. The separated unreacted alcohol and/or catalyst can be reused in the transesterification reaction. The reaction product including the first component comprising the transesterified fatty acid alkyl ester, and/or the second component comprising a glycerol, a protein, or other non-convertible matter, or a combination thereof, can exit the vessel and be further processed. As one example, the reaction product including the first component and the second component can exit through the same port as a mixture, wherein the mixture can be further processed to separate the first component and the second component. As another example, the reaction product can include a first phase including the first component comprising the transesterified fatty acid alkyl ester, and a second phase including the second component comprising a glycerol, a protein, or other non-convertible matter, or a combination thereof, wherein the first phase can be immiscible with the second phase. The first phase including the first component and the second phase including the second component can exit the vessel from separate ports. The reaction product exiting from the vessel can be further processed by, for example, further fractional distillation, phase separation, purification, a catalyzed processing, or the like, or a combination thereof, or can be stored in a storage tank.

The vessel can include a container, for example, a tube, cartridge, pipe, chamber, vat, tank, bag, bladder, balloon, liner, or the like. The vessel can be in the shape essentially of a cylinder, a cube, a rectangular solid, a pyramid, a cone, a sphere, or the like, or a portion thereof, or a combination thereof. Merely by way of example, the vessel can be in the shape essentially of a cylinder in the middle part and a half sphere at the top. As used herein, the shape does not indicate the orientation of the vessel.

The vessel can be of any suitable volume, for example, smaller than about 1 mL, from about 1 mL to about 100 mL, or from about 100 mL to about 250 mL, or from about 250 ml, to about 500 mL, or from about 500 mL to about 1 L, or from about 1 L to about 10 L, or from about 10 L to about 100 L, or from about 100 L to about 250 L, or from about 250 L to about 500 L, or from about 500 L to about 1000 L, or from about 1000 L to about 5000 L, or from about 5000 L to about 10,000 L, or from about 10,000 L to about 50,000 L, or from about 50,000 L to about 100,000 L, or from about 100,000 L to about 250,000 L, or larger than about 250,000 L.

The vessel can be made of a metal, glass, plastic, an alloy, or the like, or a combination thereof. The metal can include at least one material selected from stainless steel, aluminum, or the like, or a combination thereof. Merely by way of example, the metal can be SS316. The vessel can include a coating on at least part of its interior surface. As used herein, the interior surface of the vessel can refer to its surface facing inside of the vessel. The interior surface can be in direct contact with the reaction product, or can be separated from the reaction product by its coating. The coating can include a material selected from glass, plastic, ceramic, fiber glass, Teflon, or the like, or a combination thereof. The interior surface of the vessel or its coating can have the properties of, for example, essentially non-reactivity with the reaction product, corrosion resistance, heat insulation, or the like, or a combination thereof. The vessel can include a coating on at least part of its exterior surface. As used herein, the exterior surface of the vessel can refer to its surface facing outside of the vessel. The exterior surface can be in direct contact with the ambient surrounding the vessel, or can be separated from the ambient by its coating. The coating can include a material selected from glass, plastic, ceramic, fiber glass, Teflon, or the like, or a combination thereof. The exterior surface of the vessel or its coating can have the properties of, for example, essentially non-reactivity with the ambient, corrosion resistance, heat insulation, or the like, or a combination thereof.

The vessel can comprise an apparatus to achieve the desired temperature within the vessel. The apparatus can include, for example, a jacket, a cavitation (or vacuum), a heater, or the like, or a combination thereof. The apparatus can be similar to that described above regarding the reaction chamber.

The pressure within the vessel can be controlled by, for example, temperature within the vessel, a pressure pump, pressure and/or flowrate of the reaction product entering and/or exiting the vessel, or the like, or a combination thereof.

The vessel can include sealable ports through which can pass, for example, tubing, wiring, fiber optic cable, sampling devices, liquid, solids, gases, or the like. The ports can be gated with, for example, a valve, or the like. The flow through the ports can be controlled. The control of the ports can be synchronized. At least some of the ports can be controlled independently from the other ports. The location of a port can be chosen depending on the properties of the component(s) which can pass through. Merely by way of example, a port through which a component in gas form can pass can be located around the top portion of the vessel, while a port through which a component in liquid and/or solid form can pass can be located around the bottom portion of the vessel or below the gas/liquid interface.

The reaction product can exit the vessel driven by, for example, gravity, a pump, or the like, or a combination thereof. The reaction product can be filtered upon or after exiting the vessel. The filtration can be performed using, e.g. one or a series of filters. The component recovered by the filtration can be discarded, or can be used with or without further processing if a valuable composition, e.g. a protein, and/or carbohydrate, is present.

The system can include more than one vessel. Merely by way of example, the system can include 2, 4, 8, 16, 32, 64, or more such vessels. In certain embodiments the arrayed vessels can be interconnected via, for example, hollow tubing, electrical wiring, fiber optic cable, or the like, or a combination thereof. The vessels can also include one or more ports for removing the reaction product. The one or more ports can be gated with, for example, a valve, or the like. Some of the vessels can be in parallel connection and can perform the same function. Such parallel connected vessels can operate simultaneously, or alternately. Some of the vessels can be in serial connection and perform different functions. Merely by way of example, the vessel(s) in serial connection with but downstream from another vessel(s) can perform further processing, e.g. further purification, of the reaction product. The operation parameter in a vessel, including, for example, temperature, pressure, flowrate, or the like, or a combination thereof, can be chosen based on the specific function of the vessel.

The reaction chamber and at least one vessel can be in fluid communication via a closable and/or controllable fluid connection. If the system includes multiple vessels, at least some of the vessels can be in fluid communication with other vessels or the reaction chamber via a closable and/or controllable fluid connection. The closable and/or controllable fluid connection can be achieved by, for example, hollow tubing, electrical wiring, fiber optic cable, or the like, or a combination thereof. The closable and/or controllable fluid connection can include a coating on its interior surface and/or its exterior surface. As used herein, the interior surface can refer to the surface facing inside of the fluid connection. The interior surface can be in direct contact with the medium, e.g. the reaction product, the alcohol, the catalyst, or the like, or a combination thereof, flowing within the fluid connection, or separated from the medium by its coating. As used herein, the exterior surface can refer to the surface facing outside of the fluid connection. The exterior surface can be in direct contact with the ambient, or separated from the ambient by its coating. The coating can have the properties of, for example, essentially non-reactivity with the medium flowing in direct contact with the interior surface and/or the exterior surface of the fluid connection, corrosion resistance, enhancing or preventing heat dissipation, or the like, or a combination thereof. The coating can include at least one material selected from glass, plastic, ceramic, fiber glass, Teflon, or the like, or a combination thereof.

As one example, the system can comprise a reaction chamber, wherein the reaction chamber is adapted to facilitate a reaction among the reaction agents including the feedstock, the alcohol, and the gaseous catalyst producing a reaction product comprising unreacted alcohol, catalyst, a first component comprising a transesterified fatty acid alkyl ester, wherein the reaction chamber is in serial fluid communication with two separators in parallel connection, wherein the two separators are adapted to separate unreacted alcohol and catalyst from the reaction product, wherein the two separators are in serial fluid communication with a vessel for storing unreacted alcohol and catalyst, wherein the two separators are in serial fluid communication with two vaporizers in parallel connection, wherein the two vaporizers are adapted to separate the first component from the reaction product, wherein the two vaporizers are in serial fluid communication with a vessel for storing the first component, and wherein the two vaporizers are in serial fluid communication with a vessel for storing the rest of the reaction product. The advance of the reaction product from one vessel to another with which it is in fluid communication can be driven by, for example, gravity, a pump, or the like, or a combination thereof.

As another example, the system can comprise a reaction chamber, wherein the reaction chamber is adapted to facilitate a reaction among the reaction agents including the feedstock, the alcohol, and the gaseous catalyst producing a reaction product comprising unreacted alcohol, catalyst, a first component comprising a transesterified fatty acid alkyl ester in a first phase, and a second component in a second phase, wherein the reaction chamber is in serial fluid communication with two separators in parallel connection, wherein the two separators are adapted to separate unreacted alcohol and catalyst, the first component in the first phase and the second component in the second phase, wherein the two separators are in serial fluid communication with a vessel for storing unreacted alcohol and catalyst, wherein the two separators are in serial fluid communication with two vaporizers in parallel connection to which the first component in the first phase advances, wherein the two separators are in serial fluid communication with a vessel to which the second component in the second phase advances, wherein the two vaporizers are adapted to further purify the first component in the first phase, wherein the two vaporizers are in serial fluid communication with a vessel for storing the purified first component. The advance of the reaction product from one vessel to another with which it is in fluid communication can be driven by, for example, gravity, a pump, or the like, or a combination thereof.

The system can include at least one condenser. A gaseous component generated in fractional distillation can be conduced in the condenser. The condenser can include a coolant, e.g. water, oil, or the like, or a combination thereof. The coolant can be recycled or not. The operational parameters, for example, temperature, pressure, flowrate of the component(s) to be condensed, and flowrate of the coolant, can be chosen depending on the properties of the component(s) to be condensed and/or separated.

The system can include a control system. The operation parameters of the process, including the flow rate of the feedstock, temperature, and/or pressure, and/or duration of the contacting and any other features involved with the process (e.g. mixing, separating, distilling), the flow rate of the reaction product, or the like, or a combination thereof, can be controlled by a controller. The controller can include a memory. The memory can store the operation parameters preselected by a user, real-time operation parameters, real-time parameters regarding the intermediate products or final products, preselected rules, or the like, or a combination thereof. The controller can control the process based on the pre-selected and/or stored operation parameters. The controller can include input and/or output apparatus. Merely by way of example, the input apparatus can include, for example, a keyboard, a input port configured to receive data from outside, or the like, or a combination thereof. The output apparatus can include, for example, a screen, a printer, an alarm, an output port connected or configured to output data (e.g. operation parameters) to another device (e.g. a centralized and/or remote control center) or the like, or a combination thereof. The controller can receive instructions from, for example, a keyboard, a centralized and/or remote control center, or the like. The controller can receive data, e.g. quality and/or quantity of the reaction product. The controller can include a processor, e.g. a CPU. The processor can processes the instructions and/or data received by the controller. The processor can modify the operation parameters of the process based on a preselected and/or stored rules. The rules can include, for example, when or by how much to increase or decrease the temperature and/or pressure at which the mixing is performed based on the final product quality and/or quantity, and/or based on an instruction received from the input apparatus, when or by how much to increase or decrease the flow rate of the feedstock based on the final product quality and/or quantity, and/or based on an instruction received from the input apparatus, when or by how much to increase or decrease the frequency and/or strength of the mixing based on the final product quality and/or quantity, and/or based on an instruction received from the input apparatus, or the like, or a combination thereof. The controller can be connected to a centralized and/or remote control center or other data source by a cable, WiFi, Bluetooth, or the like, or a combination thereof.

Embodiments of the present application are further illustrated by the following examples.

EXAMPLES

The following non-limiting examples are provided to further illustrate embodiments of the present application. It should be appreciated by those of skill in the art that the techniques disclosed in the examples that follow represent approaches discovered by the inventors to function well in the practice of the application, and thus can be considered to constitute examples of modes for its practice. However, those of skill in the art should, in light of the present disclosure, appreciate that many changes can be made in the specific embodiments that are disclosed and still obtain a like or similar result without departing from the spirit and scope of the application.

Example 1

Method of Growing Algae and Processing Feedstock

Six shallow, parallel troughs oriented from north to south are prepared by hand using shovels. The total length of each of the troughs is approximately 100'. The total area used in the example is approximately 50' by 100'. Into each trough is placed an unfilled 100' bioreactor pipe extruded from polyethylene plastic.

Prepared media is added to the bioreactor pipes until the bioreactor pipes are substantially full. Urea is used as a nitrogen source, and a urease enzyme is added as well. The bioreactor pipes are inoculated by opening the valve located between a "nursery" bioreactor and the bioreactor pipes. The algal strain used for inoculation is *Pseudochlorococcum* sp.

The culture is allowed to grow until growth slows, as indicated by an increase in turbidity as well as a plateau in cell counts per mL of culture. About 5000 L of algal culture is then centrifuged at about 5 k rpm for about 10 minutes to pellet the algal bodies. The pelleted algal bodies are removed and dried, and the TG content of the resulting feedstock is determined.

About 0.1 $m^3$ of the dried algal biomass is added to an about 1000 L reaction chamber. The chamber is surrounded by a water jacket connected to a pump and a heating element, which are used to raise the chamber to a temperature of about 55° C.

Catalyst (HCl) is prepared by bubbling 100% HCl from a cylinder into 1% N anhydrous methanol, and the methanol/HCl is then added to the reaction chamber in a ratio of 6 parts catalyst to 1 part of the dried algal biomass.

The reaction chamber is maintained at about 55° C. for about 4 hours, then the reaction product is filtered and transferred via hollow tubing to a water jacketed chamber for a distillation step. The solids retained by the filter consist of biomeal with a protein content approaching about 65% of the initial algal biomass. This biomeal is dried and can be used as feed.

The separated reaction product is heated to about 65° C. inside the water-jacketed chamber. This distillation step is performed to remove the methanol/HCl, which is recovered and can be reused in subsequent reactions.

Following the distillation step, the chamber containing the filtered reaction product is cooled to about 25° C. Petroleum ether is added at a ratio of 5 parts ether to 1 part of the filtered reaction product. This mixture is incubated at room temperature for about 4 hours to extract the biodiesel.

Following the incubation step, the supernatant (containing the biodiesel) is removed and heated to about 60° C. to remove the petroleum ether, which can be reused in subsequent reactions.

The residual solution is biodiesel, and can be evaluated via FAME (Fatty Acid Methyl Ester) analysis to determine its specific chemical profile.

Example 2

Method of Processing Algal Feedstock

Referring to FIG. 1, the biomass feedstock is added to two 5 L reaction chambers (10) (upper left). The chambers are jacketed to allow for the flow of heated water around the reaction chamber to maintain a constant reaction temperature.

After the reaction is complete, the chambers are drained from their lower ends, with the drain tubes (15) coming together in a Y-connector (20). The reaction product is drained to the distillation vessel (30) (middle-left of FIG. 1) where the temperature of the reaction product is raised to distill off the methanol/HCl catalyst. The catalyst is collected (middle-right of FIG. 1) in a chilled chamber (40) for re-use.

Following distillation, petroleum ether is added to the reaction product (middle-left of FIG. 1) via a 3-way adaptor (50). After mixing, the material can drain out from the bottom of the distillation vessel (30), through a condenser tube (60), through a Buchner filter, and into a collection flask (70) (bottom of FIG. 1).

The material is then transferred into a rotovap (80) (bottom-right of FIG. 1) to be evaporated, leaving the processed biodiesel product. About 10 microliters aliquot of the biodiesel product is added to about 500 microliters heptane containing methyl ester standard (C:15) and FAME analysis is performed with gas chromatography equipment.

Example 3

Method of Processing Ground Meat Feedstock

About 50 g of dried ground beef is added to about 100 mL of methanol. The mixture is stirred for about an hour at about 60° C. About 300 mL of 3N Methanol/HCl is added to the mixture, and the stirring continues for about 3 additional hours.

The reaction is then filtered through glass fiber filters and the resulting filtrate is heated to about 65° C. for about 15 minutes to "flash" evaporate the methanol and HCl.

About 150 mL of petroleum ether is added to the flashed reaction and mixed. After about 4 hours, the supernatant is removed and flash evaporated at about 70° C.+ to remove non-biodiesel material. About 10 microliters aliquot of the biodiesel product is added to about 500 microliters heptane containing methyl ester standard (C:15) and FAME analysis is performed with gas chromatography equipment.

Example 4

Method of Processing Yellow Grease Feedstock

About 50 g of yellow grease is added to about 100 mL of methanol. The mixture is stirred for about an hour at about 60° C. About 300 mL of 3N Methanol/HCl is added to the mixture, and the stirring continues for about 3 additional hours.

The reaction is then filtered through glass fiber filters and the resulting filtrate is heated to about 65° C. for about 15 minutes to "flash" evaporate the methanol and HCl.

About 150 mL of petroleum ether is added to the flashed reaction and mixed. After 4 hours, the supernatant is removed and flash evaporated at about 70° C.+ to remove non-biodiesel material. About 10 microliters aliquot of the biodiesel product is added to about 500 microliters heptane containing methyl ester standard (C:15) and FAME analysis is performed with gas chromatography equipment.

Example 5

Method for Fat Content Gravimetric Extraction

Below is an exemplary method for fat content gravimetric extraction.
1) Weigh out 1 g of sample and place into clean labeled 50 ml round bottom vials with PTFE Cap.
2) Add ~100 mg Pyrogallol to the sample.
3) Add 1.25 ml Ethanol to each sample and vortex well.
4) Add 5 ml 8.3 M Hydrochloric Acid to each sample and vortex well.
5) Place sample vials into a 70°-80° C. water bath for 15 minutes.
6) Vortex each vial and replace into 70°-80° C. water bath for 30 minutes.
7) Add 1.25 ml Ethanol to each sample and vortex well.
8) Place vials into freezer for 10 minutes to cool to room temperature.
9) Add 12.5 ml Diethyl Ether to each sample vial and hand shake for 20 seconds.
10) Add 12.5 ml Petroleum Ether to each sample vial and hand shake for 20 seconds.
11) Centrifuge vials at 1500 RPM for 2 minutes.
12) Set up clean funnels with a new cotton ball in each and beakers underneath.
13) Pipette the top layer from each sample vial through the cotton ball funnel into the beaker.
14) Add 7.5 ml Diethyl Ether to each sample vial and hand shake for 20 seconds.
15) Add 7.5 ml Petroleum Ether to each sample vial and hand shake for 20 seconds.
16) Centrifuge at 1500 RPM for 2 minutes.
17) Pipette the top layer from each sample into its respective funnel and beaker.
18) Add 7.5 ml Diethyl Ether to each sample vial and hand shake for 20 seconds.
19) Add 7.5 ml Petroleum Ether to each sample vial and hand shake for 20 seconds.
20) Centrifuge at 1500 RPM for 2 minutes.
21) Pipette the top layer from each sample into its respective funnel and beaker.
22) Rinse the funnel and cotton ball with Diethyl Ether.
23) Use a glass stir rod to squeeze out excess solvent.
24) Remove beaker from under funnel and pipette contents into a clean 50 ml volumetric flask.
25) Rinse the beaker with an 80% Petroleum Ether/20% Diethyl Ether Solution.
26) Pipette the beaker contents into the volumetric flask.
27) Continue rinsing the beaker and pipetting off the solvent solution until clear.
28) Add the solvent solution to just below the volume line of the flask.
29) Cap the flask and invert 6 times to mix evenly.
30) Leave flasks to sit for 20 minutes to equilibrate.
31) Weigh a clean labeled beaker and record the weight.

32) Aliquot 20 ml of sample from the volumetric flask into the pre-weighed beaker.
33) Place beaker onto a steam bath and completely evaporate ether.
34) Place evaporated beaker into a 100° C. oven for 30 minutes.
35) Place beaker into a dessicator and allow to cool to room temperature.
36) Weigh and record the beaker weight.

Calculation:

Beaker Postweight−Beaker Preweight=total fat weight
(Total fat weight/Sample start weight)×100=total fat %

Notes:
Beaker Postweight: the weight of the beaker with the completely evaporated crude lipid
Beaker Preweight: the weight of the clean, empty beaker
Sample start weight: the recorded weight of the dried algal biomass at the start of the extraction Example 6 includes an exemplary protocol for FAME analysis by GC/FID (gas chromatography/flame ionization detection). Examples 7-20 are the FAME analysis results on GLC to the reaction product of the single-step transesterification of various types of feedstock.

Example 6

Exemplary Protocol for Fame Analysis by GC/FID

Described below is an exemplary protocol for FAME analysis by GC/FID (gas chromatography/flame ionization detection). The FAME analyses were performed using the reaction product of the single-step transesterification of various types of feedstock. The results are shown in Examples 7-20.

1 Purpose
To analyze the carbon chains of Fatty Acid Methyl Esters after extraction via the AOAC Official Method 996.06, Fat (Total, Saturated, and Unsaturated) in Foods. Hydrolytic Extraction Gas Chromatographic Method. First Action 1996, Revised 2001.

2 Scope
Extracted samples are quantified by syringe injection onto the Agilent 6890 gas chromatograph with flame ionization detector (GC/FID). Fat is extracted with ether and then methylated to Fatty Acid Methyl Esters, FAMEs. These are quantitatively measured Total Fat is calculated as sum of individual fatty acids. Saturated and Monosaturated fats are calculated as sum of respective fatty acids (see Reference 8.1).

3 Prerequisites
3.1 Safety
See SOP 3126 Laboratory Procedures and Safety Baseline.
3.2 Equipment
Gas chromatograph, Agilent 6890, with flame ionization detector, GC/FID with Automatic Liquid Sampler.
Analytical Column: Rt®-2560, 0.25 mm ID, 0.20 µm df, 100-Meter. Restek No. 35077
Guard Column: Restek Siltek-Deactivated Guard Columns>5 m length; 0.25 mm I.D.;
0.37 mm O.D. (plus or minus 0.04 mm) Restek No.: 10026
10 µl syringe for auto sampler
2 ml auto sampler vials for samples
2 ml auto sampler vials 100 µL inserts for standard components
11 mm BTO Septa, Restek No.: 27110

3.3 Chemicals
Calibration Standard: Food Industry FAME Mix mg/mL total in methylene chloride, 1 mL/ampul, Restek No 35077
Individual methylated and non methylated standards may be purchased for verification of commercial mix and, or preparation of custom calibration standards
Helium carrier gas 99.995%.
Hydrogen Gas for FID is generated with Parker Balston H2PEM series Hydrogen Generator.
Ultra Air for FID.
Nitrogen gas for detector makeup gas
Heptane for solvent exchange with standards and sample blanks
C15:0 Methyl Pentadecanoate Internal Standard, Restek No.: 35047

3.4 Other
Collection and Storage of Samples
Samples are injected directly from the FAME Extraction process. They may be stored for future analysis by storing, refrigerated at 4° C.

4 Definitions and Glossary

| | |
|---|---|
| FAMEs | Fatty acid methyl esters |
| GC | Gas Chromatograph |
| FID | Flame Ionization Detector |
| ESTD | External Standard Method |
| SS | Stainless Steel |
| mL | milliliter |
| µL | microliter |
| M | meter |
| G | grams |
| Wt | weight |
| µg | microgram |

5 Procedure
5.1. Completion of Fame Extraction Procedure
5.2. Conditions for Agilent GC Analysis of FAMEs

| | |
|---|---|
| ☐ Instrument | Agilent 6890 GC. |
| ☐ Detector | FID |
| ☐ Detector Temperature | 250° C. |
| ☐ Injector Temperature | 225° C. |
| ☐ Injector split flow | 30:1 |
| ☐ Total Flow | 35.9 ml/min. |
| ☐ Initial helium flow | 1.2 mL/min (constant flow) |
| ☐ Calibration Method | External Standard or Internal Standard |
| ☐ Oven Temperature | 100 C. (4 min)->240 C. @3 C./min (10 min) |
| ☐ Carrier Gas | Helium |
| ☐ Detector Air | 400 mL/min. |
| ☐ Detector Hydrogen | 30 mL/min |
| ☐ Makeup for FID | Nitrogen @ 30.0 mL/min |
| ☐ Column | Rt ®-2560, 0.25 mm ID, 0.20 µm film thickness, 100-Meter. Restek No. 35077 |
| ☐ Guard Column | Restek Siltek-Deactivated Guard Columns >1 meter length; 0.25 mm I.D.; 0.37 mm O.D. (plus or minus 0.04 mm) Restek No.: 10026 |
| ☐ Injection volume | 2 µl |
| ☐ Auto Injector washes | 2 times with Heptane wash |
| ☐ Syringe Size | 10. micro liters |

5.3. Standards are prepared by dilution of the 37 component Restek standard with heptane as the diluent (see section 9). This should be completed as a calibration run once per month with all standards except Level 3 with 'Replace' under 'Update RF' and 'No Update' under 'Update RT' on the sequence table. Level 3 should have 'Replace' selected under both RF and RT columns.

Make Sure the Method Retains the Following Parameters 5.4. Click 'Method', 'Edit Entire Method'. Leave all four sections checked. Click OK.
5.5. Under 'Method Comments', enter the following, then click OK:
FAME analysis with 37 compounds.
AOAC Method 996.06 Standard
Column RT 2560 100 m ID 0.2 µm
100° C. (4 min)→240° C. @ 3° C./min (10 min)
2 injections 225° C. FID 250° C.
5.6. Under 'Select Injection Source/Location', click 'GC Injector' and 'Front'. Click OK.
5.7. 'Instrument Setpoints' should be identical to Section 5.2 Conditions. Click 'Apply' then 'OK'.
5.8. Under 'Signal Details', select 'FID1A,' from the drop down list or click 'Insert Line' to manually enter, and click 'Add to Method'. Scroll over to 'Align' and enter 'No Alignment'. Click OK.
5.9. Under 'Edit Integration Events', leave 'Manual Events' unchecked. Under 'Integration Events', enter the following:

| Tangent Skim Mode | | Standard |
|---|---|---|
| Tail peak Skim Height Ratio | | 0 (zero) |
| Front peak Skim Height Ratio | | 0 (zero) |
| Skim valley ratio | | 20.00 |
| Baseline correction | | Advanced |
| Peak to valley ratio | | 500.00 |
| Events Table | | FID1A specific |
| Initial | Slope Sensitivity | 0.5499 |
| Initial | Peak width | 0.0566 |
| Initial | Area reject | 2 |
| Initial | Height reject | 0.0812 |
| Initial | Shoulders | OFF |
| 9.00 | Integration | OFF |
| 11.450 | Integration | ON |

5.10. Under 'Specify Report':
Destination—check Screen and File; File Prefix=031109;
File Type=.XLS
Quantitative Results—Calculate=ESTD, Based On=Area, Sorted By=RT
Style—Repeat Style=FAME NO CAL, check Add Summed Peaks Table,
Report Layout for uncalibrated peaks→check 'with calibrated peaks'
5.11. Under 'Calibration Settings':

| Use sample data - from Datafile | | | |
|---|---|---|---|
| Default RT Windows | | | |
| Reference peak | 0.00 | | +5 |
| Other peaks | 0.00 | | +5 |
| Default Calibration Curve | | | |
| Type | Linear | | |
| Origin | Include | | |
| Weight | Equal | | |

Calculate Uncalibrated Peaks
For Signal FID1A; check partial calibration
Check 'with RSP fact' 7.67450e-1 (oleic acid)
ISTD Correction
Check 'use multiplier and dilution factor with ISTDs and check 'yes' on the last line 5.12. The Calibration Table should have retention times matching the times on the table in Section 9.
5.13. Under 'Runtime Checklist: Instrument 1', check 'Data Acquisition' and 'Standard Data Analysis'. Everything else should remain unchecked and/or blank.
5.14. Under 'Method', click 'Save Method'.
NOTE: When running a sequence, the SAME method CAN be selected for each vial listed in the table.

Running the Sequence 5.15. From the 'Method and Run Control' tab, click 'Sequence' then 'New Sequence'. Return to 'Sequence' and click 'Save Sequence As'. Name the sequence as the day's date (9-8-09 or 20090809). Return to 'Sequence' and click 'Sequence Table'.
5.16. The first autosampler vial position should be a blank consisting of 1 ml of Heptane. The 'Vial' field refers to the position of the current vial on the autosampler tray. Enter Heptane Blank as the sample name. Copy the 'Sample Name' into the 'Datafile' field. They should always match. Select the current working method in the 'Method Name' drop-down menu. 'InjVial' should always be 1. All other fields will remain blank.
5.17. The second position should be a Level 3 Calibration Standard. Copy the 'Sample Name' into the 'Datafile' field. They should always match. Select the same working method as the Heptane Blank. 'InjVial' should always be 1. After entering the sample name in the 'Datafile' field, change the 'Sample Type' to 'Calibration'. Enter '3' in the 'Cal Level' field, 'No Update' under 'Update RF' and 'Replace' under 'Update RT'. This is how this standard will always appear in a sequence with unknown samples. This standard is always run with a sequence of unknown samples.
5.18. The third position will be the first sample. Enter the next vial position number, the sample name (typically the tracking number), same method as blank and standard, injection number, sample selected under 'Sample Type' and copy the sample name into the 'Datafile' field. Above the sequence is a 'Sample Info' box. This is where additional information about the sample is to be entered, such as harvest date, experiment name, species, etc.
5.19. Continue entering the samples on the table and click OK.
5.20. From 'Sequence', click 'Save Sequence'.
5.21. Return to the sequence table and click 'Run Sequence'.

Standard Calibration Runs 5.22. Standards are prepared by dilution of the 37 component Restek standard with heptane as the diluent (see section 9). This should be completed as a calibration run once per month with all standards except Level 3 with 'Replace' under 'Update RF' and 'No Update' under 'Update RT' on the sequence table. Level 3 should have 'Replace' selected under both RF and RT columns.

6 Calculations 6.1 Quantification is performed by comparison of peak height or peak area of the sample to the standard. Once the standard is run, calibrate the instrument by ESTD (external standard method). Or add internal standard C 15:0 for internal standard calculation by the ChemStation software program (Agilent).

6.2 To determine concentration by response ratio, response of sample/response of standard is calculated by concentration and the response of the detector to calculate the area of the peak.

Standard Curve can bracket the concentration of samples with at least three standards.

Using the formula y=mx+b., calculate the concentration of each sample.

x=independent variable, m=slope, b=constant

Concentration=(Peak Area)×(X Coefficient)+(Constant)

6.3 Calculations of FAMES convert μg quantities to percent of total fat as FAME.

Hydrolysis products of fatty acids that are not identified by known standards are included in the calculations as unknown fatty acids.

Note: Obtain Copy of Report Template from Instrument P.O.C.

Total Fat (gravimetric)=% recovery of oil from algae

| Algae (mg) | Empty Beaker (mg) | Beaker with Oil (mg) | % Recovery |
|---|---|---|---|
| 1.0018 | 113.3841 | 113.4480 | 15.95% |

$$= \frac{\text{(net wt. of beaker with oil)}}{(2/5)/\text{Algae Wt.} * 100}$$

6.2.1 % FAME in Total Fat=μg lipid/mL heptane÷ FAME as μg/mL μg lipid/mL heptane=(net wt. of beaker with oil /2*1000/15 mL heptane)* 1000

| Algae (mg) | Empty beaker (mg) | Beaker with oil (mg) | Total Fat % recovery | ug lipid/mL heptane | FAME as μg/mL | % FAME in Total Fat |
|---|---|---|---|---|---|---|
| 1.0018 | 113.3841 | 113.4480 | 15.95% | 2130.00 | 1505.983 | 70.70% |

*FAME as μg/mL obtained from cell I233 of Report Template Calculations Tab after peak areas have been calculated 6.2.2 % Total Fat as FAME=Total Fat %÷% FAME in Total Fat*100=15.95÷70.70*100=11.27%

| Total Fat (% recovery) | % FAME in Total Fat | Total Fat as FAME |
|---|---|---|
| 15.95% | 70.70% | 11.27% |

6.2.3 Calculate % of total μg/ml FAMEs per AOAC method (Reference 8.1).

7 Data Recording 7.1. Log data for standard preparation into notebook. Sign and date all chromatograms, referencing notebook and page number.

7.2. Data is kept electronically on excel spreadsheet with graph of standard curve and data correlating % ethanol production with time course of the experiment.

8 References 8.1. Official Method 996.06, Fat (Total, Saturated, and Unsaturated) in Foods.
Hydrolytic Extraction Gas Chromatographic Method. First Action 1996, Revised 2001.

8.2. Instrument Manual and Downloads available from Agilent on website: http://www.agilent.com.

9 Notes

Table of FAME Compounds with Retention Times and Elution Order

| FAME and Fatty Acid Order of Elution | Retention Time (min.) |
|---|---|
| C4:0 Butyric | 11.606 |
| C6:0 Caproic | 13.578 |
| C8:0 Caprylic | 16.978 |
| C10:0 Capric | 21.672 |
| C11:0 Undecanoate | 24.233 |
| C12:0 Laurate | 26.845 |
| C13:0 Tridecanoate | 29.367 |
| C14:0 Myristate | 31.865 |
| C14:1 Myristoleate (cis-9) | 33.801 |
| C15:0 Pentadecanoate Int'l Std | 34.207 |
| C15:1 Pentadecanoate (cis-10) | 36.112 |
| C16:0 Palimitate | 36.557 |
| C16:1 Palimitoleate (cis-9) | 38.038 |
| C17:0 Margaric | 38.664 |
| C17:1 Margaroleic (cis-10) | 40.158 |
| C18:0 Stearate | 40.825 |
| C18:1 Elaidate (trans-9) | 41.669 |
| C18:1 Oleic (cis-9) | 42.080 |
| C18:2 Linoelaidate (trans-9, 12) | 43.063 |
| C18:2 Linoleate (cis-9, 12) | 43.930 |
| C20:0 Arachidate | 44.771 |
| C18:3 gamma-linolenate (cis-6, 9, 12) | 45.327 |
| C20:1 Eicosenoate (cis-11) | 45.870 |
| C18:3 alpha Linolenate (cis-9, 12, 15) | 46.078 |
| C21:0 Heneicosanoate | 46.592 |

-continued

Table of FAME Compounds with Retention Times and Elution Order

| FAME and Fatty Acid Order of Elution | Retention Time (min.) |
|---|---|
| C20:2 Eicosadienoate (cis-11, 14) | 47.641 |
| C22:0 Behenate | 48.460 |
| C20:3 Eicosatrienoate (cis-11, 14, 17) | 48.945 |
| C22:1 Erucate (cis-13) | 49.463 |
| C20:3 Eicosatrienoate (cis-8, 11, 14) | 49.666 |
| C20:4 Arachidonate (cis-5, 8, 11, 14) | 49.921 |
| C23:0 Tricosanoate | 50.124 |
| C22:2 Docosadienaote (cis-13, 16) | 51.109 |
| C24:0 Lignocerate | 51.737 |
| C20:5 Eicosapentaenote (cis-5, 8, 11, 14, 17) | 52.041 |
| C24:1 Nervonate (cis-15) | 52.876 |
| C22:6 Docosahexaenoate (cis-4, 7, 10, 13, 16, 19) | 56.907 |

| Standard Dilution Using Restek No 35077 FAME Mixture with 37 Compound | | | | | | |
|---|---|---|---|---|---|---|
| μL Standard | 100 | 50 | 25 | 15 | 5 | 2 |
| μL Heptane | 0 | 50 | 75 | 90 | 95 | 98 |
| μL Total | 100 | 100 | 100 | 105 | 100 | 100 |

| | | 1X Dilution μg/mL | 2X Dilution μg/mL | 4X Dilution μg/mL | 8X Dilution μg/mL | 16X Dilution μg/mL | 32X Dilution μg/mL |
|---|---|---|---|---|---|---|---|
| Original concentration | mg/mL | | | | | | |
| 4% | 12 | 1200.0 | 600.0 | 300.0 | 171.4 | 60.0 | 24.0 |
| 2% | 0.6 | 600.0 | 300.0 | 150.0 | 85.7 | 30.0 | 12.0 |
| 6% | 1.8 | 1800.0 | 900.0 | 450.0 | 257.1 | 90.0 | 36.0 |

1X = Level One Calibration Standard
2X = Level Two Calibration Standard
4X = Level Three Calibration Standard (always run with the sample sequence)
8X = Level Four Calibration Standard
16X = Level Five Calibration Standard
32X = Level Six Calibration Standard

Example 7

Method of Processing Algal Feedstock

About 50 g of dried algal biomass including *chlorella* crude algae oil was added to about 100 mL of methanol. The mixture was stirred for about an hour at about 60° C. About 300 mL of about 3N Methanol/HCl was added to the mixture, and the stirring continued for about 3 additional hours.

The reaction was then filtered through glass fiber filters and the resulting filtrate was heated to about 65° C. for about 15 minutes to "flash" evaporate the methanol/HCl. The retained algal bodies (biomeal) were collected for use as a high-protein food product. The nutritional profile of a representative sample of the biomeal is shown in Table 1. The profile shows the similarity between the biomeal and several common animal food supplements, including soybean meal and fish meal.

TABLE 1

Nutritional profile of a representative sample of the biomeal

| Essential Amino Acid | FM (64.5%) | AM (63%) | PBM (59.7%) | BM (89.2%) | SBM (50.0%) |
|---|---|---|---|---|---|
| Arginine | 3.82 | 3.73 | 4.06 | 3.75 | 3.67 |
| Histidine | 1.45 | 1.10 | 1.09 | 5.14 | 1.22 |
| Isoleucine | 2.66 | 2.59 | 2.30 | 0.97 | 2.14 |
| Leucine | 4.48 | 5.96 | 4.11 | 10.82 | 3.63 |
| Lysine | 4.72 | 3.72 | 3.06 | 7.45 | 3.08 |
| Methionine + Cystine[3] | 2.31 | 2.10 | 1.94 | 2.32 | 1.43 |
| Phenylalanine + Tryosine[4] | 4.35 | 5.99 | 3.97 | 8.47 | 4.20 |
| Threonine | 2.31 | 3.34 | 0.94 | 3.76 | 1.89 |
| Tryptophan | 0.57 | 0.77 | 0.46 | 1.04 | 0.69 |
| Valine | 2.77 | 4.65 | 2.86 | 7.48 | 2.55 |

Percentage of essential amino acids (EAA) in fishmeal (FM), PetroAlgae meal (AM), poultry by-product meal (PBM), blood meal (BM), soybean meal (SBM). Percentage of crude protein in the meal is shown in parenthesis.
[1]The percentage values for the EAA composition of each feedstuff were taken from the 1993 NRC (National Research Council, Nutrient Requirements of Fish, National Academy of Sciences, Washington, DC).
[2]Percentage of total crude protein in feedstuff.
[3]Cystine can be synthesized from methionine.
[4]Tyrosine can be synthesized from phenylalanine.

Figure 2:
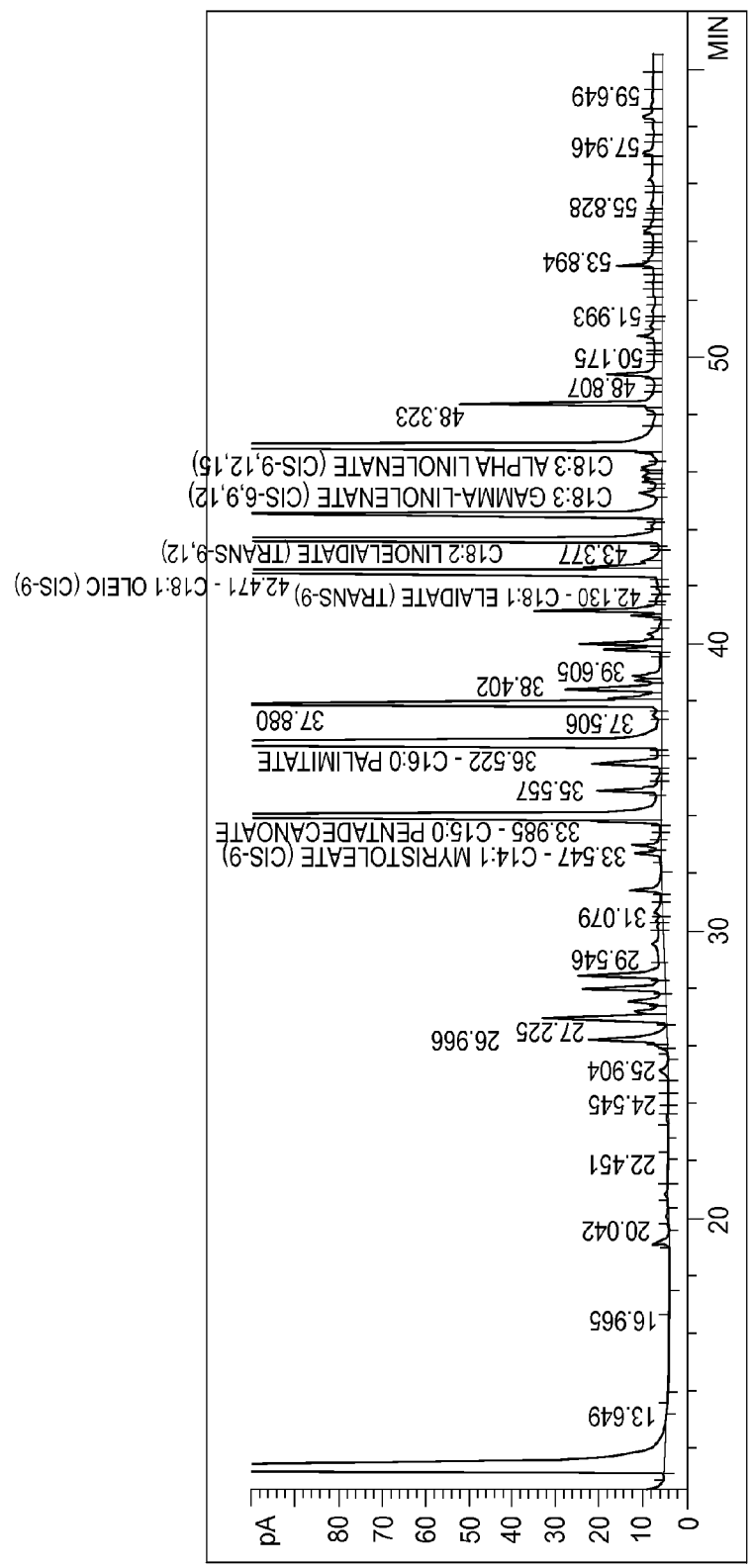
FIG. 2 shows FAME (Fatty Acid Methyl Ester) data derived from biodiesel produced with a single-step transesterification of algae feedstock.

About 150 mL of petroleum ether was added to the flashed reaction and mixed. After 4 hours, the supernatant is removed. This material was then flash evaporated at about 70° C. to remove non-biodiesel material. About 10 microliters aliquot of the biodiesel product was added to about 500 microliters heptane containing methyl ester standard (C:15) and FAME analysis was performed with gas chromatography equipment. The obtained FAME data (shown in FIG. 2 and Table 2) shows the chemical profile of the biodiesel produced.

TABLE 2

Compound identification of peaks in FAME analysis on single-step transesterification of algae feedstock

| # | Compound Name | ug/mL | RT | Pk Area |
|---|---|---|---|---|
| 1 | C4:0 Butyric | 6.089 | 10.922 | 2.32 |
| 2 | | 1.683e5 | 11.159 | 100311.41 |
| 3 | C6:0 Caproic | 0.000 | 0.000 | 0.00 |
| 4 | | 0.802 | 13.649 | 0.47 |
| 5 | C8:0 Caprylic | 0.000 | 0.000 | 0.00 |
| 6 | | 4.192 | 16.965 | 2.49 |
| 7 | | 51.446 | 19.106 | 30.65 |
| 8 | | 14.933 | 20.042 | 8.89 |
| 9 | C10:0 Capric | 5.025 | 20.741 | 11.28 |
| 10 | | 6.215 | 21.411 | 3.70 |
| 11 | | 3.082 | 22.451 | 1.83 |
| 12 | C11:0 Undecanoate | 2.650 | 23.427 | 5.38 |

TABLE 2-continued

Compound identification of peaks in FAME analysis on single-step transesterification of algae feedstock

| # | Compound Name | ug/mL | RT | Pk Area |
|---|---|---|---|---|
| 13 | | 3.643 | 23.730 | 2.17 |
| 14 | | 2.344 | 24.086 | 1.39 |

TABLE 2-continued

Compound identification of peaks in FAME analysis on single-step transesterification of algae feedstock

| # | Compound Name | ug/mL | RT | Pk Area |
|---|---|---|---|---|
| 15 | | 2.427 | 24.545 | 1.44 |
| 16 | | 43.145 | 25.143 | 25.71 |
| 17 | | 3.664 | 25.904 | 2.18 |
| 18 | C12:0 Laurate | 3.420 | 26.017 | 11.07 |
| 19 | | 382.819 | 26.197 | 228.14 |
| 20 | | 423.311 | 26.966 | 252.27 |
| 21 | | 129.976 | 27.225 | 77.45 |
| 22 | | 153.572 | 27.559 | 91.52 |
| 23 | | 321.040 | 27.986 | 191.32 |
| 24 | | 385.601 | 28.456 | 229.79 |
| 25 | C13:0 Trideconoate | 0.000 | 0.000 | 0.00 |
| 26 | | 163.613 | 29.546 | 97.50 |
| 27 | | 27.026 | 30.134 | 16.10 |
| 28 | | 34.651 | 30.345 | 20.65 |
| 29 | | 54.060 | 30.655 | 32.21 |
| 30 | | 11.869 | 31.079 | 7.07 |
| 31 | C14:0 Myristate | 54.722 | 31.391 | 74.64 |
| 32 | | 74.615 | 32.688 | 44.46 |
| 33 | | 89.074 | 32.953 | 53.08 |
| 34 | | 12.111 | 33.206 | 7.21 |
| 35 | C14:1 Myristoleate (cis-9) | 1.219 | 33.547 | 4.50 |
| 36 | | 113.122 | 33.823 | 67.41 |
| 37 | C15:0 Pentadecanoate | 2185.017 | 33.985 | 2799.31 |
| 38 | | 209.080 | 34.863 | 124.60 |
| 39 | | 21.564 | 35.282 | 12.85 |
| 40 | | 9.991 | 35.557 | 5.95 |
| 41 | | 268.585 | 35.805 | 160.06 |
| 42 | C15:1 Myristoleate (cis-10) | 5.668 | 36.233 | 10.00 |
| 43 | C16:0 Palimitate | 2324.362 | 36.522 | 3022.55 |
| 44 | | 42.815 | 37.506 | 25.51 |
| 45 | | 1410.514 | 37.880 | 840.59 |
| 46 | C16:1 Palimitoleate (cis-9) | 72.831 | 38.094 | 96.16 |
| 47 | | 259.408 | 38.402 | 154.59 |
| 48 | | 60.787 | 38.712 | 36.22 |
| 49 | C17:0 Margaric | 43.892 | 38.849 | 60.02 |
| 50 | | 9.153 | 39.381 | 5.45 |
| 51 | | 2.995 | 39.605 | 1.78 |
| 52 | | 148.575 | 39.809 | 88.54 |
| 53 | | 219.072 | 39.989 | 130.55 |
| 54 | | 63.992 | 40.318 | 38.13 |
| 55 | C17:1 Margaroleic(cis-10) | 2.116 | 40.612 | 5.89 |
| 56 | | 62.553 | 40.975 | 37.27 |
| 57 | C18:0 Stearate | 130.433 | 41.143 | 187.06 |
| 58 | | 13.727 | 41.400 | 8.18 |
| 59 | | 24.274 | 41.543 | 14.46 |
| 60 | | 20.930 | 41.903 | 12.47 |
| 61 | C18:1 Elaidate (trans-9) | 6.159 | 42.130 | 11.83 |
| 62 | C18:1 Oleic (cis-9) | 913.921 | 42.471 | 1231.22 |
| 63 | | 234.979 | 42.671 | 140.03 |
| 64 | | 60.839 | 42.894 | 36.25 |
| 65 | | 10.235 | 43.377 | 6.09 |
| 66 | C18:2 Linoelaidate (trans-9, 12) | 1219.658 | 43.580 | 1582.42 |
| 67 | | 44.651 | 44.084 | 26.61 |
| 68 | | 18.430 | 44.330 | 10.58 |
| 69 | C18:2 Linoleate (cis-9, 12) | 584.878 | 44.478 | 769.54 |
| 70 | | 63.144 | 45.234 | 37.63 |
| 71 | C18:3 gamma-linolenate (cis-6, 9, 12) | 1.490 | 45.451 | 13.39 |
| 72 | | 63.989 | 45.639 | 38.13 |
| 73 | | 63.259 | 45.814 | 37.69 |
| 74 | C20:0 Arachidate | 24.710 | 46.002 | 19.98 |
| 75 | | 80.188 | 46.109 | 47.78 |
| 76 | C20:1 Eicosenoate (cis-11) | 37.764 | 46.665 | 50.24 |
| 77 | C18:3 alpha Linolenate (cis-9, 12, 15) | 2927.596 | 46.863 | 3844.35 |
| 78 | C21:0 Heneicosanoate | 0.000 | 0.000 | 0.00 |
| 79 | | 85.136 | 47.630 | 50.72 |
| 80 | | 61.097 | 48.169 | 36.41 |
| 81 | | 529.433 | 48.323 | 315.51 |
| 82 | C20:2 Eicosadienoate (cis-11, 14) | 0.000 | 0.000 | 0.00 |
| 83 | | 47.340 | 48.807 | 28.21 |
| 84 | | 45.937 | 49.219 | 27.37 |
| 85 | C22:0 Behenate | 94.158 | 49.379 | 123.14 |
| 86 | C20:3 Eicosatrienoate (cis-8, 11, 14) | 14.957 | 50.019 | 23.38 |
| 87 | | 23.949 | 50.175 | 14.27 |
| 88 | | 42.609 | 50.302 | 25.39 |
| 89 | C22:1 Erucate (cis-13) | 0.000 | 0.000 | 0.00 |
| 90 | C20:3 Eicosatrienoate (cis-11, 14, 17) | 59.814 | 50.726 | 77.88 |
| 91 | C20:4 Arachidonate (cis-5, 8, 11, 14) | 26.240 | 51.062 | 36.72 |
| 92 | C23:0 Tricosanoate | 19.195 | 51.300 | 26.09 |
| 93 | | 67.508 | 51.570 | 40.23 |
| 94 | | 44.986 | 51.993 | 26.80 |
| 95 | | 48.336 | 52.235 | 28.80 |
| 96 | C22:2 Docosadienaote | 19.635 | 52.459 | 28.11 |
| 97 | | 42.966 | 52.665 | 25.60 |
| 98 | | 49.451 | 53.033 | 29.47 |
| 99 | C20:5 Eicosapentaenote (cis-5, 8, 11, 14, 1) | 4.878 | 53.181 | 77.63 |
| 100 | C24:0 Lignocerate | 91.130 | 53.386 | 44.09 |
| 101 | | 45.435 | 53.678 | 27.07 |
| 102 | | 36.443 | 53.894 | 21.71 |
| 103 | | 66.048 | 54.180 | 39.36 |
| 104 | C24:1 Nervonate (cis-15) | 41.153 | 54.374 | 51.12 |
| 105 | | 55.885 | 54.617 | 33.30 |
| 106 | | 47.120 | 54.822 | 28.08 |
| 107 | | 31.846 | 55.150 | 18.97 |
| 108 | | 127.794 | 55.289 | 76.15 |
| 109 | | 35.916 | 55.828 | 21.40 |
| 110 | | 178.313 | 56.142 | 106.26 |
| 111 | | 59.707 | 56.889 | 35.58 |
| 112 | | 130.312 | 57.073 | 77.65 |
| 113 | | 54.119 | 57.581 | 32.25 |
| 114 | | 87.584 | 57.946 | 52.19 |
| 115 | | 131.193 | 58.345 | 78.18 |
| 116 | C22:6 Docosahexaenoate (cis-4, 7, 10, 13, 1) | 83.452 | 58.716 | 91.83 |
| 117 | | 124.007 | 59.649 | 73.90 |
| 118 | | 141.770 | 60.428 | 84.48 |
| Tota | | 1.878e5 | | |

Example 8

FAME Analysis on Single-Step Transesterification of Crude Algae Oil Feedstock

Figure 3:
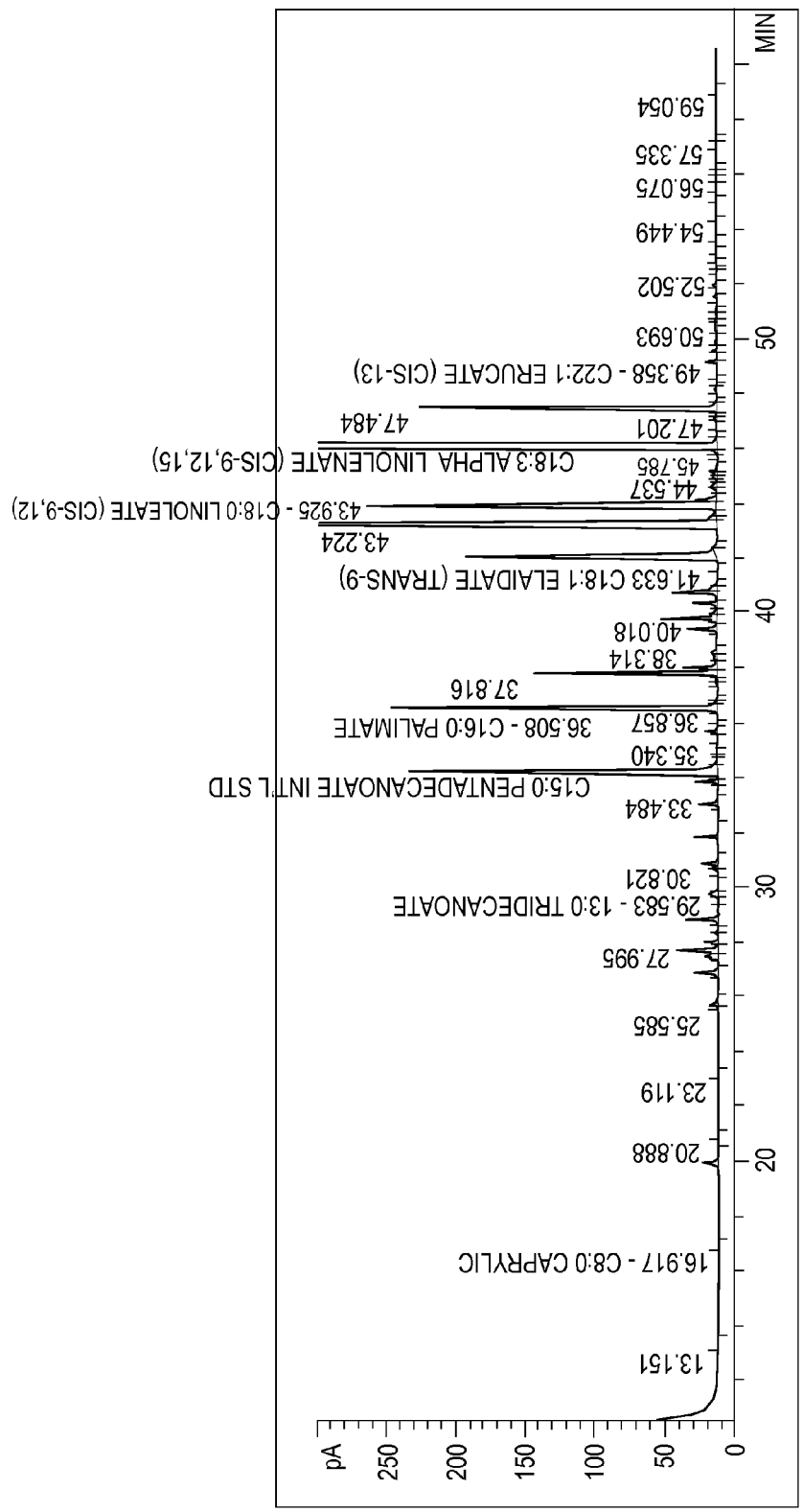
FIG. 3 shows FAME data derived from biodiesel produced with a single-step transesterification of crude algae oil feedstock.

Crude algae oil feedstock was processed similarly to that described in Example 6. FAME analysis was performed with gas chromatography equipment using the reaction product similarly to that described in Example 6. The obtained FAME data (shown in FIG. 3) shows the chemical profile of the biodiesel produced. The reaction product included polyunsaturated fatty acid methyl esters, indicating that the single-step transesterification process can convert phospholipids and neutral lipids.

Example 9

FAME Analysis on Single-Step Transesterification of Algae Oil Feedstock

Figure 4:
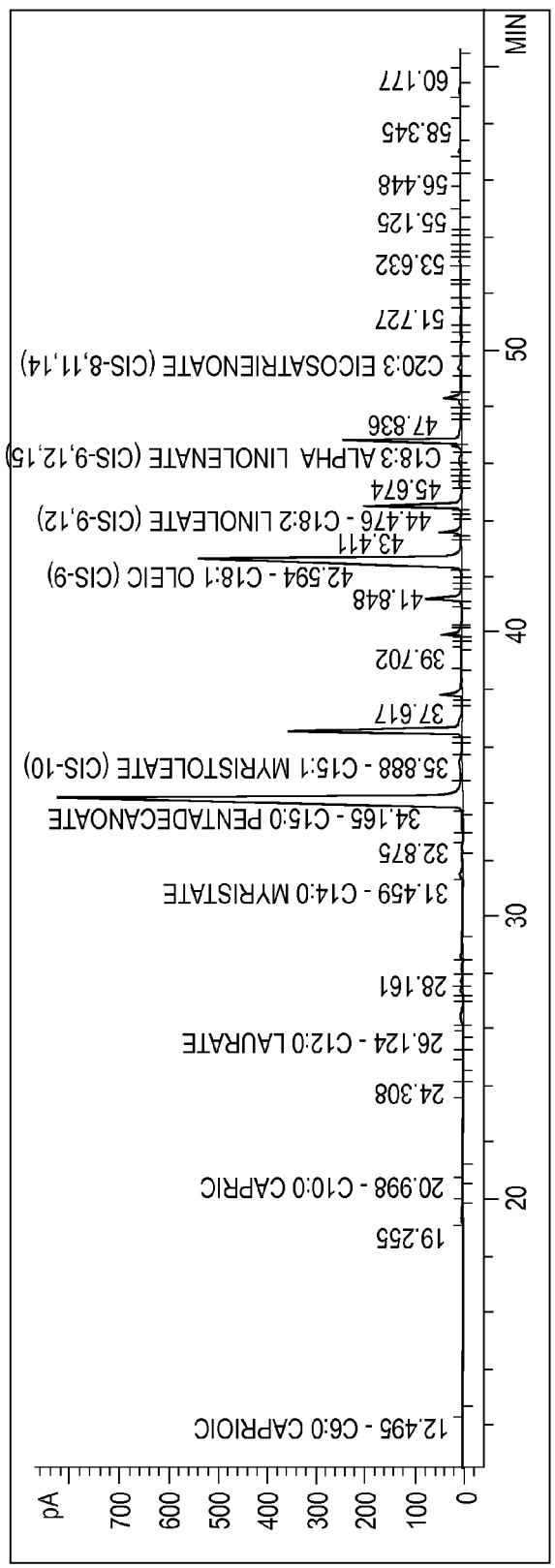
FIG. 4 shows FAME data derived from biodiesel produced with a single-step transesterification of algae oil feedstock.

Algae oil feedstock was processed similarly to that described in Example 6. FAME analysis was performed with gas chromatography equipment using the reaction product similarly to that described in Example 6. The obtained FAME data (shown in FIG. 4 and Table 3) shows the chemical profile of the biodiesel produced. The results indicate that the single-step transesterification process can convert algae oil feedstock.

TABLE 3

Compound identification of peaks in FAME analysis on single-step transesterification of algae oil feedstock

| # | Compound Name | ug/mL | RT | Pk Area |
|---|---|---|---|---|
| 1 | C4:0 Butyric | 0.000 | 0.000 | 0.00 |
| 2 | C6:0 Caproic | 0.000 | 12.495 | 0.38 |
| 3 | C8:0 Caprylic | 0.000 | 0.000 | 0.00 |
| 4 | | 65.991 | 19.255 | 39.32 |
| 5 | | 3.613 | 20.238 | 2.15 |
| 6 | C10:0 Capric | 0.00 | 20.998 | 1.00 |
| 7 | C11:0 Undecanoate | 0.056 | 23.969 | 2.34 |
| 8 | | 1.827 | 24.308 | 1.08 |
| 9 | | 12.063 | 25.259 | 7.18 |
| 10 | | 10.866 | 25.368 | 6.47 |
| 11 | C12:0 Laurate | 0.000 | 26.124 | 0.43 |
| 12 | | 103.055 | 26.498 | 61.41 |
| 13 | | 4.943 | 27.182 | 2.94 |
| 14 | | 70.634 | 27.384 | 42.09 |
| 15 | | 91.510 | 27.710 | 54.53 |
| 16 | | 59.063 | 28.161 | 35.19 |
| 17 | C13:0 Trideconoate | 43.330 | 28.607 | 61.45 |
| 18 | C14:0 Myristate | 45.858 | 31.459 | 63.76 |
| 19 | | 6.048 | 32.875 | 3.60 |
| 20 | | 33.242 | 33.098 | 19.81 |
| 21 | C14:1 Myrisoleate (cis-9) | 0.000 | 0.000 | 0.00 |
| 22 | C15:0 Pentadecanoate | 8694.183 | 34.165 | 11134.18 |
| 23 | | 207.505 | 34.944 | 123.66 |
| 24 | C15:1 Myristoleate (cis-10) | 15.195 | 35.888 | 21.72 |
| 25 | | 17.072 | 36.353 | 10.17 |
| 26 | C16:0 Palimitate | 2427.651 | 36.526 | 3156.41 |
| 27 | | 20.979 | 37.617 | 12.50 |
| 28 | C16:1 Palimitoleate (cis-9) | 289.869 | 37.832 | 369.43 |
| 29 | C17:0 Margaric | 22.348 | 38.928 | 31.74 |
| 30 | | 1.516 | 39.702 | 0.90 |
| 31 | | 12.155 | 39.861 | 7.24 |
| 32 | | 458.289 | 39.973 | 273.11 |
| 33 | | 20.263 | 40.257 | 12.07 |
| 34 | C17:1 Margaroleic(cis-10) | 17.617 | 40.356 | 25.73 |
| 35 | | 46.034 | 41.058 | 27.43 |
| 36 | C18:0 Stearate | 389.865 | 41.216 | 527.54 |
| 37 | | 19.100 | 41.632 | 11.38 |
| 38 | | 18.760 | 41.848 | 11.18 |
| 39 | C18:1 Elaidate (trans-9) | 31.263 | 42.213 | 44.51 |
| 40 | C18:1 Oleic (cis-9) | 4712.951 | 42.594 | 6315.56 |
| 41 | | 23.568 | 43.411 | 14.04 |
| 42 | C18:2 Linoelaidate (trans-9, 12) | 236.478 | 43.578 | 310.10 |
| 43 | | 30.189 | 44.132 | 17.99 |
| 44 | | 21.044 | 44.318 | 12.54 |
| 45 | C18:2 Linoleate (cis-9, 12) | 970.225 | 44.476 | 1273.94 |
| 46 | | 78.028 | 45.268 | 46.50 |
| 47 | C18:3 gamma-linolenate (cis-6, 9, 12) | 11.532 | 45.432 | 39.82 |
| 48 | | 32.126 | 45.674 | 19.14 |
| 49 | C20:0 Arachidate | 55.237 | 45.993 | 39.74 |
| 50 | | 103.625 | 46.089 | 61.75 |
| 51 | C20:1 Eicosenoate (cis-11) | 89.713 | 46.627 | 117.00 |
| 52 | C18:3 alpha Linolenate (cis-9, 12, 15) | 1126.086 | 46.770 | 1481.91 |
| 53 | C21:0 Heneicosanoate | 0.000 | 0.000 | 0.00 |
| 54 | | 22.705 | 47.635 | 13.53 |
| 55 | | 16.815 | 47.836 | 10.02 |
| 56 | | 81.532 | 48.143 | 48.58 |
| 57 | | 400.479 | 48.284 | 238.66 |
| 58 | C20:2 Eicosadienoate (cis-11, 14) | 23.758 | 48.584 | 35.04 |
| 59 | C22:0 Behenate | 42.294 | 49.376 | 53.65 |
| 60 | C20:3 Eicosatrienoate (cis-8, 11, 14) | 11.198 | 50.051 | 18.41 |
| 61 | C22:1 Erucate (cis-13) | 8.834 | 50.557 | 17.70 |
| 62 | C20:3 Eicosatrienoate (cis-11, 14, 17) | 6.104 | 50.732 | 9.49 |
| 63 | C20:4 Arachidonate (cis-5, 8, 11, 14) | 12.365 | 51.033 | 19.06 |
| 64 | C23:0 Tricosanoate | 0.000 | 0.000 | 0.00 |
| 65 | | 10.359 | 51.727 | 6.17 |
| 66 | | 16.911 | 52.186 | 10.07 |
| 67 | C22:2 Docosadienaote | 0.929 | 52.433 | 3.13 |
| 68 | | 21.117 | 52.600 | 12.58 |
| 69 | C20:5 Eicosapentaenote (cis-5, 8, 11, 14, 1) | 0.000 | 53.157 | 19.71 |
| 70 | C24:0 Lignocerate | 51.408 | 53.354 | 7.41 |
| 71 | | 7.249 | 53.632 | 4.32 |
| 72 | | 7.671 | 53.890 | 4.57 |
| 73 | | 4.036 | 54.174 | 2.40 |
| 74 | C24:1 Nervonate (cis-15) | 7.069 | 54.356 | 4.15 |
| 75 | | 1.805 | 55.125 | 1.07 |
| 76 | | 4.496 | 56.105 | 2.67 |
| 77 | | 2.503 | 56.448 | 1.49 |
| 78 | | 56.916 | 57.016 | 33.91 |
| 79 | | 3.352 | 58.345 | 1.99 |
| 80 | C22:6 Docosahexaenoate (cis-4, 7, 10, 13, 1) | 0.000 | 0.000 | 0.00 |
| 81 | | 24.695 | 59.108 | 14.71 |
| 82 | | 8.983 | 60.117 | 5.35 |
| Tota | | 2.161e4 | | |

Example 10

Figure 5:
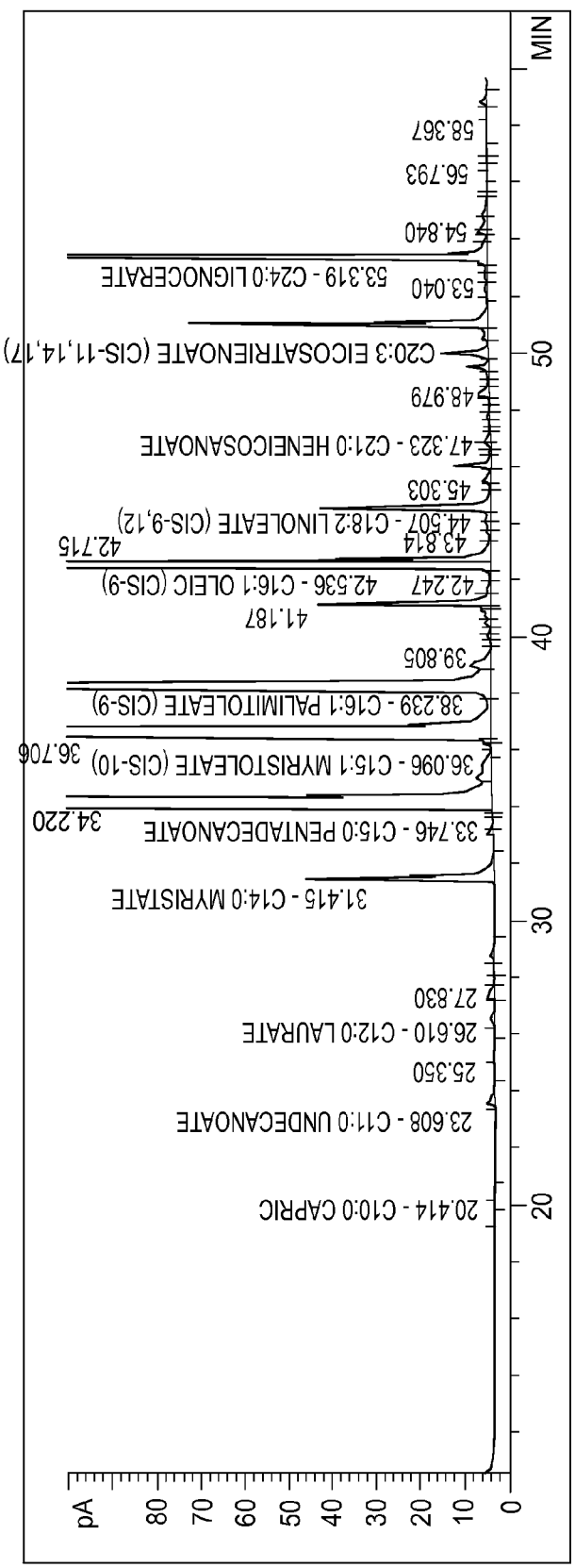
FIG. 5 shows FAME data derived from biodiesel produced with a single-step transesterification of algae total lipids feedstock.

FAME Analysis on Single-Step Transesterification of Algae Total Lipids Feedstock Algae total lipids feedstock was processed similarly to that described in Example 6. FAME analysis was performed with gas chromatography equipment using the reaction product similarly to that described in Example 6. Total algae oil was obtained from chloroform/methanol extraction. Base catalysis did not work with these samples due to high phospholipids and glycolipids. The process efficiently converted the fatty acid conjugates of neutral lipids, phospholipids and glycolipids. The obtained FAME data (shown in FIG. 5) shows the chemical profile of the biodiesel produced. The results indicate that the single-step transesterification process can convert algae total lipids feedstock comprising fatty acid conjugates of neutral lipids, phospholipids, and glycolipids.

Example 11

FAME Analysis on Single-Step Transesterification of Sea Weed Feedstock

Figure 6:
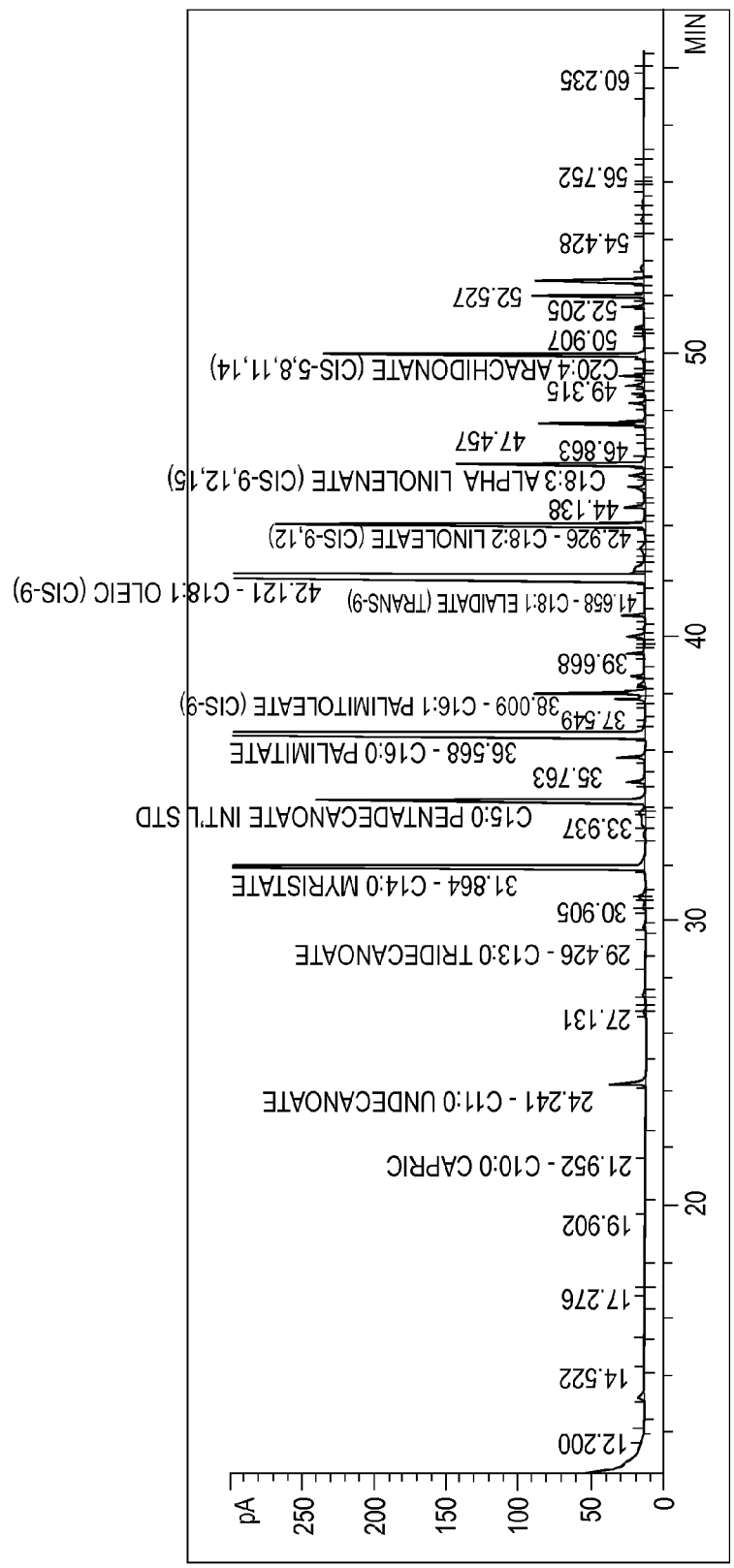
FIG. 6 shows FAME data derived from biodiesel produced with a single-step transesterification of sea weed feedstock.

Sea weed feedstock including algae leaves was processed similarly to that described in Example 6. FAME analysis was performed with gas chromatography equipment using the reaction product similarly to that described in Example 6. Sea weeds can be a potential very low cost feed stock. While the lipid content was low in these samples including algae leaves (less than about 5%) the process was efficient in converting the phospholipids and neutral lipids as evidenced by the presence of Eicosatraenoate (arachidonate) [20:4] and linolenate [18:3], both of which are fatty acid methyl esters (FAMEs). The obtained FAME data (shown in FIG. 6) shows the chemical profile of the biodiesel produced. The results indicate that the single-step transesterification process can convert sea weed feedstock comprising the phospholipids and neutral lipids.

Example 12

FAME Analysis on Single-Step Transesterification of Sea Weed Feedstock

Figure 7:
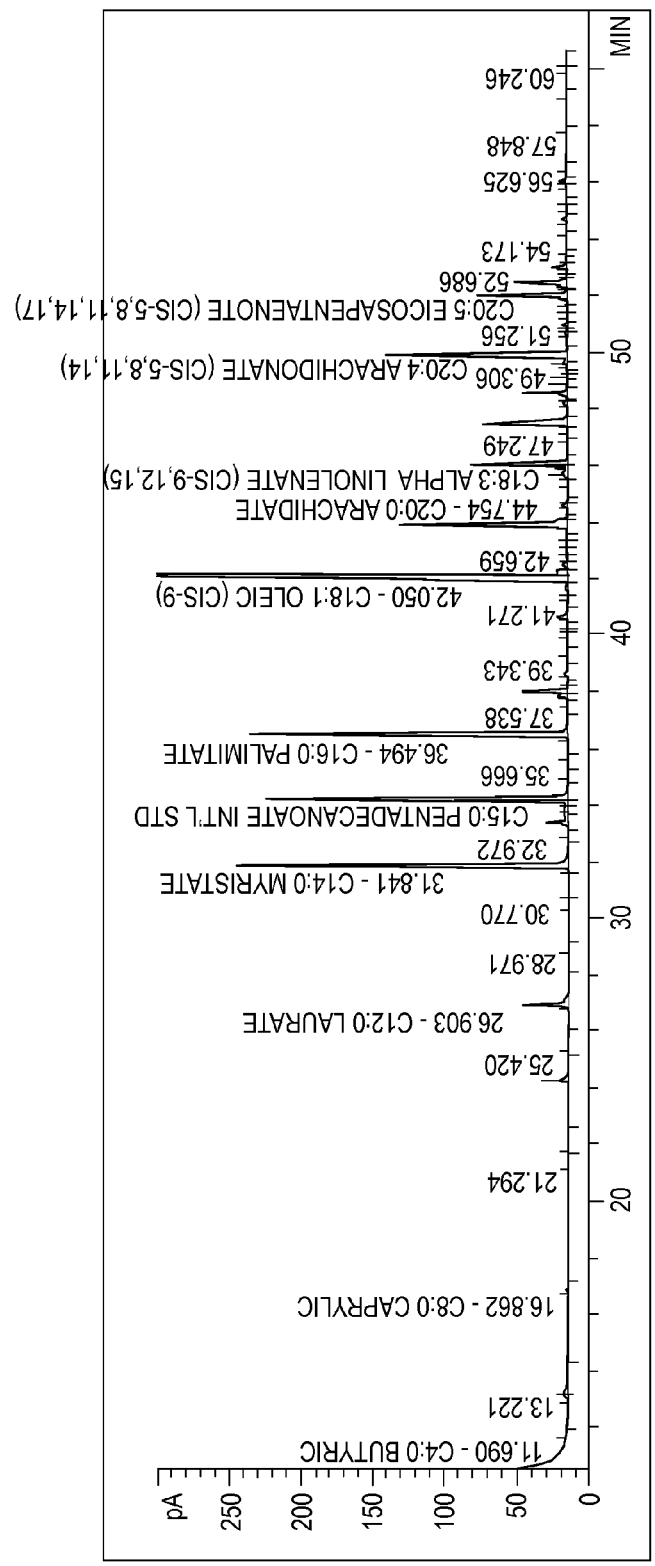
FIG. 7 shows FAME data derived from biodiesel produced with a single-step transesterification of sea weed feedstock.

Sea weed feedstock including algae buds was processed similarly to that described in Example 6. FAME analysis was performed with gas chromatography equipment using the reaction product similarly to that described in Example 6. Sea weeds can be a potential very low cost feed stock. The process was efficient in converting the phospholipids and neutral lipids as evidenced by the presence of Eicosatetraenoate (arachidonate) [20:4], Eicosapentaenoic acid [20:5] and linolenate [18:3], all of which are fatty acid methyl esters (FAMEs). The obtained FAME data (shown in FIG. 7) shows the chemical profile of the biodiesel produced. The results indicate that the single-step transesterification process can convert sea weed feedstock comprising the phospholipids and neutral lipids.

Example 13

FAME Analysis on Single-Step Transesterification of Glycolipid Feedstock

Figure 8:
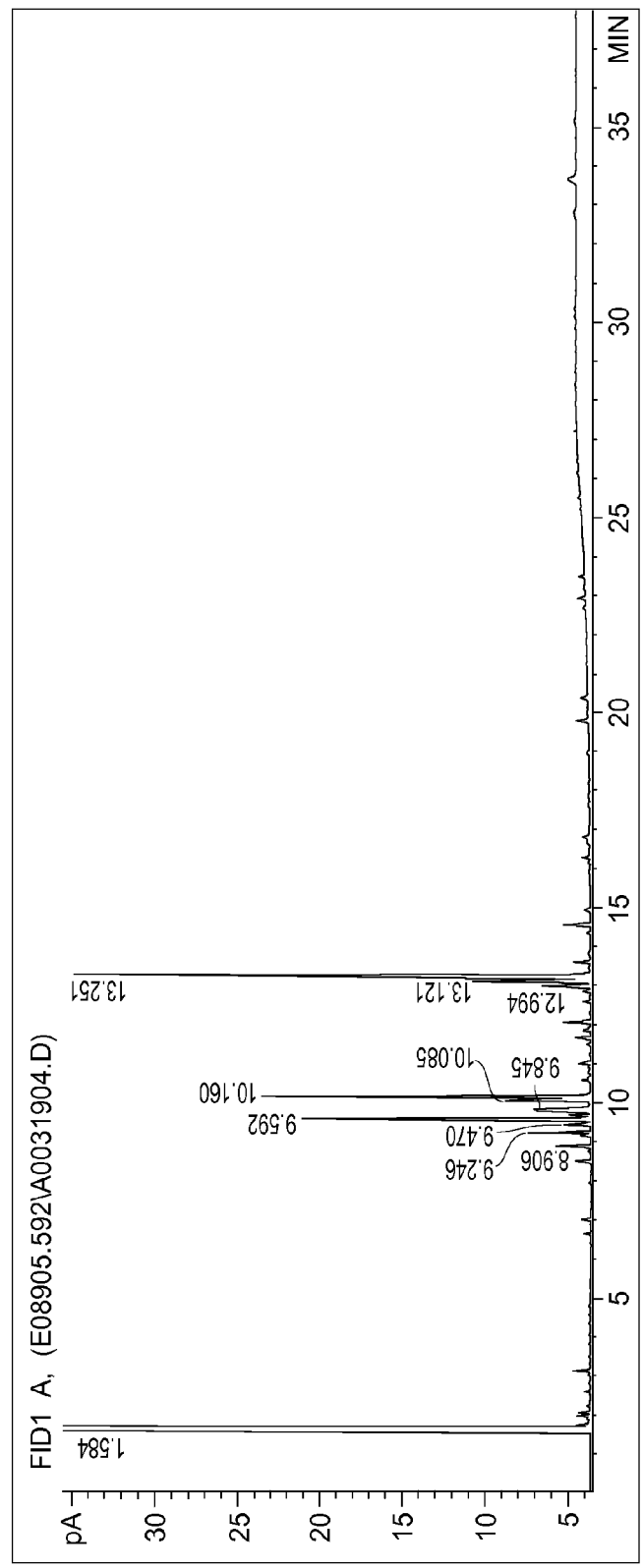
FIG. 8 shows FAME data derived from biodiesel produced with a single-step transesterification of glycolipid feedstock.

Glycolipid feedstock was processed similarly to that described in Example 6. FAME analysis was performed with gas chromatography equipment using the reaction product similarly to that described in Example 6. The obtained FAME data (shown in FIG. 8) shows the chemical profile of the biodiesel produced. The results indicate that the single-step transesterification process can convert glycolipid feedstock.

Example 14

FAME Analysis on Single-Step Transesterification of Brown Grease Feedstock

Figure 9:
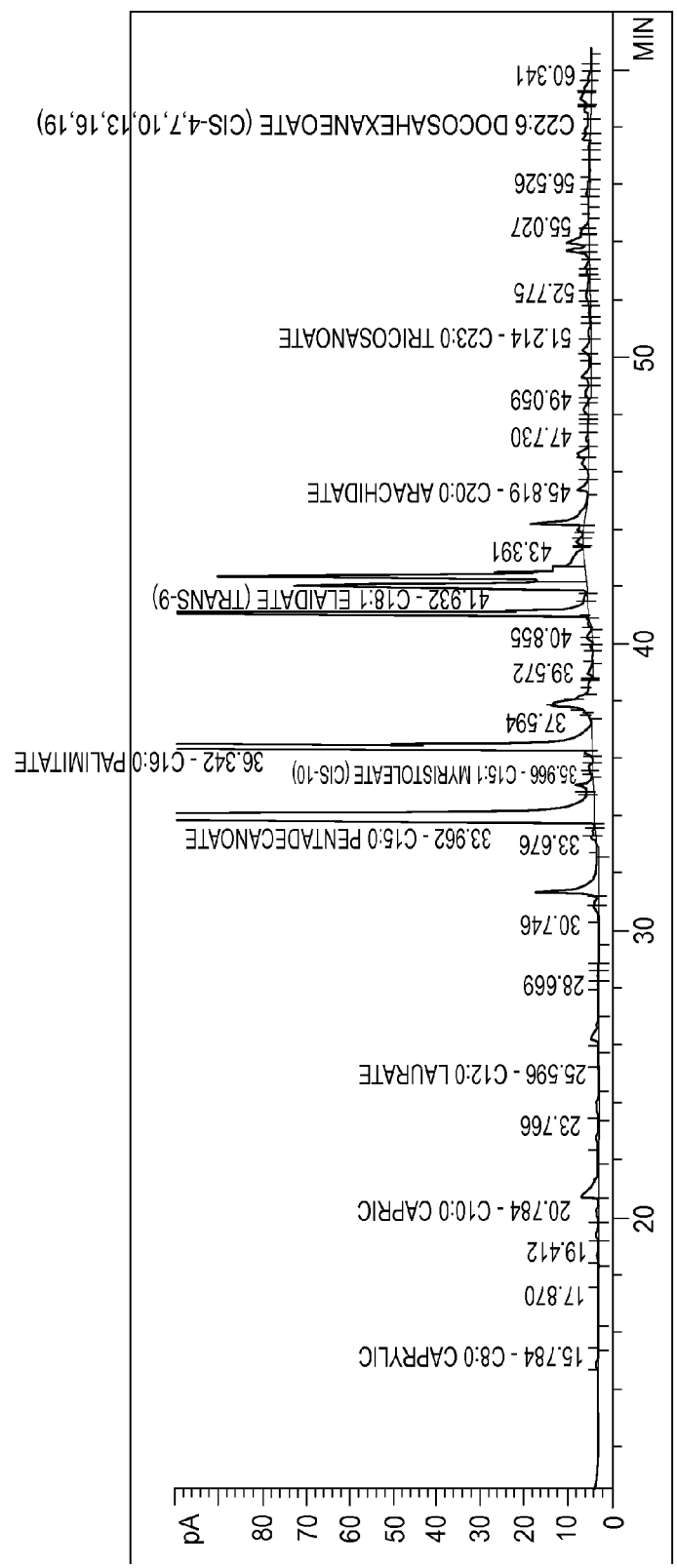
FIG. 9 shows FAME data derived from biodiesel produced with a single-step transesterification of brown grease feedstock.

Brown grease feedstock was processed similarly to that described in Example 6. FAME analysis was performed with gas chromatography equipment using the reaction product similarly to that described in Example 6. The brown grease sample had about 38% water. The obtained FAME data (shown in FIG. 9) shows the chemical profile of the biodiesel produced. The process tolerates a high percentage of water in the sample. The recommended water content is less than about 10% for efficiency.

Example 15

FAME Analysis on Single-Step Transesterification of Brown Grease Feedstock

Figure 10:
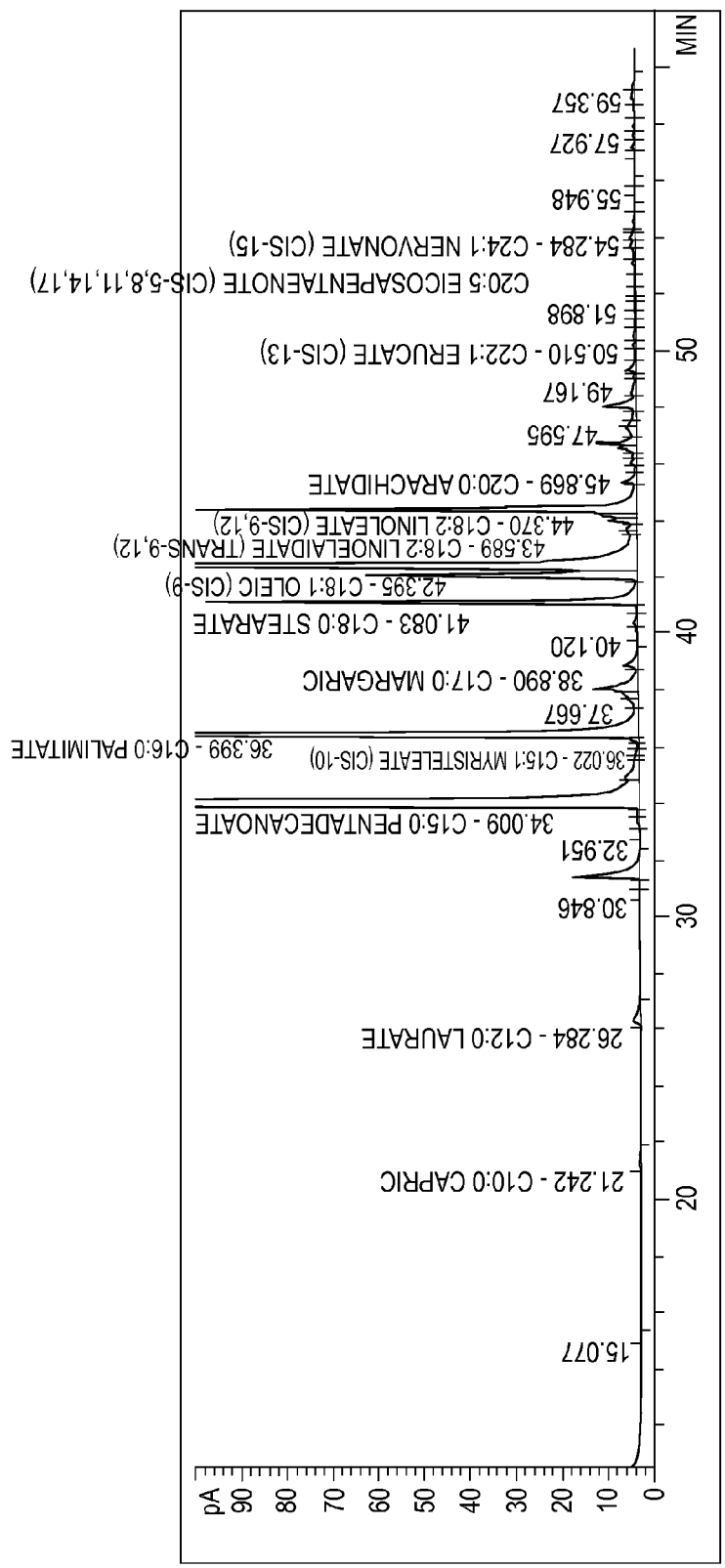
FIG. 10 shows FAME data derived from biodiesel produced with a single-step transesterification of brown grease feedstock.

Brown grease feedstock was processed similarly to that described in Example 6. FAME analysis was performed with gas chromatography equipment using the reaction product similarly to that described in Example 6. The brown grease sample had about 38% water. The obtained FAME data (shown in FIG. 10 and Table 4) shows the chemical profile of the biodiesel produced. The process tolerates a high percentage of water in the sample. The recommended water content is less than about 10% for efficiency.

TABLE 4

Compound identification of peaks in FAME analysis on single-step transesterification of brown grease feedstock

| # | Compound Name | ug/mL | RT | Pk Area |
|---|---|---|---|---|
| 1 | C4:0 Butyric | 0.000 | 0.000 | 0.00 |
| 2 | C6:0 Caproic | 0.000 | 0.000 | 0.00 |
| 3 | | 1.705 | 15.077 | 1.01 |
| 4 | C8:0 Caprylic | 0.000 | 0.000 | 0.00 |
| 5 | C10:0 Capric | 12.026 | 21.242 | 11.03 |
| 6 | C11:0 Undecanoate | 0.000 | 0.000 | 0.00 |
| 7 | C12:0 Laurate | 55.873 | 26.284 | 32.65 |
| 8 | C13:0 Trideconoate | 0.000 | 0.000 | 0.00 |
| 9 | | 2.181 | 30.846 | 1.30 |
| 10 | | 3.051 | 31.091 | 1.81 |
| 11 | C14:0 Myristate | 189.761 | 31.381 | 171.95 |
| 12 | | 3.458 | 32.951 | 2.06 |
| 13 | | 13.446 | 33.348 | 8.01 |
| 14 | C14:1 Myrisoleate (cis-9) | 9.322 | 33.642 | 6.07 |
| 15 | C15:0 Pentadecanoate | 5599.350 | 34.009 | 6020.76 |
| 16 | | 114.379 | 34.937 | 68.16 |
| 17 | | 12.938 | 35.620 | 7.71 |
| 18 | | 12.150 | 35.760 | 7.24 |
| 19 | C15:1 Myristoleate (cis-10) | 10.060 | 36.022 | 3.62 |
| 20 | | 16.717 | 36.288 | 9.96 |
| 21 | C16:0 Palimitate | 1589.994 | 36.399 | 1675.09 |
| 22 | | 34.036 | 37.667 | 20.28 |
| 23 | | 54.856 | 37.869 | 32.69 |
| 24 | | 16.120 | 37.954 | 9.60 |
| 25 | C16:1 Palimitoleate (cis-9) | 135.522 | 38.049 | 128.74 |
| 26 | C17:0 Margaric | 42.457 | 38.890 | 37.56 |
| 27 | | 8.633 | 40.120 | 5.14 |
| 28 | C17:1 Margaroleic(cis-10) | 17.326 | 40.371 | 10.63 |
| 29 | | 7.448 | 40.916 | 4.43 |
| 30 | C18:0 Stearate | 588.686 | 41.083 | 611.24 |
| 31 | C18:1 Elaidate (trans-9) | 682.564 | 42.065 | 563.96 |
| 32 | C18:1 Oleic (cis-9) | 1769.562 | 42.395 | 1913.67 |
| 33 | C18:2 Linoelaidate (trans-9, 12) | 23.359 | 43.589 | 15.81 |
| 34 | | 39.851 | 43.700 | 23.74 |
| 35 | | 70.535 | 43.992 | 46.80 |
| 36 | | 67.126 | 44.185 | 40.00 |
| 37 | | 47.737 | 44.246 | 28.44 |
| 38 | C18:2 Linoleate (cis-9, 12) | 824.363 | 44.370 | 853.81 |
| 39 | C18:3 gamma-linolenate (cis-6, 9, 12) | 18.819 | 45.382 | 27.43 |
| 40 | C20:0 Arachidate | 24.717 | 45.869 | 6.67 |
| 41 | | 20.155 | 46.066 | 12.01 |
| 42 | | 14.591 | 46.273 | 8.69 |
| 43 | C20:1 Eicosenoate (cis-11) | 42.055 | 46.592 | 37.97 |
| 44 | C18:3 alpha Linolenate (cis-9, 12, 15) | 64.198 | 46.723 | 64.50 |
| 45 | | 58.790 | 47.254 | 35.03 |
| 46 | C21:0 Heneicosanoate | 21.835 | 47.400 | 15.67 |
| 47 | | 30.751 | 47.595 | 18.32 |
| 48 | | 127.671 | 48.054 | 76.08 |
| 49 | C20:2 Eicosadienoate (cis-11, 14) | 26.160 | 48.524 | 19.63 |
| 50 | | 7.635 | 49.167 | 4.55 |
| 51 | C22:0 Behenate | 0.000 | 49.339 | 20.87 |
| 52 | C20:3 Eicosatrienoate (cis-8, 11, 14) | 13.200 | 49.915 | 6.20 |
| 53 | | 11.154 | 50.210 | 6.64 |
| 54 | C22:1 Erucate (cis-13) | 15.007 | 50.510 | 10.45 |
| 55 | C20:3 Eicosatrienoate (cis-11, 14, 17) | 0.000 | 0.000 | 0.00 |
| 56 | C20:4 Arachidonate (cis-5, 8, 11, 14) | 11.490 | 50.979 | 4.88 |
| 57 | C23:0 Tricosanoate | 7.443 | 51.248 | 3.87 |
| 58 | | 4.858 | 51.533 | 2.89 |
| 59 | | 1.934 | 51.898 | 1.15 |
| 60 | | 5.370 | 52.097 | 3.20 |
| 61 | C22:2 Docosadienaote | 0.000 | 0.000 | 0.00 |
| 62 | | 5.430 | 52.575 | 3.23 |
| 63 | C20:5 Eicosapentaenote (cis-5, 8, 11, 14, 1) | 3.390 | 53.108 | 9.84 |
| 64 | C24:0 Lignocerate | 0.000 | 0.000 | 0.00 |
| 65 | | 17.724 | 53.501 | 10.56 |
| 66 | | 19.831 | 53.727 | 11.81 |
| 67 | | 21.374 | 54.026 | 12.73 |
| 68 | C24:1 Nervonate (cis-15) | 10.273 | 54.284 | 2.78 |
| 69 | | 19.823 | 54.544 | 11.81 |
| 70 | | 4.485 | 55.052 | 2.67 |
| 71 | | 1.979 | 55.647 | 1.17 |
| 72 | | 1.607 | 55.948 | 0.95 |
| 73 | | 1.857 | 56.998 | 1.10 |

TABLE 4-continued

Compound identification of peaks in FAME analysis on single-step transesterification of brown grease feedstock

| # | Compound Name | ug/mL | RT | Pk Area |
|---|---|---|---|---|
| 74 | | 7.511 | 57.215 | 4.47 |
| 75 | | 4.313 | 57.612 | 2.57 |
| 76 | | 4.553 | 57.927 | 2.71 |
| 77 | C22:6 Docosahexaenoate (cis-4, 7, 10, 13, 1) | 18.120 | 58.568 | 3.82 |
| 78 | | 15.328 | 58.994 | 9.13 |
| 79 | | 9.005 | 59.357 | 5.36 |
| Tota | | 1.278e4 | | |

Example 16

FAME Analysis on Single-Step Transesterification of Ground Meat Feedstock

Figure 11:
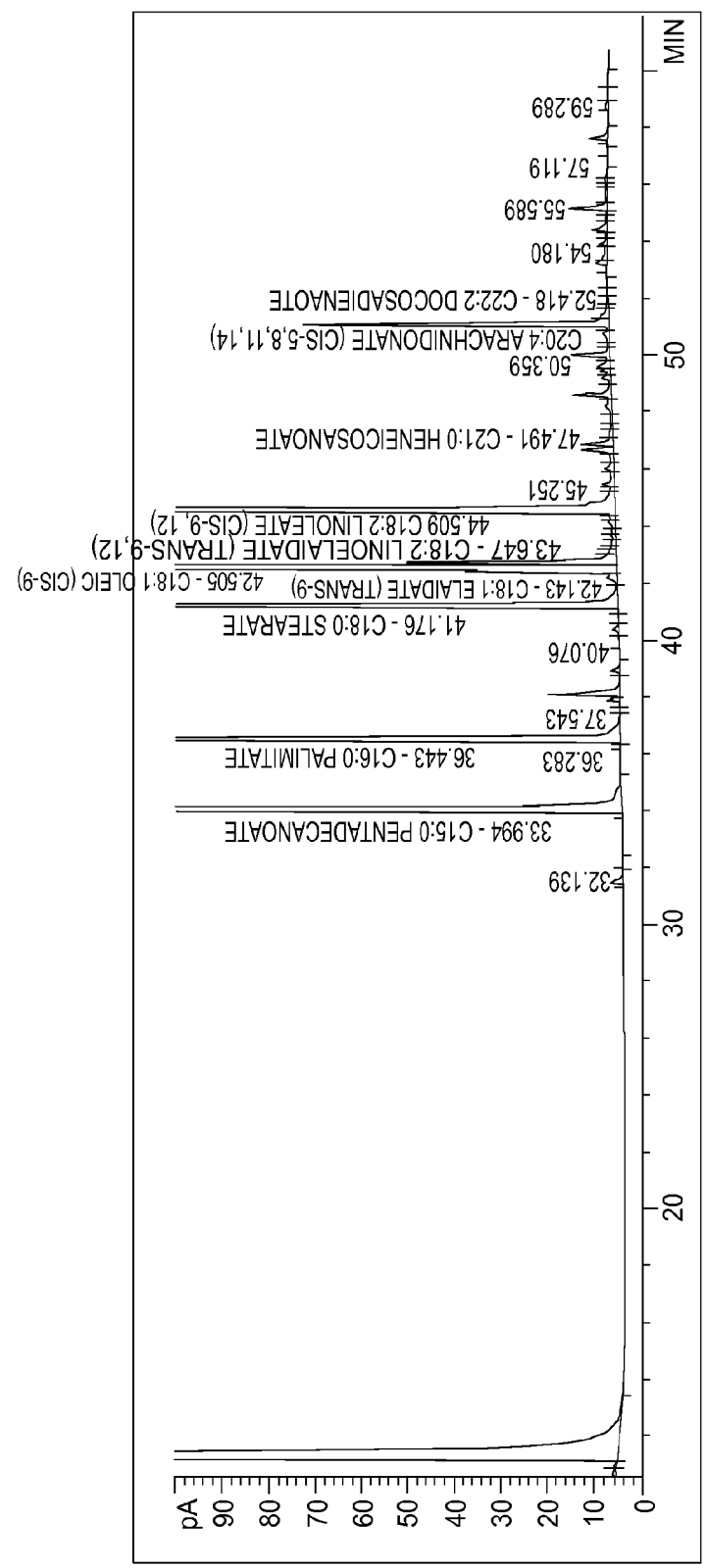
FIG. 11 shows FAME data derived from biodiesel produced with a single-step transesterification of ground meat feedstock.

Ground meat feedstock was processed similarly to that described in Example 6. FAME analysis was performed with gas chromatography equipment using the reaction product similarly to that described in Example 6. The obtained FAME data (shown in FIG. 11 and Table 5) shows the chemical profile of the biodiesel produced. The results indicate that the single-step transesterification process can convert ground meat feedstock.

TABLE 5

Compound identification of peaks in FAME analysis on single-step transesterification of ground meat feedstock

| # | Compound Name | ug/mL | RT | Pk Area |
|---|---|---|---|---|
| 1 | | 16.820 | 10.623 | 10.02 |
| 2 | C4:0 Butyric | 11.277 | 10.928 | 5.87 |
| 3 | | 1.700e5 | 11.164 | 101320.82 |
| 4 | C6:0 Caproic | 0.000 | 0.000 | 0.00 |
| 5 | C8:0 Caprylic | 0.000 | 0.000 | 0.00 |
| 6 | C10:0 Capric | 0.000 | 0.000 | 0.00 |
| 7 | C11:0 Undecanoate | 0.000 | 0.000 | 0.00 |
| 8 | C12:0 Laurate | 0.000 | 0.000 | 0.00 |
| 9 | C13:0 Trideconoate | 0.000 | 0.000 | 0.00 |
| 10 | C14:0 Myristate | 16.210 | 31.436 | 27.39 |
| 11 | | 2.337 | 32.139 | 1.39 |
| 12 | C14:1 Myristoleate (cis-9) | 0.000 | 0.000 | 0.00 |
| 13 | C15:0 Pentadecanoate | 2120.248 | 33.994 | 2716.37 |
| 14 | C15:1 Myristoleate (cis-10) | 0.000 | 0.000 | 0.00 |
| 15 | | 1.585 | 36.283 | 0.94 |
| 16 | C16:0 Palimitate | 872.074 | 36.443 | 1140.43 |
| 17 | | 4.642 | 37.543 | 2.76 |
| 18 | | 40.931 | 37.869 | 24.39 |
| 19 | C16:0 Palimitoleate (cis-9) | 85.719 | 38.066 | 112.39 |
| 20 | C17:0 Margaric | 11.541 | 38.884 | 17.55 |
| 21 | | 2.378 | 40.076 | 1.41 |
| 22 | C17:1 Margaroleic(cis-10) | 6.732 | 40.348 | 11.80 |
| 23 | | 3.882 | 40.670 | 2.31 |
| 24 | C18:0 Stearate | 614.309 | 41.176 | 822.11 |
| 25 | C18:1 Elaidate (trans-9) | 23.662 | 42.143 | 34.62 |
| 26 | C18:1 Oleic (cis-9) | 1410.798 | 42.505 | 1896.21 |
| 27 | | 485.765 | 42.671 | 289.49 |
| 28 | | 48.435 | 43.020 | 28.86 |
| 29 | | 29.298 | 43.357 | 17.46 |
| 30 | C18:2 Linoelaidate (trans-9, 12) | 3.477 | 43.647 | 8.57 |
| 31 | | 23.083 | 43.759 | 13.75 |
| 32 | | 31.182 | 44.093 | 18.58 |
| 33 | | 22.374 | 44.294 | 13.33 |
| 34 | C18:2 Linoleate (cis-9, 12) | 1307.209 | 44.509 | 1715.04 |
| 35 | | 12.820 | 45.251 | 7.64 |
| 36 | C18:3 gamma-linolenate (cis-6, 9, 12) | 10.271 | 45.435 | 36.50 |
| 37 | C20:0 Arachidate | 29.488 | 46.016 | 23.07 |

TABLE 5-continued

Compound identification of peaks in FAME analysis on single-step transesterification of ground meat feedstock

| # | Compound Name | ug/mL | RT | Pk Area |
|---|---|---|---|---|
| 38 | | 21.503 | 46.440 | 12.81 |
| 39 | C20:1 Eicosenoate (cis-11) | 31.413 | 46.650 | 42.07 |
| 40 | C18:3 alpha Linolenate (cis-9, 12, 15) | 40.391 | 46.814 | 58.16 |
| 41 | | 24.532 | 47.185 | 14.62 |
| 42 | C21:0 Heneicosanoate | 3.006 | 47.491 | 6.42 |
| 43 | | 20.165 | 47.656 | 12.01 |
| 44 | | 40.425 | 48.178 | 24.09 |
| 45 | C20:2 Eicosadienoate (cis-11, 14) | 45.713 | 48.555 | 63.79 |
| 46 | | 30.566 | 49.196 | 18.21 |
| 47 | C22:0 Behenate | 14.656 | 49.425 | 16.61 |
| 48 | | 41.432 | 49.609 | 24.69 |
| 49 | C20:3 Eicosatrienoate (cis-8, 11, 14) | 44.738 | 49.956 | 62.73 |
| 50 | | 9.235 | 50.359 | 5.50 |
| 51 | C22:1 Erucate (cis-13) | 0.000 | 0.000 | 0.00 |
| 52 | C20:3 Eicosatrienoate (cis-11, 14, 17) | 14.076 | 50.747 | 19.64 |
| 53 | C20:4 Arachidonate (cis-5, 8, 11, 14) | 294.160 | 51.014 | 377.60 |
| 54 | C23:0 Tricosanoate | 15.716 | 51.306 | 21.12 |
| 55 | | 6.833 | 51.704 | 4.07 |
| 56 | | 9.506 | 51.886 | 5.66 |
| 57 | | 4.597 | 52.222 | 2.73 |
| 58 | C22:2 Docosadienaote | 0.142 | 52.418 | 2.08 |
| 59 | C20:5 Eicosapentaenote (cis-5, 8, 11, 14, 1) | 0.000 | 53.209 | 15.16 |
| 60 | C24:0 Lignocerate | 62.389 | 53.397 | 17.55 |
| 61 | | 21.110 | 53.905 | 12.58 |
| 62 | | 4.818 | 54.180 | 2.87 |
| 63 | C24:1 Nervonate (cis-15) | 22.595 | 54.390 | 25.55 |
| 64 | | 7.362 | 54.805 | 4.38 |
| 65 | | 3.754 | 54.964 | 2.23 |
| 66 | | 90.816 | 55.132 | 54.12 |
| 67 | | 23.582 | 55.589 | 14.05 |
| 68 | | 4.962 | 55.966 | 2.95 |
| 69 | | 9.247 | 56.149 | 5.51 |
| 70 | | 8.976 | 56.228 | 5.35 |
| 71 | | 1.219 | 57.119 | 0.72 |
| 72 | | 51.485 | 57.559 | 30.68 |
| 73 | C22:6 Docosahexaenoate (cis-4, 7, 10, 13, 1) | 6.550 | 58.713 | 6.36 |
| 74 | | 8.911 | 59.289 | 5.31 |
| 75 | | 7.975 | 59.549 | 4.75 |
| Tota | | 1.783e5 | | |

Example 17

FAME Analysis on Single-Step Transesterification of Swine Fat Feedstock

Figure 12:
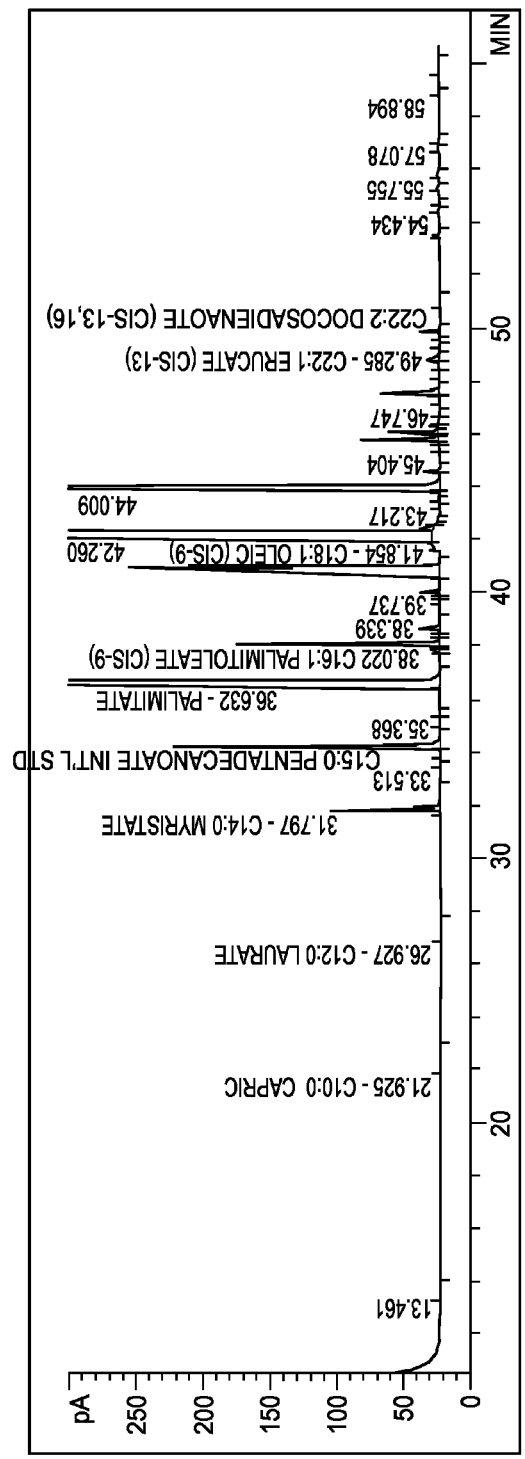
FIG. 12 shows FAME data derived from biodiesel produced with a single-step transesterification of swine fat feedstock.

Swine fat feedstock was processed similarly to that described in Example 6. FAME analysis was performed with gas chromatography equipment using the reaction product similarly to that described in Example 6. The obtained FAME data (shown in FIG. 12) shows the chemical profile of the biodiesel produced. The results indicate that the single-step transesterification process can convert swine fat feedstock.

Example 18

FAME Analysis on Single-Step Transesterification of Cooking Oil Feedstock

Figure 13:
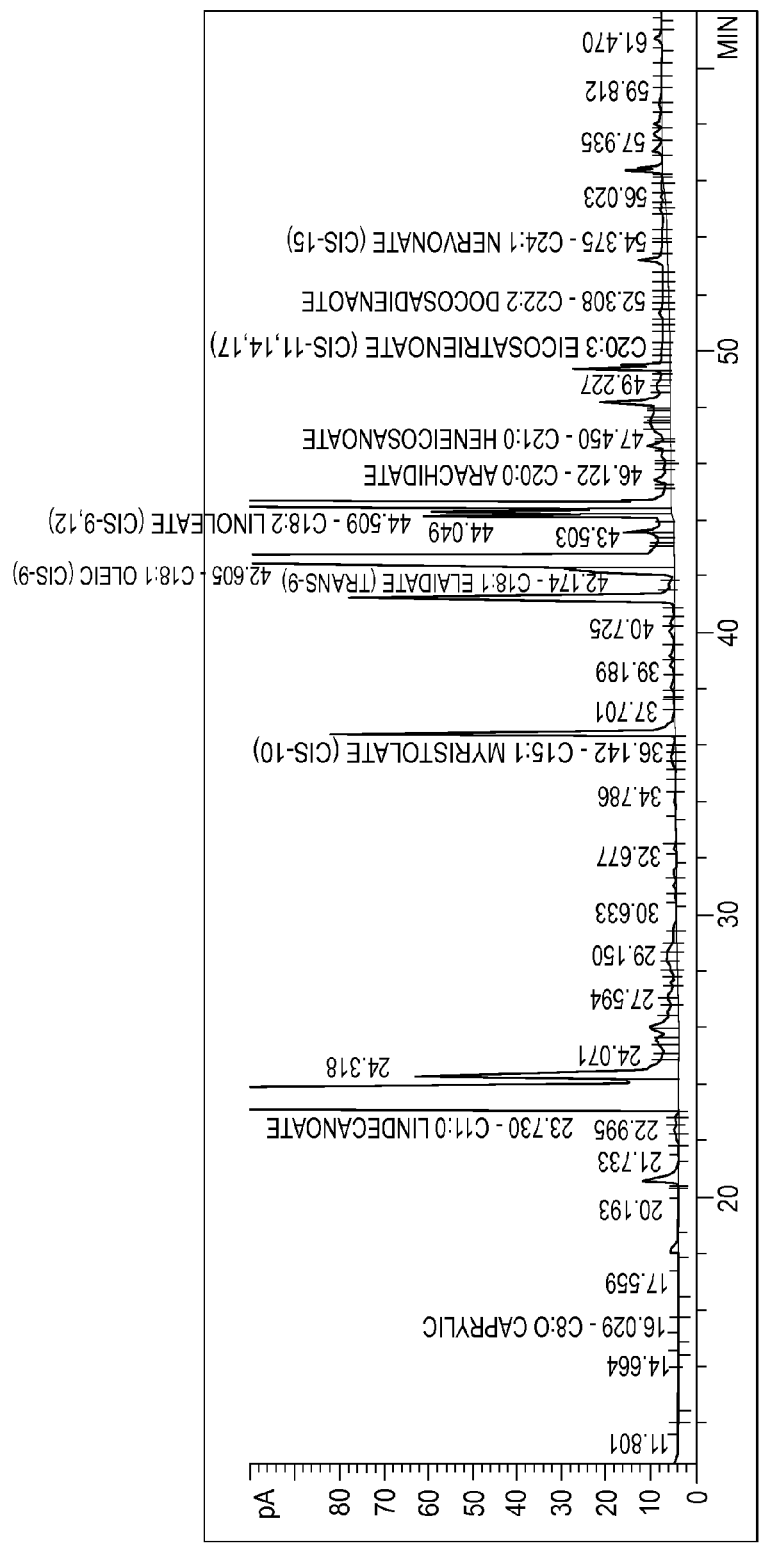
FIG. 13 shows FAME data derived from biodiesel produced with a single-step transesterification of cooking oil feedstock.

Cooking oil feedstock was processed similarly to that described in Example 6. FAME analysis was performed with gas chromatography equipment using the reaction product similarly to that described in Example 6. Used cooking oil is a low cost feedstock. The obtained FAME data (shown in FIG. 13) shows the chemical profile of the biodiesel produced. The results indicate that the single-step transesterification process can convert cooking oil feedstock.

Example 19

FAME Analysis on Single-Step Transesterification of Phospholipid Feedstock

Figure 14:
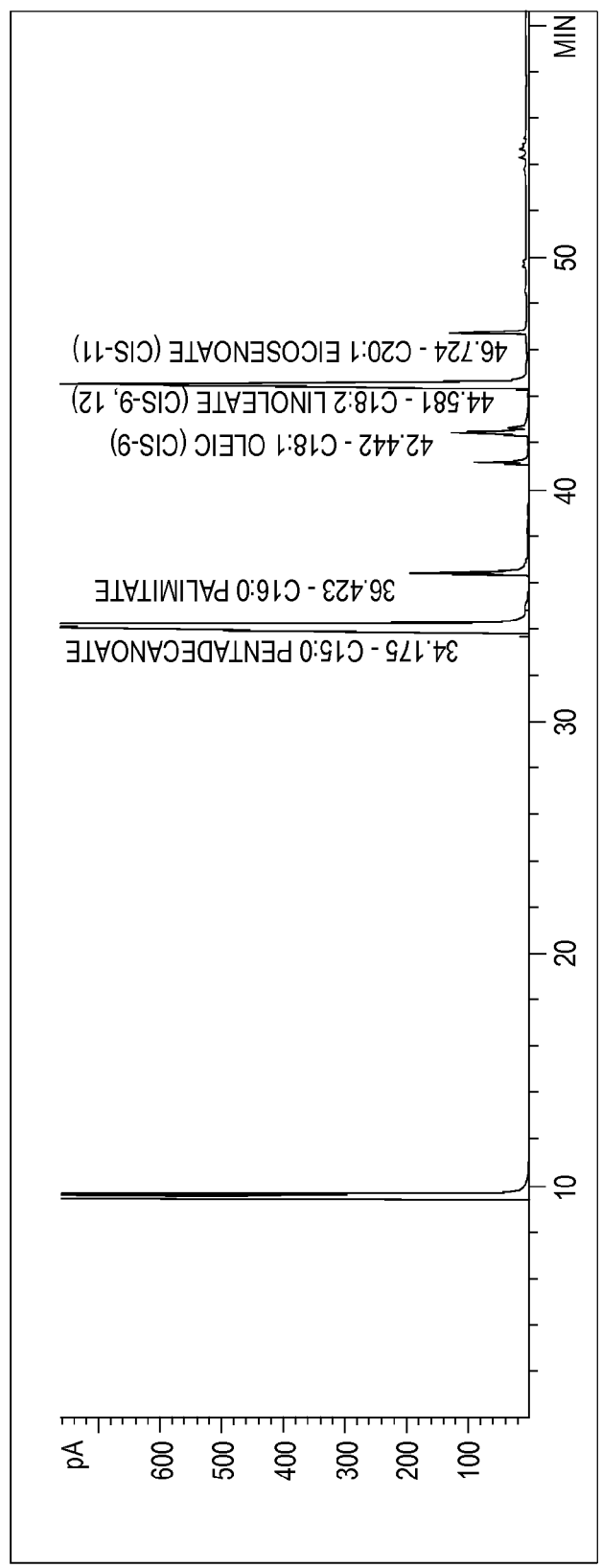
FIG. 14 shows FAME data derived from biodiesel produced with a single-step transesterification of phospholipid feedstock.

A commercial phospholipid standard from Sigma was processed similarly to that described in Example 6. FAME analysis was performed with gas chromatography equipment using the reaction product similarly to that described in Example 6. Phospholipid is a low cost feedstock. The obtained FAME data (shown in FIG. 14 and Table 6) shows the chemical profile of the biodiesel produced. The results indicate that the single-step transesterification process can efficiently convert phospholipids.

TABLE 6

Compound identification of peaks in FAME analysis on single-step transesterification of phospholipid feedstock

| # | Compound Name | ug/mL | RT | Pk Area |
|---|---|---|---|---|
| 1 | C4:0 Butyric | 0.000 | 0.000 | 0.00 |
| 2 | C6:0 Caproic | 0.000 | 0.000 | 0.00 |
| 3 | C8:0 Caprylic | 0.000 | 0.000 | 0.00 |
| 4 | C10:0 Capric | 0.000 | 0.000 | 0.00 |
| 5 | C11:0 Undecanoate | 0.000 | 0.000 | 0.00 |
| 6 | C12:0 Laurate | 0.000 | 0.000 | 0.00 |
| 7 | C13:0 Trideconate | 0.000 | 0.000 | 0.00 |
| 8 | C14:0 Myristate | 0.000 | 0.000 | 0.00 |
| 9 | C14:1 Myrisoleate (cis-9) | 0.000 | 0.000 | 0.00 |
| 10 | C15:0 Pentadecanoate | 1.027e4 | 34.175 | 13146.50 |
| 11 | C15:1 Myristoleate (cis-10) | 0.000 | 0.000 | 0.00 |
| 12 | C16:0 Palimitate | 1044.062 | 36.423 | 1363.32 |
| 13 | C16:0 Palimitoleate (cis-9) | 0.000 | 0.000 | 0.00 |
| 14 | C17:0 Margaric | 0.000 | 0.000 | 0.00 |
| 15 | C17:1 Margaroleic(cis-10) | 0.000 | 0.000 | 0.00 |
| 16 | C18:0 Stearate | 0.000 | 0.000 | 0.00 |
| 17 | C18:1 Elaidate (trans-9) | 0.000 | 0.000 | 0.00 |
| 18 | C18:1 Oleic (cis-9) | 748.503 | 42.442 | 1009.84 |
| 19 | C18:2 Linoelaidate (trans-9, 12) | 0.000 | 0.000 | 0.00 |
| 20 | C18:2 Linoleate (cis-9, 12) | 6080.457 | 44.581 | 7963.00 |
| 21 | C18:3 gamma-linolenate (cis-6, 9, 12) | 0.000 | 0.000 | 0.00 |
| 22 | C20:0 Arachidate | 0.000 | 0.000 | 0.00 |
| 23 | C20:1 Eicosenoate (cis-11) | 568.549 | 46.724 | 732.35 |
| 24 | C18:3 alpha Linolenate (cis-9, 12, 15) | 0.000 | 0.000 | 0.00 |
| 25 | C21:0 Heneicosanoate | 0.000 | 0.000 | 0.00 |
| 26 | C20:2 Eicosadienoate (cis-11, 14) | 0.000 | 0.000 | 0.00 |
| 27 | C22:0 Behenate | 0.000 | 0.000 | 0.00 |
| 28 | C20:3 Eicosatrienoate (cis-8, 11, 14) | 0.000 | 0.000 | 0.00 |
| 29 | C22:1 Erucate (cis-13) | 0.000 | 0.000 | 0.00 |
| 30 | C20:3 Eicosatrienoate (cis-11, 14, 17) | 0.000 | 0.000 | 0.00 |
| 31 | C20:4 Arachidonate (cis-5, 8, 11, 14) | 0.000 | 0.000 | 0.00 |
| 32 | C23:0 Tricosanoate | 0.000 | 0.000 | 0.00 |
| 33 | C22:2 Docosadienaote | 0.000 | 0.000 | 0.00 |
| 34 | C20:5 Eicosapentaenote (cis-5, 8, 11, 14, 1) | 0.000 | 0.000 | 0.00 |
| 35 | C24:0 Lignocerate | 0.000 | 0.000 | 0.00 |
| 36 | C24:1 Nervonate (cis-15) | 0.000 | 0.000 | 0.00 |
| 37 | C22:6 Docosahexaenoate (cis-4, 7, 10, 13, 1) | 0.000 | 0.000 | 0.00 |
| | Tota | | 1.871e4 | |

Example 20

FAME Analysis on Single-Step Transesterification of Biomass Feedstock

Figure 15:
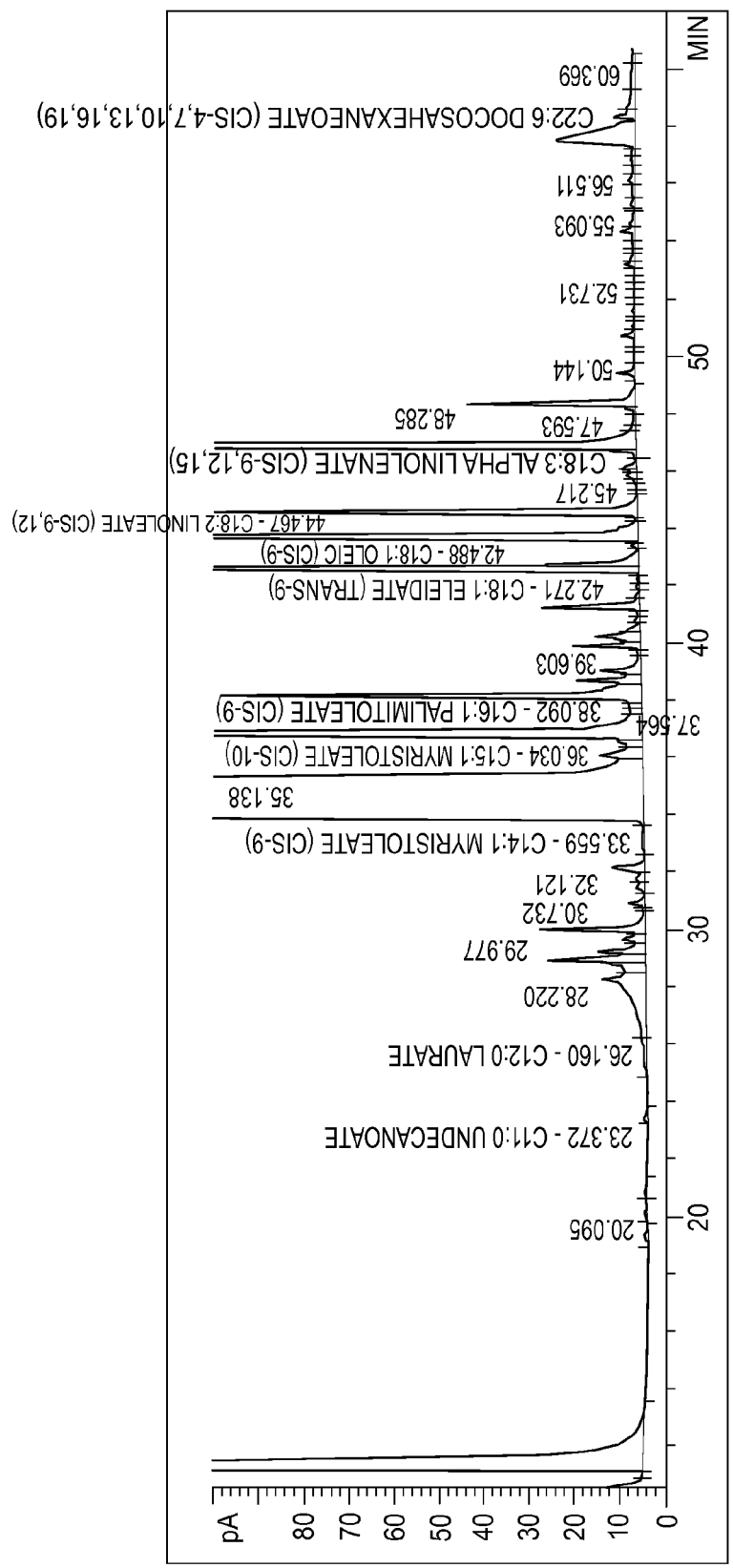
FIG. 15 shows FAME data derived from biodiesel produced with a single-step transesterification of biomass feedstock.

A biomass feedstock including dried algae was processed similarly to that described in Example 6. FAME analysis was performed with gas chromatography equipment using the reaction product similarly to that described in Example 6. The obtained FAME data (shown in FIG. 15 and Table 7) shows the chemical profile of the biodiesel produced. The results indicate that the single-step transesterification process can efficiently convert the biomass feedstock including dried algae.

TABLE 7

Compound identification of peaks in FAME analysis on single-step transesterification of biomass feedstock

| # | Compound Name | ug/mL | RT | Pk Area |
|---|---|---|---|---|
| 1 | | 539.777 | 10.500 | 321.67 |
| 2 | C4:0 Butyric | 5.050 | 10.932 | 1.60 |
| 3 | | 3.594e5 | 11.157 | 214199.04 |
| 4 | C6:0 Caproic | 0.000 | 0.000 | 0.00 |
| 5 | C8:0 Caprylic | 0.000 | 0.000 | 0.00 |
| 6 | | 13.745 | 19.213 | 8.19 |
| 7 | | 8.133 | 20.095 | 4.84 |
| 8 | C10:0 Capric | 0.000 | 20.778 | 4.70 |
| 9 | C11:0 Undecanoate | 7.369 | 23.372 | 10.90 |
| 10 | C12:0 Laurate | 30.203 | 26.160 | 43.65 |
| 11 | | 781.867 | 28.220 | 465.95 |
| 12 | C13:0 Tridecanoate | 91.578 | 28.765 | 120.44 |
| 13 | | 348.270 | 28.929 | 207.55 |
| 14 | | 209.302 | 29.213 | 124.73 |
| 15 | | 108.039 | 29.630 | 64.38 |
| 16 | | 356.029 | 29.977 | 212.17 |
| 17 | | 5.541 | 30.732 | 3.30 |
| 18 | | 52.147 | 30.895 | 31.07 |
| 19 | C14:0 Myristate | 19.539 | 31.405 | 31.48 |
| 20 | | 52.136 | 31.760 | 31.07 |
| 21 | | 139.593 | 32.121 | 83.19 |
| 22 | C14:1 Myristoleate (cis-9) | 19.304 | 33.559 | 26.83 |
| 23 | C15:0 Pentadecanoate | 0.000 | 0.000 | 0.00 |
| 24 | | 2.502e5 | 35.138 | 149128.45 |
| 25 | C15:1 Myristoleate (cis-10) | 123.504 | 36.034 | 155.02 |
| 26 | C16:0 Palimitate | 42.960 | 36.565 | 65.93 |
| 27 | | 4573.102 | 36.792 | 2725.32 |
| 28 | | 42.176 | 37.564 | 25.13 |
| 29 | | 53.716 | 37.818 | 32.01 |
| 30 | C16:1 Palimitoleate (cis-9) | 610.830 | 38.092 | 773.53 |
| 31 | | 256.114 | 38.635 | 152.63 |
| 32 | C17:0 Margaric | 80.758 | 38.968 | 108.42 |
| 33 | | 12.894 | 39.603 | 7.68 |
| 34 | | 186.839 | 39.862 | 111.34 |
| 35 | | 197.866 | 40.179 | 117.91 |
| 36 | C17:1 Margaroleic(cis-10) | 20.837 | 40.421 | 29.86 |
| 37 | | 21.065 | 40.738 | 12.55 |
| 38 | | 10.464 | 41.006 | 6.23 |
| 39 | C18:0 Stearate | 107.969 | 41.183 | 157.57 |
| 40 | | 16.089 | 41.577 | 9.58 |
| 41 | | 10.090 | 41.898 | 6.01 |
| 42 | C18:1 Elaidate (trans-9) | 0.324 | 42.171 | 4.24 |
| 43 | C18:1 Oleic (cis-9) | 790.479 | 42.488 | 1066.02 |
| 44 | | 303.798 | 42.678 | 181.04 |
| 45 | | 20.172 | 43.361 | 12.02 |
| 46 | C18:2 Linoelaidate (trans-9, 12) | 1001.908 | 43.625 | 1300.63 |
| 47 | | 27.763 | 44.094 | 16.54 |
| 48 | | 6.990 | 44.329 | 4.16 |
| 49 | C18:2 Linoleate (cis-9, 12) | 492.978 | 44.467 | 649.25 |
| 50 | | 1.336 | 45.217 | 0.79 |
| 51 | C18:3 gamma-linolenate (cis-6, 9, 12) | 0.000 | 45.444 | 2.45 |
| 52 | | 10.793 | 45.620 | 6.43 |
| 53 | | 36.001 | 45.816 | 21.45 |
| 54 | C20:0 Arachidate | 10.303 | 45.995 | 10.66 |

TABLE 7-continued

Compound identification of peaks in FAME analysis on single-step transesterification of biomass feedstock

| # | Compound Name | ug/mL | RT | Pk Area |
|---|---|---|---|---|
| 55 | | 46.023 | 46.090 | 27.42 |
| 56 | C20:1 Eicosenoate (cis-11) | 16.852 | 46.637 | 23.36 |
| 57 | C18:3 alpha Linolenate (cis-9, 12, 15) | 2565.962 | 46.820 | 3370.11 |
| 58 | C21:0 Heneicosanoate | 8.696 | 47.419 | 14.17 |
| 59 | | 22.200 | 47.593 | 13.23 |
| 60 | | 29.837 | 48.135 | 17.78 |
| 61 | | 408.268 | 48.285 | 243.30 |
| 62 | C20:2 Eicosadienoate (cis-11, 14) | 0.000 | 0.000 | 0.00 |
| 63 | C22:0 Behenate | 23.990 | 49.342 | 29.12 |
| 64 | C20:3 Eicosatrienoate (cis-8, 11, 14) | 0.000 | 49.962 | 1.19 |
| 65 | | 0.634 | 50.144 | 0.37 |
| 66 | C22:1 Erucate (cis-13) | 13.825 | 50.676 | 24.27 |
| 67 | C20:3 Eicosatrienoate (cis-11, 14, 17) | 0.000 | 0.000 | 0.00 |
| 68 | C20:4 Arachidonate (cis-5, 8, 11, 14) | 2.189 | 51.007 | 6.12 |
| 69 | C23:0 Tricosanoate | 2.177 | 51.259 | 1.79 |
| 70 | | 9.735 | 51.520 | 5.80 |
| 71 | | 2.848 | 51.939 | 1.69 |
| 72 | | 6.882 | 52.125 | 4.10 |
| 73 | C22:2 Docosadienaote | 0.876 | 52.415 | 3.06 |
| 74 | | 3.382 | 52.731 | 2.01 |
| 75 | | 6.650 | 52.977 | 3.96 |
| 76 | C20:5 Eicosapentaenote (cis-5, 8, 11, 14, 1) | 0.000 | 53.139 | 16.38 |
| 77 | C24:0 Lignocerate | 57.317 | 53.336 | 12.86 |
| 78 | | 8.813 | 53.639 | 5.25 |
| 79 | | 16.025 | 53.857 | 9.55 |
| 80 | C24:1 Nervonate (cis-15) | 29.269 | 54.315 | 34.72 |
| 81 | | 32.965 | 54.584 | 19.48 |
| 82 | | 5.555 | 55.093 | 3.31 |
| 83 | | 20.701 | 55.226 | 12.33 |
| 84 | | 20.476 | 55.765 | 12.20 |
| 85 | | 35.817 | 56.077 | 21.34 |
| 86 | | 15.964 | 56.511 | 9.51 |
| 87 | | 19.579 | 56.827 | 11.66 |
| 88 | | 17.514 | 57.029 | 10.43 |
| 89 | | 835.929 | 57.489 | 498.17 |
| 90 | | 107.270 | 58.278 | 63.92 |
| 91 | C22:6 Docosahexaenoate (cis-4, 7, 10, 13, 1) | 43.861 | 58.653 | 47.83 |
| 92 | | 72.499 | 59.410 | 43.20 |
| 93 | | 25.989 | 60.369 | 15.48 |
| Tota | | 6.261e5 | | |

Example 21

Biodiesel ASTM D 6751 Standard

Table 8 is an exemplary Biodiesel ASTM D 6751 Standard.

TABLE 8

Exemplary Biodiesel ASTM D 6751 Standard Biodiesel ASTM D 6751

| | |
|---|---|
| Free Glycerin (GC) | 0.02% wt % max |
| Total Glycerin (GC) | 0.240% wt % max (free + mono/di/triglycerides) |
| Water & Sediment (centrifuge) | 0.05 vol % max |
| *Sulfur (ICP) | 0.05 wt % max (500 ppm) |
| Phosphorous (ICP) | 0.001 wt % max (10 ppm) |
| *Acid Number (mg KOH/g) | 0.80 max |
| Sulfated Ash | 0.020 wt % max |
| Flash Point | 130.0° C. min |
| Copper Strip Corrosion | No 3 max |
| Carbon Residue | 0.050 wt % max |
| Cloud Point | ° C. report |

TABLE 8-continued

Exemplary Biodiesel ASTM D 6751 Standard Biodiesel ASTM D 6751

| | |
|---|---|
| *Viscosity at 40° C. | 1.9-6.0 centistokes |
| Atmospheric Equivalent Temperature | 360° C. (distillation of sample, 90% recovered) |
| Cetane Number | 47 min |

(uses specially instrumented diesel engine)

Example 22

Distillation of Algae Biodiesel

Figure 16:
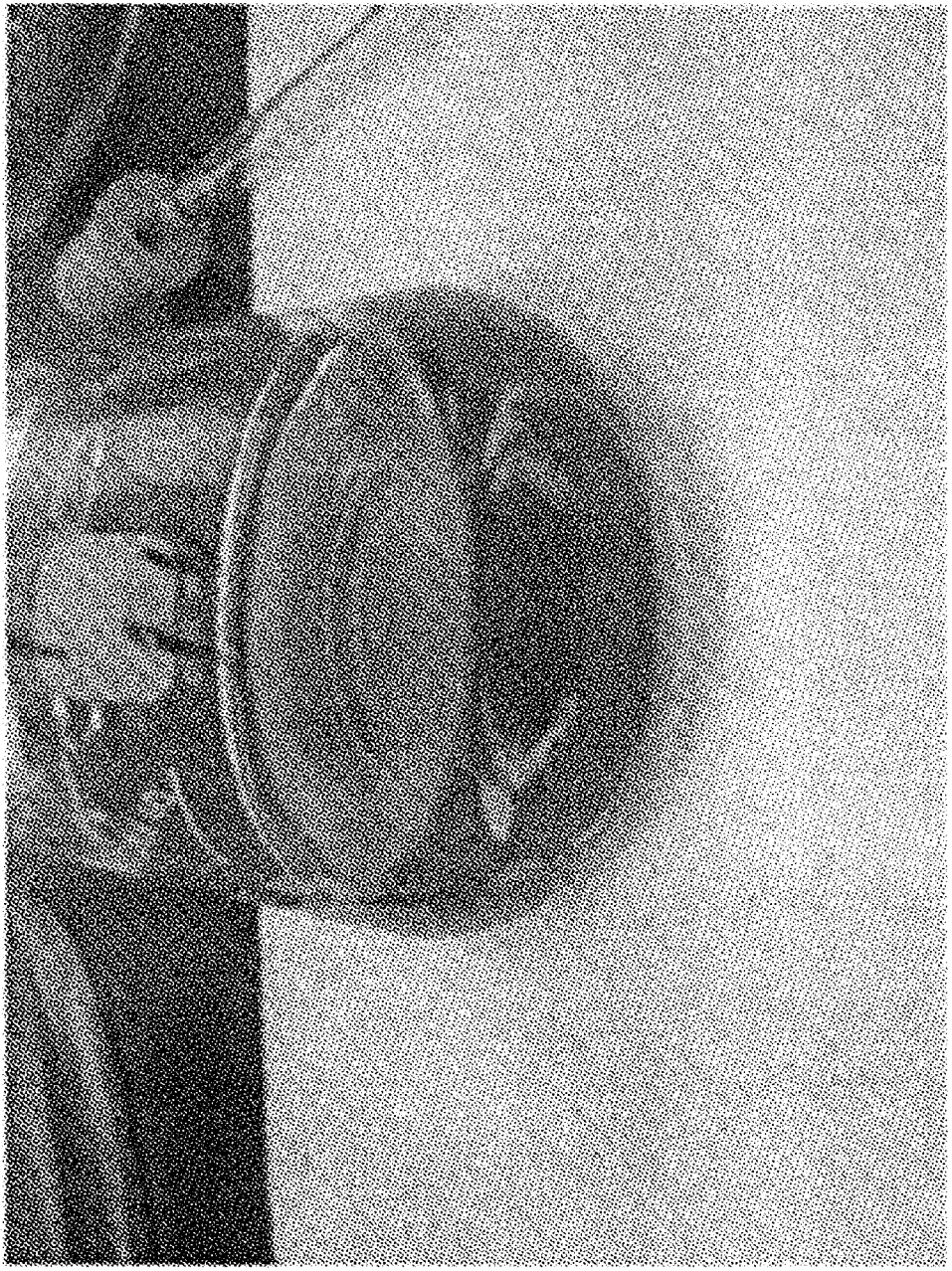
FIG. 16 shows a composite silica purified biodiesel used for the distillation test.

A biodiesel sample generated using algae feedstock converted by the single-step transesterification process as described herein was distilled to eliminate the remaining impurities from the biodiesel. FIG. 16 shows a composite silica purified biodiesel used for the distillation test. The distillation process included heating the biodiesel sample under vacuum so that the methyl esters were volatilized and carried into the overhead stream (distillate), leaving the non-volatile impurities in the bottoms product. The bottoms product of the first pass of distillation went through a second pass of distillation. Table 9 shows the desired results from the distillation process.

TABLE 9

Desired results from the distillation process

| | Feed description | Top product % of feed | Bottoms Product % of feed |
|---|---|---|---|
| First pass | Initial sample | 50% | 50% |
| Second pass | Bottoms from first pass | 70% | 30% |

Table 10 shows the results and operating conditions for the two-pass distillation tests. The units for the distillate product and bottoms product in the table below are in grams.

TABLE 10

Operation conditions and results for the two-pass distillation tests

| | First pass | Second pass |
|---|---|---|
| Feed material | Silica purified algae biodiesel | Bottoms product from first pass |
| Pressure | <5 × 10−3 torr | <5 × 10−3 torr |
| Temperature | 103° C. | 130° C. |
| Distillate product (g) | 22 | 22 |
| Bottoms product (g) | 12 | 5 |

Table 11 shows the summary of the samples generated by the two-pass distillation test.

TABLE 11

Summary of the samples generated by the two-pass distillation test

| | g | % of initial sample |
|---|---|---|
| First pass distillate | 22 | 43.9% |
| Second pass distillate | 12 | 23.9% |
| Residue | 5 | 10.0% |
| Losses* | 11.16 | 22.2% |

*Losses were due to material adhering to the walls of the glassware and lab equipment The results show that the two-pass distillation process was successful at improving the quality of the algae biodiesel. There was a marked improvement in the color of the biodiesel, and the fuel properties were improved.

Figure 17:
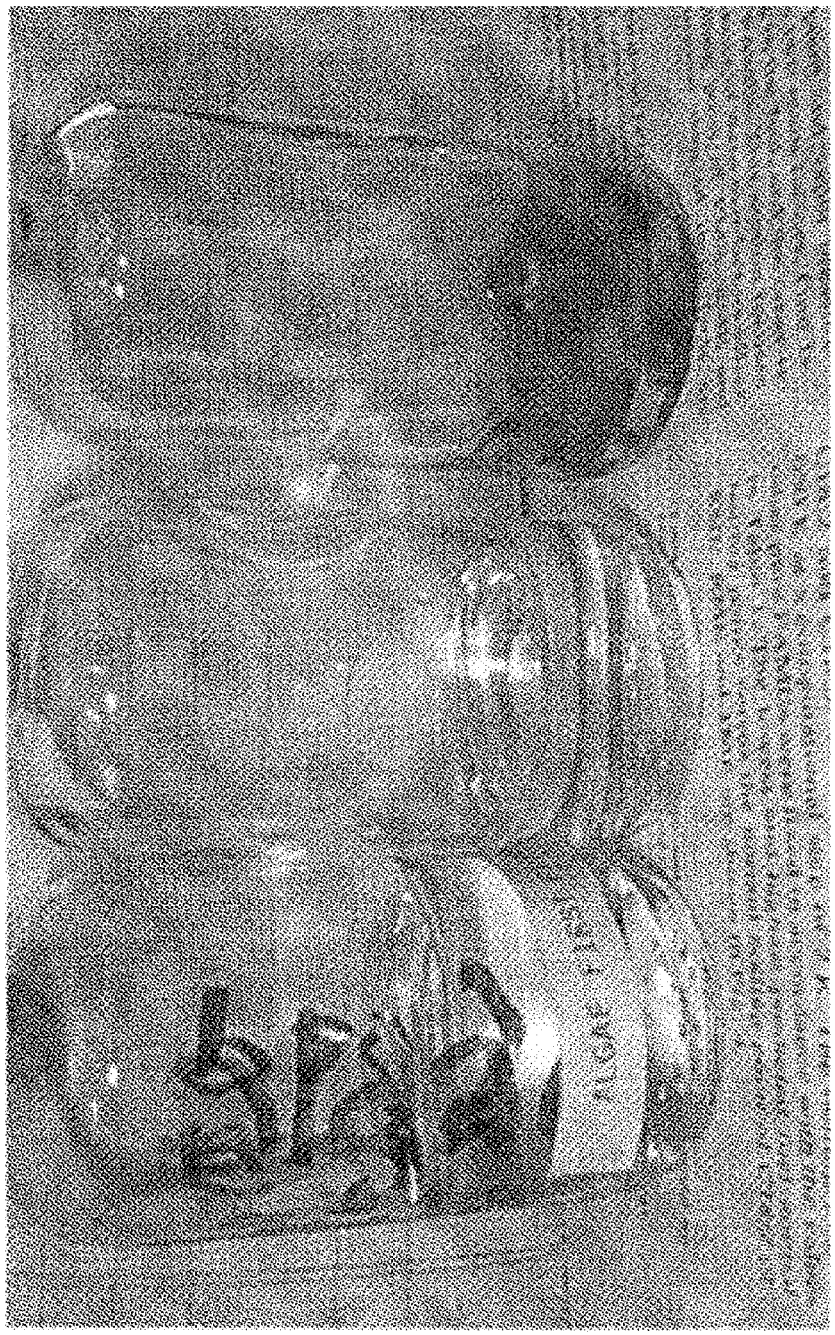
FIG. 17 shows, from left to right, the first pass distillate, the second pass distillate and the residue from an exemplary two-pass distillation test on a biodiesel sample.

FIG. 17 shows, from left to right, the first pass distillate, the second pass distillate and the residue from an exemplary two-pass distillation test on a biodiesel sample.

ASTM test results from the distilled biodiesels were shown in Table 12 through Table 15. Both samples tested were within the ASTM specification for nearly all of the tests that were run, except for the sulfur content. The biodiesel was produced using methanolic HCl as the esterification/transesterification catalyst.

TABLE 12

ASTM test results from the distilled biodiesels

| Test description | Units | Feed material | First pass PA-029A | Second pass PA-029B | ASTM limits |
|---|---|---|---|---|---|
| Free glycerin | wt % | | 0.007 | 0.004 | 0.020 max. |
| Total glycerin | wt % | | 0.019 | 0.065 | 0.024 max. |
| Oxidation stability | hr | | >11 | | 3 min. |
| Cloud point | ° C. | | 5.7 | | Report |
| Micro carbon residue | wt % | | 0.01 | | 0.05 max. |
| Sulfur content | ppm | 23 | 21 | 57 | 15 max. (S15 grade) |
| Kinematic viscosity | mm²/sec | | 4.562 | | 1.9-6.0 |

Table 13 shows ASTM test results for the distilled biodiesel samples.

TABLE 13

ASTM test results for the distilled biodiesel samples

| Method | Test | Result | Units |
|---|---|---|---|
| ASTM D6564 | Determination of Free and Total Glycerin In B-100 Biodiesel Methyl Esters By Gas Chromatography | | |
| | Free Glycerin | 0.007 | Wt % |
| | Monoglycerides | 0.047 | Wt % |
| | Diglycerides | 0.000 | Wt % |
| | Triglycerides | 0.000 | Wt % |
| | [1] Total Glycerin | 0.019 | Wt % |
| EN 14112 | Determination of Oxidation Stability (Accelerated Oxidation Test) | | |
| | Oxidation Stability | >11 | hr |
| ASTM D5773 | Cloud Point (Constant Cooling Rate Method) | | |
| | Automatic Cloud Point | 5.7 | ° C. |
| | Automatic Cloud Point | 42.3 | ° F. |
| ASTM D4530 | Micro Carbon Residue | | |
| | [1] Micro Method Carbon Residue | 0.01 | Wt % |
| ASTM D5453 | Sulfur Content by UV Fluorescence | | |
| | Sulfur Content | 21 | mg/kg |
| ASTM D445 | Kinematic/Dynamic Viscosity | | |
| | Kinematic Viscosity @ 104° F./40° C. | 4.562 | mm²/s |

[1] Out of Scope of the Method

Table 14 shows ASTM test results for the distilled biodiesel samples.

TABLE 14

ASTM test results for the distilled biodiesel samples

| Method | Test | Result | Units |
|---|---|---|---|
| ASTM D6584 | Determination of Free and Total Glycerin In B-100 Biodiesel Methyl Esters By Gas Chromatography | | |
| | [1] Free Glycerin | 0.004 | Wt % |
| | Monoglycerides | 0.237 | Wt % |
| | Diglycerides | 0.000 | Wt % |
| | Triglycerides | 0.000 | Wt % |
| | Total Glycerin | 0.065 | Wt % |
| ASTM D5453 | Sulfur Content by UV Fluorescence | | |
| | Sulfur Content | 57 | mg/kg |

[1] Out of Scope of the Method

The feedstock contained sulfur of 23 ppm, as shown in Table 15.

TABLE 15

Sulfur content by UV fluorescence test

| Method | Test | Result | Units |
|---|---|---|---|
| ASTM D5453 | Sulfur Content by UV Fluorescence | | |
| | Sulfur Content | 23 | mg/kg |

Example 23

Compositional Data on Algae Meal

Briefly, dried algae biomass was subjected to a single-step transesterification process followed by a separation step by filtration. The obtained solid reaction product were dried in an oven at about 37° C. and then analyzed. Various parameters such as total proteins, amino acid composition of proteins, lipids, ash and mineral/metal analysis was done. Table 16 and Table 17 show the compositional data of algae biomass before the single-step transesterification process. Table 18, Table 19 and Table 20 show the compositional data of the solid reaction product obtained by the filtration after the single-step transesterification process.

TABLE 16

Compositional data of sprayed dried algae biomass feedstock

| Test Code | Assay/Analyte | Result | Units |
|---|---|---|---|
| MOB | Moisture at assay, 133 C. | | |
| | Moisture | 4.74 | % |
| PRKR | Protein, Kjeldahl (N × 6.25) | | |
| | Protein | 58.2 | % |
| FTAH | Fat, acid hydrolysis | | |
| | Fat | 9.22 | % |
| FIBR | Fiber, crude | | |
| | Fiber - Crude | 5.62 | % |
| ASHF | Ash, 600 C. | | |
| | Ash | 6.81 | % |
| PH | pH | | |
| | pH | 6.25 | |
| CAF | Calcium | | |
| | Calcium | 1.04 | % |
| CUF | Copper | | |
| | Copper | 126 | ppm |
| FEF | Iron | | |
| | Iron | 865 | ppm |
| PB | Lead | | |
| | Lead | <0.0500 | ppm |
| MGF | Magnesium | | |
| | Magnesium | 3746 | ppm |
| SULF | Sulfur | | |
| | Sulfur | 0.615 | % |
| GRSS | Preparation, Miscellaneous | | |
| | Carbohydrate (by calc.) | 21.0 | % |
| | Calories (by calc.) | 400 | kcal/100 g |

TABLE 17

Compositional data of algae biomass feedstock

| Test Code | Assay/Analyte | Result | Units |
|---|---|---|---|
| MOB | Moisture at assay, 133 C. | | |
| | Moisture | 89.9 | % |
| PRKR | Protein, Kjeldahl (N × 6.25) | | |
| | Protein | 2.12 | % |
| FTAH | Fat, acid hydrolysis | | |
| | Fat | 0.375 | % |
| ASHF | Ash, 600 C. | | |
| | Ash | 4.04 | % |
| GRSS | Preparation, Miscellaneous | | |
| | Carbohydrate (by calc.) | 3.57 | % |
| | Calories (by calc.) | 26.1 | kcal/100 g |

TABLE 18

Compositional data of the solid reaction product

| Test Code | Assay/Analyte | Result | Units |
|---|---|---|---|
| MOB | Moisture at assay, 133 C. | | |
| | Moisture | 3.57 | % |
| PRKR | Protein, Kjeldahl (N × 6.25) | | |
| | Protein | 62.9 | |
| FTAH | Fat, acid hydrolysis | | |
| | Fat | 1.43 | % |
| ASHF | Ash, 600 C. | | |
| | Ash | 3.74 | % |
| GRSS | Preparation, Miscellaneous | | |
| | Carbohydrate (by calc.) | 28.4 | % |
| | Calories (by calc.) | 378 | kcal/100 g |

TABLE 19

Compositional data of the solid reaction product

| Test Code | Assay/Analyte | Result | Units |
|---|---|---|---|
| AAHV | Acid stable amino acids | | |
| | Aspartic Acid | 6.18 | g/100 g |
| | Threonine | 3.34 | g/100 g |
| | Serine | 2.89 | g/100 g |
| | Glutamic Acid | 7.07 | g/100 g |
| | Proline | 3.34 | g/100 g |
| | Glycine | 3.82 | g/100 g |
| | Alanine | 5.51 | g/100 g |
| | Valine | 4.65 | g/100 g |
| | Methionine | 0.710 | g/100 g |
| | Isoleucine | 2.59 | g/100 g |
| | Leucine | 5.96 | g/100 g |
| | Tyrosine | 2.47 | g/100 g |
| | Phenylalanine | 3.52 | g/100 g |
| | Histidine | 1.10 | g/100 g |
| | Lysine | 3.72 | g/100 g |
| | Arginine | 3.73 | g/100 g |
| CYPA | Sulfur amino acids (after oxidation) | | |
| | Cysteine | 0.770 | g/100 g |
| | Methionine | 1.33 | g/100 g |
| TYHV | Tryptophan (alkaline hydrolysis) | | |
| | Tryptophan | 0.770 | g/100 g |

TABLE 20

Compositional data of the solid reaction product

| Test Code | Assay/Analyte | Result | Units |
|---|---|---|---|
| MOB | Moisture at assay, 133 C. | | |
| | Moisture | 7.62 | % |
| PRKR | Protein, Kjeldahl (N × 6.25) | | |
| | Protein | 66.1 | % |
| FTAH | Fat, acid hydrolysis | | |
| | Fat | 0.342 | % |
| ASHF | Ash, 600 C. | | |
| | Ash | 1.27 | % |
| AAHV | Acid stable amino acids | | |
| CYPA | Sulfur amino acids (after oxidation) | | |
| TYHV | Tryptophan (alkaline hydrolysis) | | |
| GRSS | Preparation, Miscellaneous | | |
| | Carbohydrate (by calc.) | 24.7 | % |
| | Calories (by calc.) | 366 | kcal/100 g |

The data showed that the transesterification process effective removed lipids and ash from the dried algae biomass feedstock while preserving proteins and/or carbohydrate. The solid reaction product can be valuable due to the concentrated protein and/or carbohydrate contents.

Example 24

Figure 18A:
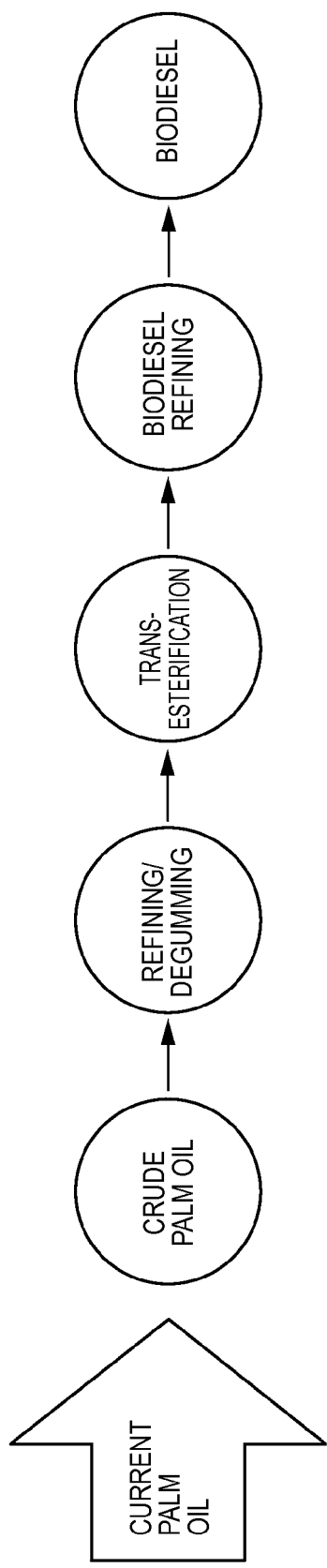
FIG. 18A shows an exemplary process of producing biodiesel using crude palm oil as the feedstock.
Figure 18B:
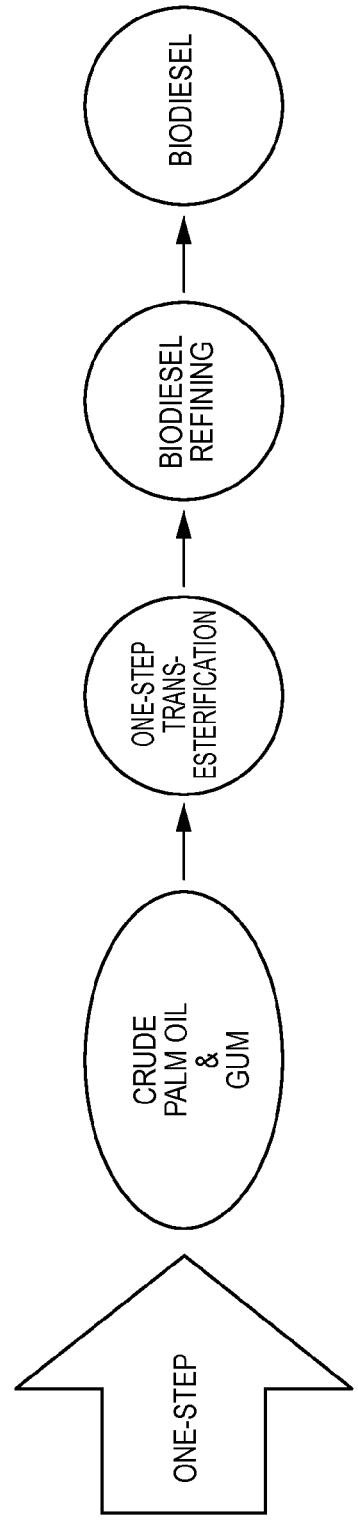
FIG. 18B shows an exemplary embodiment of the single-step process described herein of producing biodiesel using crude palm oil as the feedstock.

Comparison of an Exemplary Process and Single-Step Process to Generate Biodiesel FIG. 18A and FIG. 18B illustrate a comparison of an exemplary current process and single-step process (or referred to as one-step process) to generate biodiesel using palm oil.

FIG. 18A shows an exemplary process of producing biodiesel using crude palm oil as the feedstock. The process can include: providing the crude palm oil as the feedstock, refining and degumming the crude palm oil, performing transesterification reaction to generate biodiesel, refining the biodiesel, and collecting the biodiesel.

FIG. 18B shows an exemplary embodiment of the single-step process (or referred to as one-step process) described herein of producing biodiesel using crude palm oil as the feedstock. The process can include: providing the crude palm oil and gum, performing single-step transesterification reaction to generate biodiesel, refining the biodiesel, and collecting the biodiesel. The feedstock including the crude palm oil and gum does not need to be refined and/or degummed before the transesterification reaction. The process can eliminate rendering process cost (degumming), and/or reserve more feedstock, and/or increase the yield.

Example 25

Exemplary System for Producing Biodiesel Grade, Fatty Acid Alkyl Esters

An exemplary system for producing biodiesel grade, fatty acid alkyl esters can comprise a reactor, and a separator, wherein the separator is in fluid communication with the reactor through a fluid connection. The reactor can be adapted to facilitate a reaction among the reaction agents including the feedstock, the alcohol, and the gaseous catalyst producing a reaction product comprising unreacted alcohol (e.g. methanol), the catalyst (e.g., a HCl gas), a first component comprising a transesterified fatty acid alkyl ester, and a second component comprising glycerine (also referred to as glycerol). The reaction product can flow from the reactor to the separators through a port located at the bottom portion of the reactor. At least part of the reaction product can returned to the reactor for a repeated reaction in the reactor. The separator can be adapted to separate unreacted alcohol and catalyst from the reaction product by fractional distillation. The unreacted alcohol and catalyst can exit the separator from the port located on the top portion of the separator. The separated unreacted alcohol, with or without catalyst, can be reused in the reaction. The reaction product comprising a first component comprising a transesterified fatty acid alkyl ester, and a second component comprising glycerine can exit the separator through a port located at the bottom portion of the separator, and the first component and the second component can be separated in another vessel by, for example, phase separation, fractional distillation, or the like, or a combination thereof. If the first component comprising a transesterified fatty acid alkyl ester exists in the first phase, and the second component comprising glycerine exists in the second phase, and the first phase and the second phase are immiscible, then the first component and the second component can be separated by, for example, by exiting the separator through separate ports. After the phase separation, the first component and the second component can be further processed, respectively.

Example 26

Exemplary System for Producing Biodiesel Grade, Fatty Acid Alkyl Esters

Figure 19:
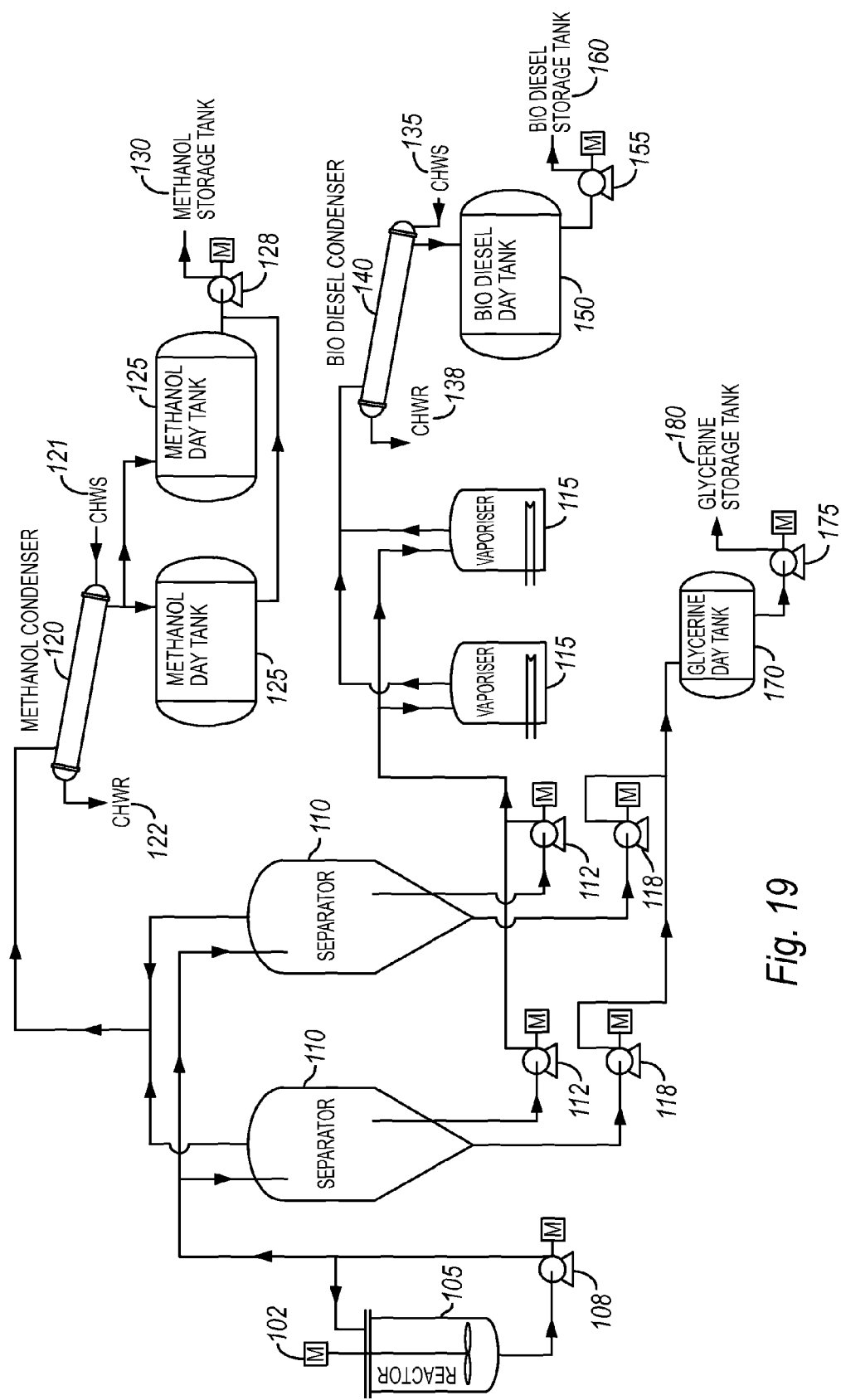
FIG. 19 shows an exemplary system for producing biodiesel grade, fatty acid alkyl esters.

FIG. 19 illustrates an exemplary system for producing biodiesel grade, fatty acid alkyl esters. The system can comprise a reactor (105), two separators (110), two vaporizers (115), a methanol condenser (120), two methanol day tanks (125), a biodiesel condenser (140), a biodiesel day tank (150), a glycerine day tank (170), and multiple pumps with motor (marked as "M") including 108, 112, 118, 128, 155 and 175. The reactor (105) can include a motor (102) for mixing. The reactor (105) can be adapted to facilitate a reaction among the reaction agents including the feedstock, the alcohol, and the gaseous catalyst producing a reaction product comprising unreacted alcohol (methanol in this example), catalyst (HCl in the example), a first component comprising a transesterified fatty acid alkyl ester in a first phase, and a second component comprising glycerine (also referred to as glycerol) in a second phase. The reactor (105) can be in serial fluid communication with two separators (110) in parallel connection, and the reaction product can flow from the reactor (105) to the two separators (110) through a port located at the bottom portion of the reactor (105) driven by a pump with a motor (108). At least part of the reaction product can returned to the reactor (105) for a repeated reaction in the reactor (105). The two separators (110) can be adapted to separate unreacted alcohol and catalyst from the reaction product by fractional distillation. The unreacted alcohol and catalyst can exit the separators (110) from the port located on the top portion of the separators (110) and can enter the methanol condenser (120). The methanol condenser (120) can include a flow of coolant, e.g. water, entering (CHWS, 121) and exiting (CHWR, 122) the methanol condenser (120). The condensed unreacted alcohol, with or without catalyst, can enter the two methanol day tanks (125) in parallel connection, and can flow to methanol storage tank (130, not shown in the figure) driven by a pump with a motor (128). Each of the two separators (110) can be in serial fluid communication with one of the two vaporizers (115) in parallel connection and with a glycerine day tank (170). The first component comprising a transesterified fatty acid alkyl ester in a first phase can exit the separators (110) through a port and enter one of the two vaporizers (115) driven by a pump with a motor (112), and a second component in a second phase can exit the separators (110) through a separate port and enter the glycerine day tank (170) driven by a pump with a motor (118). The two vaporizers (115) can be adapted to further purify the first component in the first phase by fractional distillation. The vaporizers (115) can be in serial fluid communication with the biodiesel condenser (140). The distillate from the two vaporizers (115) can exit the vaporizers (115) from the port located at the top portion of the vaporizers (115) and enter the biodiesel condenser (140). The biodiesel condenser (140) can include a flow of coolant, e.g. water, entering (CHWS, 135) and exiting (CHWR, 138) the biodiesel condenser (140). The condensed biodiesel can enter the biodiesel day tank (150), can then delivered to a biodiesel storage tank (160, not shown in the figure) driven by a pump with a motor (155). The second component comprising glycerine in a second phase can exit the two separators (110) through a port located at the bottom portion of the separators (110) and enter a glycerine day tank (170) driven by a pump with a motor (118), and then enter a glycerine storage tank (180, not shown in the figure) driven by a pump with a motor (175).

Example 27

Exemplary System for Producing Biodiesel Grade, Fatty Acid Alkyl Esters

Figure 20A:
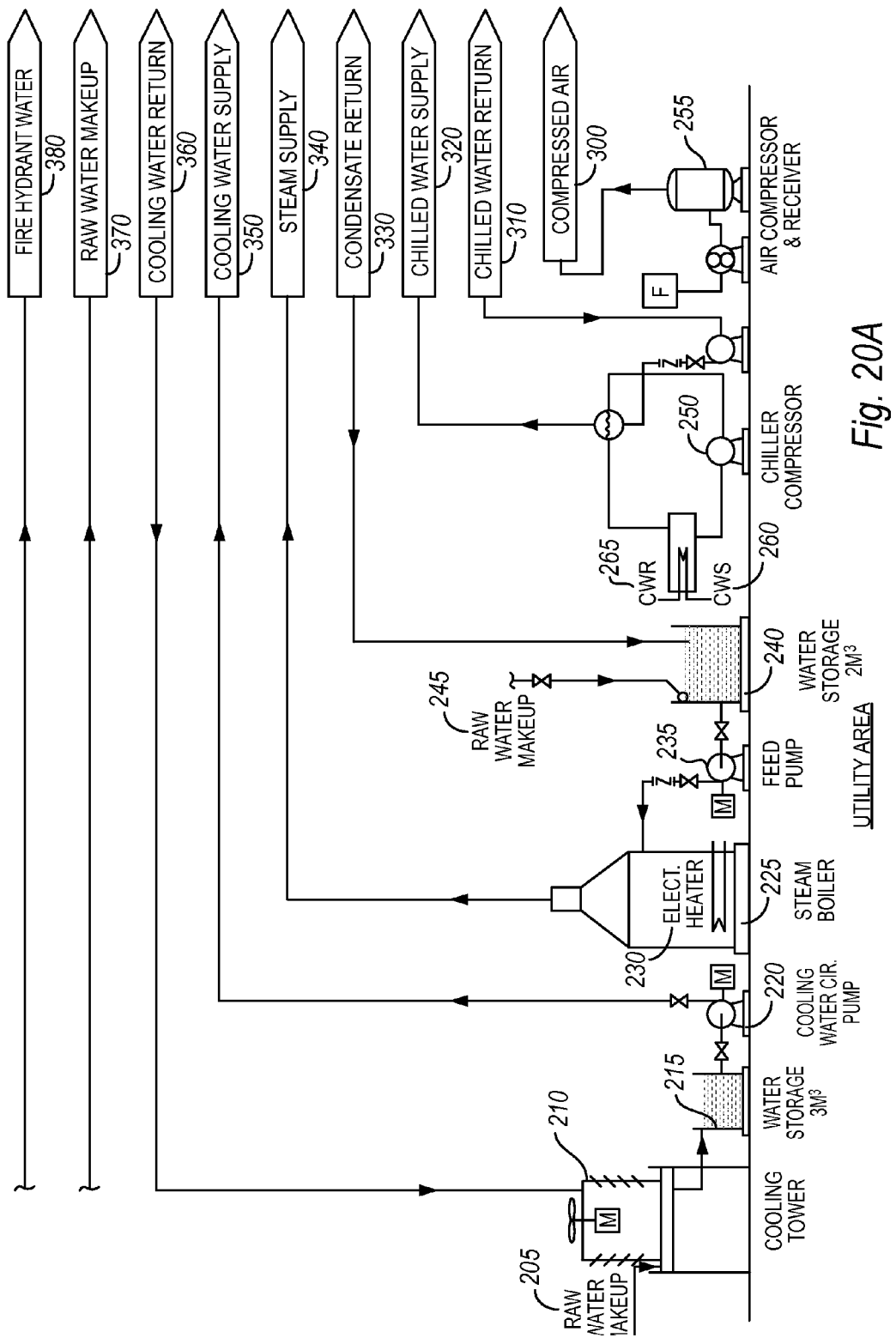
FIG. 20A shows an exemplary embodiment of a utility area of the system for producing biodiesel grade, fatty acid alkyl esters.
Figure 20B:
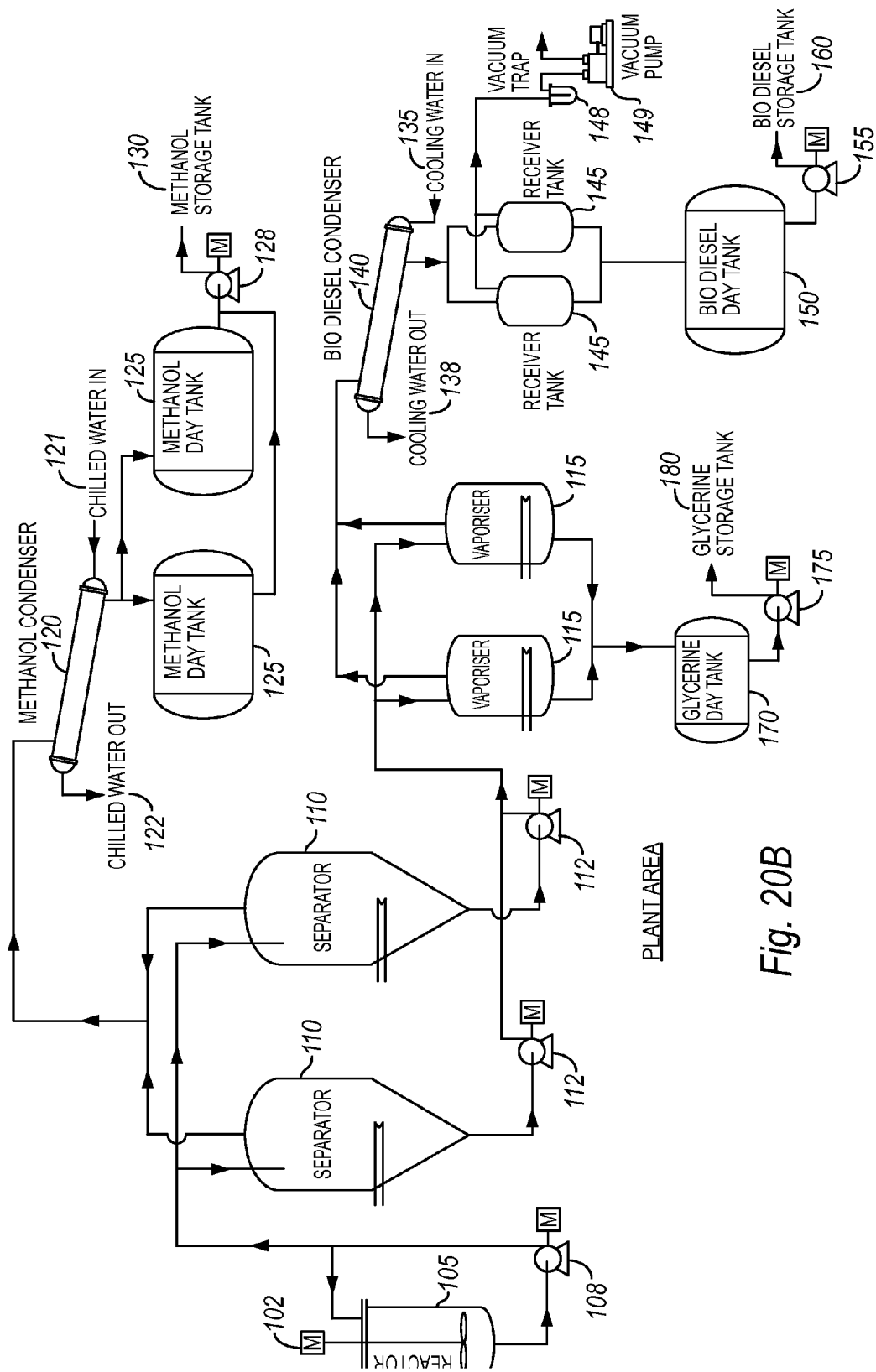
FIG. 20B shows an exemplary system for producing biodiesel grade, fatty acid alkyl esters.

FIG. 20A and FIG. 20B illustrate an exemplary system for producing biodiesel grade, fatty acid alkyl esters (FIG. 20B) and a utility area of the system (FIG. 20A). In FIG. 20B, the same numbers in this figure illustrate the same parts as those in FIG. 19. The system can comprise a reactor (105), two separators (110), two vaporizers (115), a methanol condenser (120), two methanol day tanks (125), a biodiesel condenser (140), a biodiesel day tank (150), a glycerine day tank (170), and multiple pumps with motor (marked as "M") including 108, 112, 128, 155 and 175. The reactor (105) can include a motor (102) for mixing. The reactor (105) can be adapted to facilitate a reaction among the reaction agents including the feedstock, the alcohol, and the gaseous catalyst producing a reaction product comprising unreacted alcohol (methanol in this example), catalyst (HCl in the example), a first component comprising a transesterified fatty acid alkyl, and a second component comprising glycerine. The reactor (105) can be in serial fluid communication with two separators (110) in parallel connection, and the reaction product can flow from the reactor (105) to the two separators (110) through a port located at the bottom portion of the reactor (105) driven by a pump with a motor (108). At least part of the reaction product can returned to the reactor (105) for a repeated reaction in the reactor (105). The two separators (110) can be adapted to separate unreacted alcohol and catalyst from the reaction product by fractional distillation. The unreacted alcohol and catalyst can exit the separators (110) from the port located on the top portion of the separators (110) and can enter the methanol condenser (120). The methanol condenser (120) can include a flow of coolant, e.g. water, entering (CHWS, 121) and exiting (CHWR, 122) the methanol condenser (120). The condensed unreacted alcohol, with or without catalyst, can enter the two methanol day tanks (125) in parallel connection, and can flow to a methanol storage tank (130, not shown in the figure) driven by a pump with a motor (128). Each of the two separators (110) can be in serial fluid communication with one of the two vaporizers (115) in parallel connection. The reaction product comprising the first component and the second component can exit the separators (110) through a port located at the bottom portion of the separators (110) and enter one of the two vaporizers (115) driven by a pump with a motor (112). The two vaporizers (115) can be adapted to separate the first component from the second component by fractional distillation. The vaporizers (115) can be in serial fluid communication with the biodiesel condenser (140). The distillate from the two vaporizers (115) can exit the vaporizers (115) from the port located at the top portion of the vaporizers (115) and enter the biodiesel condenser (140). The biodiesel condenser (140) can include a flow of coolant, e.g. water, entering ("cooling water in", 135) and exiting ("cooling water out", 138) the biodiesel condenser (140). The condensed biodiesel can pass enter one of the two receiver tanks (145). The two receiver tanks (145) can be connected to a vacuum trap (148) driven by a vacuum pump (149) to further remove impurities, e.g. water, from the first component. The purified first component can enter biodiesel day tank (150) from a port located at the bottom portion of the receiver tanks (145), can then delivered to a biodiesel storage tank (160, not shown in the figure) driven by a pump with a motor (155). The second component comprising glycerine in a second phase can exit the vaporizers (115) through a port located at the bottom portion of the vaporizers (115) and enter a glycerine day tank (170) driven by a pump with a motor (118), and then enter a glycerine storage tank (180, not shown in the figure) driven by a pump with a motor (175).

FIG. 20A illustrates an exemplary utility area which can be connected to the system shown on the right port. The utility area can include: the system to provide cooling water including raw water makeup (205), cooling water return (370), cooling tower (210), water storage (215), cooling water circulation pump (220), and cooling water supply (360); the system to provide steam including raw water makeup (245), condensate return (340), water storage (240), feed pump (235), steam boiler (220) with electrical heater (230), and steam supply (350); the system to provide chilled water including chilled water return (310), chiller compressor (250), coolant in (260), coolant out (265), and chilled water supply (330); and a system to provide compressed air including air compressor and receiver (255) and compressed air supply (300).

Example 28

Exemplary System for Producing Biodiesel Grade, Fatty Acid Alkyl Esters

An exemplary system for producing biodiesel grade, fatty acid alkyl esters can include a reactor, a separator, a methanol day tank, a vaporizer, a biodiesel day tank and a control system. There are some parts and the fluid communication among these and other parts but not specifically pointed out and/or described.

The reactor is adapted to facilitate a reaction among the reaction agents including the feedstock, the alcohol, and the gaseous catalyst producing a reaction product comprising unreacted alcohol (e.g. methanol), catalyst (e.g., a HCl gas), a first component comprising a transesterified fatty acid alkyl ester, and a second component comprising glycerine (also referred to as glycerol). The reaction product can flow from the reactor to the separator through a port located at the bottom portion of the reactor. At least part of the reaction product can be returned to the reactor for a repeated reaction in the reactor. The system can include a filter such that the reaction product exiting the reactor can be filtered before entering the separator to separate the solid reaction product from the gas and/or liquid reaction product. The solid reaction product can include protein, carbohydrate, or other non-convertible matter. The separator is adapted to separate unreacted alcohol and catalyst from the reaction product by fractional distillation. The unreacted alcohol and catalyst can exit the separator from the port located on the top portion of the separator and can be condensed and/or stored in the methanol day tank. The separated unreacted alcohol, with or without catalyst, can be reused in the reaction. The methanol day tank can be located at an elevated level compared to the separator. The reaction product comprising a first component comprising a transesterified fatty acid alkyl ester, and a second component comprising glycerine can exit the separator through a port located at the bottom portion of the separator, and the first component and the second component can be separated in another vessel by, for example, phase separation, fractional distillation, or the like, or a combination thereof. If the first component comprising a transesterified fatty acid alkyl ester exists in the first phase, and the second component comprising glycerine exists in the second phase, and the first phase and the second phase are immiscible, then the first component and the second component can be separated by, for example, by exiting the separator through separate ports. After the phase separation, the first component and the second component can be further processed, respectively.

The following description exemplifies the situation when the first component comprising a biodiesel (e.g., a transesterified fatty acid alkyl ester) exists in the first phase, and the second component comprising glycerine exists in the second phase, and the first phase and the second phase are immiscible. The first component and the second component can be separated by, for example, by exiting the separator through separate ports. After the phase separation, the first component can be further processed and/or purified in the vaporizer by fractional distillation. The processed and/or purified biodiesel can be delivered to the biodiesel day tank for storage. The vaporizer can be located at an elevated level compared to the separator. The second component comprising glycerine (also referred to as glycerol) can exit the separator from a port located at the bottom portion of the separator. The second component can be further processed. The system can include a filter such that the first component and/or the second component exiting the separator can be filtered to separate the solid reaction product from the gas and/or liquid reaction product. The solid reaction product can include protein, carbohydrate, or other non-convertible matter.

Example 29

Exemplary Reaction Chamber

Figure 21:
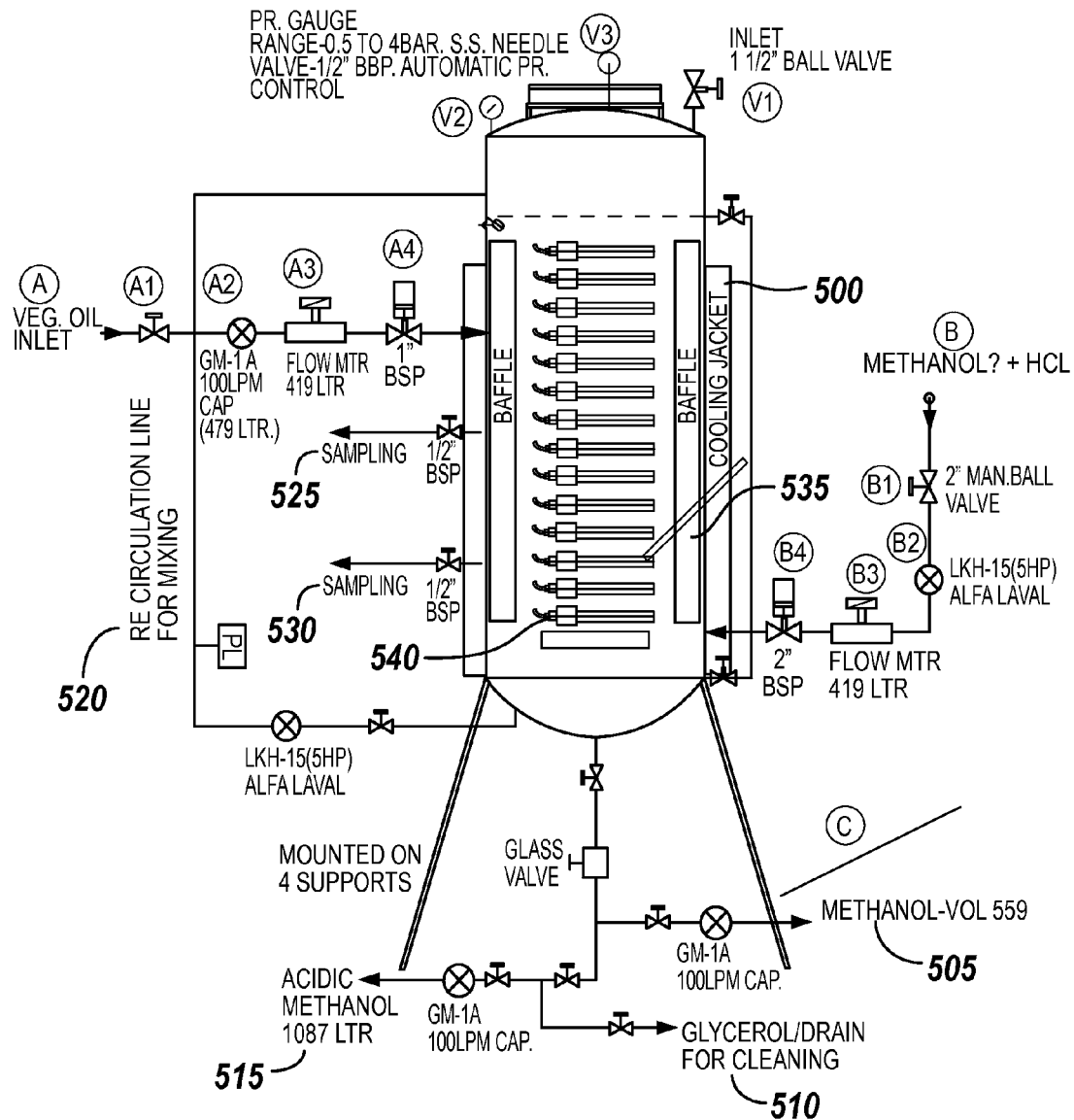
FIG. 21 shows an exemplary reaction chamber which can be used in a system described herein for producing biodiesel grade, fatty acid alkyl esters.

FIG. 21 illustrates an exemplary reaction chamber which can be used in a system described herein for producing biodiesel grade, fatty acid alkyl esters. Table 13 and Table 14 summarize the technical specification of the reaction chamber exemplified in FIG. 23.

The reaction chamber can be mounted on 4 supports. The reaction chamber can include a cooling jacket (500) and a baffle (535), and sonicators (540). The reaction chamber can include a power line inside the reaction chamber, e.g. a power line for the sonicators (540). The power line can include a protection layer. For example, the power line can be wrapped within a pipe, or the like. The protection layer can insulate and/or protect the power line from the reaction agents in the reaction chamber. The reaction product comprising at least unreacted alcohol (e.g., methanol), the catalyst (e.g., an acidic catalyst) and glycerol, can exit through ports located at the bottom portion of the reaction chamber. The unreacted alcohol can be separated from the reaction product (505). The mixture of unreacted alcohol and catalyst can be separated from the reaction product (515). The glycerol and drain (510) can be separated from the reaction product for cleaning. At least part of the reaction product can return to the reaction chamber for mixing through the recirculation line (520). The reaction can be monitored by sampling the reaction agents and/or reaction product at 525 and/or 530. B3 and B4 can be the same as A3 (flow meter) and A4 (solenoid), respectively, as shown in Table 21. There are some parts, e.g. pumps, valves, or the like, and the fluid communication among these and other parts shown in the figure but not specifically pointed out and/or numbered. It is understood that the dimensions in the figure are for illustration purposes only, and are not intended to limit the scope of the application.

TABLE 21

System detail of an exemplary reaction chamber shown in FIG. 23

| SYSTEM DETAIL vessel detail | |
|---|---|
| REACTOR SIZE | Ø1000X 3000 M LONG |
| REACTOR SIZE | Ø1000X 3000 M LONG |
| LIQUID LEVEL | UP TO 2250 mm FROM THE TANK BOTTOM |
| MATERIAL | S.S.-316 .8 MM THCIK |
| ULTRASONIC | 12 NOS. UX. RESONATOR |
| PROCESS TEMP. | 40° C. |
| INLET (V1) | MOUTH WITH TEFLON GASKET AND CAPT SIZE 1½" |
| PR. GAUGE (V2) | RANGE TO 4 BAR. S.S. NEEDLE VALVE-½" BSP AUTOMATIC PR. CONTROL (POS.-A |
| THERMOSTAT (V3) | THERMOSTAT WELL FOR TEMP. PROBE SIZE RANGE O TO 100° C. |
| LEVEL INDICATOR | ROUND GLASS ID -25 MM TEMP- 250° WITH BOTH SIDE ½" BALL VALVE (MANUALLY OPERATED) DETAIL LINE:-A VEG. OIL INLET |
| MEDIA | VEG. OIL |
| FILL-UP TIME | 5 MIN |
| MEDIA INLET CAP_ | 419 LTR. INLET IN VESSEL |
| PUMP (A2) | GM-1A, 100 LPM, 1 BAR S.S. BODY, ALFA LEVEL MAKE |
| FLOW METER (A3) | FLOW METER WITH SENSOR 30 LPM WITH VAR. SPEED |
| SOLENOID (A4) | 1" ELE. OPERATED DETAIL LINE:-B METHANOL + HCL |
| MEDIA | METHANOL - HCL |
| FILL-UP TIME | 5 MIN |
| MEDIA INLET CAP_ | 1257 LTR. INLET IN VESSEL |
| PUMP (B2) | 300 LPM, 1.5 BAR PR. S.S. MAKE ALFA LEVEL MAKE |
| FLOW METER (A3) | FLOW METER WITH SENSOR 30 LPM WITH VAR. SPEED |
| SOLENOID (A4) | 1" ELE. OPERATED DETAIL LINE:-C DRAIN |
| GLASS VALVE | FOR CONT. WATCHING |
| PUMP FOR METHANOL OUT | GM-1A |
| PUMP FOR BIO-DESEL | GM-1A RECIRCULATION FOR PROPER MIXING DRAIN |
| PUMP | LKH-15 PUMP FOR RE-CIRCULATION |

Table 22 summarizes the technical specifications of the exemplary reaction chamber of FIG. 23.

TABLE 22

Technical Specification of an exemplary reaction chamber
TECHNICAL SPECIFICATIONS
Fast Biodiesel Process Tool - "FABIDEZ" (2KL)
Specifications:-

| | |
|---|---|
| Application | Biodiesel Trans-esterification Reaction. |
| Power Supply | 3 Phase, 220 V AC, 50 Hz upto 20 KW. |
| Ultrasonic Power Output | 14 KW. |
| Frequency | 25 KHz. |
| Tube Resonators | 14 no · s (RS-25-48-10) Length: 1139 mm. |
| Eco series generators | 14 no · s (25-XX-RR). |

TABLE 22-continued

Technical Specification of an exemplary reaction chamber
TECHNICAL SPECIFICATIONS
Fast Biodiesel Process Tool - "FABIDEZ" (2KL)
Specifications:-

| | | |
|---|---|---|
| Reaction Vessel Details | Volume | 2180 liters (Aprox.) |
| | Material | SS 316, 8 mm thick with jacket |
| | Dia | 1000 mm |
| | Height | 3000 mm |

PLC based Monitor Box & programmable embedded software to operate these ultrasonic tube resonators & Eco Generators.
Special Features:-
Pre-selection of the required Amplitude (30 to 100%)
Fully Automatic Frequency Servo-Control.
Microprocessor Controlled Timer - 0 to 24 Hours.
Continuous Display of Time, Temperature & Ultrasonic Power.
Pre-selection of different Time, Temperature & Ultrasonic Power required is possible.
Stabilization of Amplitude within ±2%.

Table 23 shows technical details of the parts employed in the exemplary reaction of FIG. 23.

TABLE 23

| | | | | |
|---|---|---|---|---|
| | | | Exemplary apparatuses | |
| POS | No. OF DRAWING OR NORMAL | Quantity in 1 group | Project Name BIODIESEL-PROCESSER Name of commercial typology | MATERAIL AND THERMAL TREATMENTS |
| 1 | | 1 | REACTION VESSEL DIA 1000 × 3000 (D × H) CAPACITY:- 2180 LTRS. | SS 316, 8 mm THICK (800 KGS) |
| 2 | | 1 | LEVEL SWITCH | MAGNETIC |
| 3 | RS-25-48-10 | 14 | ULTRASONIC TUBE RESONATOR 1139 M.M LONG. | RTUL |
| 4 | | 14 | GENERATOR | RTUL |
| 5 | | 1 | PRESSURE GAUGE 0.5 TO 4 BAR, NEEDLE VALVES | S.S |
| 6 | ½" BSP MANUALLY | 4 | BALL VALVE | |
| 7 | 2" BSP SOLENOID | 1 | 2 WAY SOLENOID VALVE | Butterfly Valve Crane |
| 8 | 2" BSP MANUALLY | 1 | BALL VALVE | |
| 9 | 1.½" BSP MANUALLY | 3 | BALL VALVE | |
| 10 | 1" BSP SOLENOID | 1 | 2 WAY SOLENOID VALVE | Butterfly Valve Crane |
| 11 | 1" BSP MANUALLY | 5 | BALL VALVE | |
| 12 | GLASS VALVE | 1 | MANUALLY VALVE PUMP | |
| 13 | GM-1 A 100 LPM | 3 | S.S PUMP | |
| 14 | LKH-15 (5 HP) 300 LPM | 2 | S.S PUMP | |
| 15 | | 2 | FLOW METER (30 LPM) WITH SENSOR, VER SPEED | |
| 16 | | 1 | PRESSURE SWITCH FLANGES & PIPES | |
| 17 | E-TABLE | 6 | FLANGES 1" | |
| 18 | E-TABLE | 6 | FLANGES 2" | |
| 19 | E-TABLE | 10 | FLANGES 1½" | |
| 20 | E-TABLE | 8 | FLANGES ½" | |
| 21 | | 5 MTR. | S.S. PIPE 1" | |
| 22 | | 5 MTR. | S.S. PIPE 2" | |
| 23 | | 5 MTR. | S.S. PIPE 1½" | |
| 24 | | | S.S. PIPE ½" ELECTRICAL PANEL + PLC + MMI | |
| 25 | ELECTRICAL PANEL | 1 | | EPSILON |
| 26 | PLC + MMI | 1 | | SIEMENS |
| 27 | ELEC. COMP. | 1 | | SIEMENS |
| 28 | SOFTWARES | 1 | | RTUL |
| 30 | PNEUMATICS | 1 | | |
| 31 | AUTOMATION | 1 | | |
| 32 | MISC. EXPENSES | 5% | | |

The various methods and techniques described above provide a number of ways to carry out the application. Of course, it is to be understood that not necessarily all objectives or advantages described can be achieved in accordance with any particular embodiment described herein. Thus, for example, those skilled in the art will recognize that the methods can be performed in a manner that achieves or optimizes one advantage or group of advantages as taught herein without necessarily achieving other objectives or advantages as taught or suggested herein. A variety of alternatives are mentioned herein. It is to be understood that some preferred embodiments specifically include one, another, or several features, while others specifically exclude one, another, or several features, while still others mitigate a particular feature by inclusion of one, another, or several advantageous features.

Furthermore, the skilled artisan will recognize the applicability of various features from different embodiments. Similarly, the various elements, features and steps discussed above, as well as other known equivalents for each such element, feature or step, can be employed in various combinations by one of ordinary skill in this art to perform methods in accordance with the principles described herein. Among the various elements, features, and steps some will be specifically included and others specifically excluded in diverse embodiments.

Although the application has been disclosed in the context of certain embodiments and examples, it will be understood by those skilled in the art that the embodiments of the application extend beyond the specifically disclosed embodiments to other alternative embodiments and/or uses and modifications and equivalents thereof.

In some embodiments, the numbers expressing quantities of ingredients, properties such as molecular weight, reaction conditions, and so forth, used to describe and claim certain embodiments of the application are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

In some embodiments, the terms "a" and "an" and "the" and similar references used in the context of describing a particular embodiment of the application (especially in the context of certain of the following claims) can be construed to cover both the singular and the plural. The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (for example, "such as") provided with respect to certain embodiments herein is intended merely to better illuminate the application and does not pose a limitation on the scope of the application otherwise claimed. No language in the specification should be construed as indicating any non-claimed element essential to the practice of the application.

Preferred embodiments of this application are described herein, including the best mode known to the inventors for carrying out the application. Variations on those preferred embodiments will become apparent to those of ordinary skill in the art upon reading the foregoing description. It is contemplated that skilled artisans can employ such variations as appropriate, and the application can be practiced otherwise than specifically described herein. Accordingly, many embodiments of this application include all modifications and equivalents of the subject matter recited in the claims appended hereto as permitted by applicable law. Moreover, any combination of the above-described elements in all possible variations thereof is encompassed by the application unless otherwise indicated herein or otherwise clearly contradicted by context.

All patents, patent applications, publications of patent applications, and other material, such as articles, books, specifications, publications, documents, things, and/or the like, referenced herein are hereby incorporated herein by this reference in their entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that can be employed can be within the scope of the application. Thus, by way of example, but not of limitation, alternative configurations of the embodiments of the application can be utilized in accordance with the teachings herein. Accordingly, embodiments of the present application are not limited to that precisely as shown and described.

What is claimed is:

1. A process for producing a fatty acyl methyl ester comprising:
    providing reaction agents comprising a feedstock comprising triglycerides, methanol and gaseous HCl at a concentration of about 1M to about 3M;
    contacting the reaction agents for a time of about 5 minutes to about 5 hours at a temperature of about 20° C. to about 60° C. to form a phase-separated reaction product comprising a first phase comprising methanol and HCl, and a second phase comprising a transesterified fatty acyl methyl ester;
    recovering a component from the second phase, which component comprises the transesterified fatty acyl methyl ester; and
    recovering methanol and HCl of said first phase by distilling said first phase at about 65° C. to 80° C.

2. A process for producing a fatty acyl alkyl ester comprising:
    providing reaction agents comprising a feedstock comprising a fatty acid conjugate, an alcohol and a gaseous acid catalyst, and contacting said reaction agents under conditions comprising one or more of the following: a temperature of about 20° C. to about 60° C., a reaction time of about of 5 minutes to about 5 hours, and an acid concentration of at least 0.5M, wherein the contacting results in formation of a reaction product comprising a first component comprising a transesterified fatty acyl alkyl ester.

3. The process of claim 2 wherein said contacting occurs at a temperature of about 20° C. to about 60° C.

4. The process of claim 2 wherein said contacting occurs for a reaction time of about of 5 minutes to about 5 hours.

5. The process of claim 2 wherein said contacting comprises an acid having a concentration in said alcohol of at least 0.5M.

6. The process of claim 2 wherein said gaseous acid catalyst is at a concentration of from about 1.0 M to about 3.0M in said alcohol.

7. The process of claim 2 wherein said gaseous acid catalyst comprises one or more selected from the group consisting of acetyl chloride, $BF_3$, HCl, HBr, HCN, HF, $H_2S$ and $H_2SO_4$.

8. The process of claim 2 wherein said acid is gaseous HCl.

9. The process of claim 2 wherein said alcohol comprises one or more selected from the group consisting of methanol, ethanol, propanol, butanol, pentanol, hexanol, heptanol, octanol, nonanol, decanol, benzyl alcohol, iso-butyl alcohol, n-butyl alcohol, 2-ethyl hexanol, furfuryl alcohol, iso-propyl alcohol, and n-propyl alcohol.

10. The process of claim 2 wherein said alcohol is methanol.

11. The process of claim 2 wherein said feedstock comprises algal bodies.

12. The process of claim 2 wherein said feedstock comprises unlysed algal bodies.

13. The process of claim 2 wherein said feedstock comprises at least one component selected from the group consisting of: an oil derived from a plant, an oil derived from an animal, a lipid, a fat, a grease, a cooking waste, a triglyceride, phospholipid, a glycolipid, or a neutral lipid.

14. The process of claim 2 wherein said fatty acid conjugate comprises at least one component selected from the group consisting of: a triglyceride, a phospholipid, a glycolipid, or a neutral lipid.

15. The process of claim 2 wherein said fatty acid conjugate comprises a triglyceride.

16. The process of claim 2 further comprising recovering said fatty acyl methyl ester, and said alcohol and said gaseous acid catalyst through phase separation.

17. The process of claim 13 further comprising distilling said alcohol and said gaseous acid catalyst wherein said distillation comprises a temperature of about 65° C. to 80° C. and wherein said distillation separates water from said alcohol and said gaseous acid catalyst.

* * * * *